US012124208B2

(12) United States Patent
Yamauchi et al.

(10) Patent No.: US 12,124,208 B2
(45) Date of Patent: Oct. 22, 2024

(54) IMAGE FORMING APPARATUS

(71) Applicant: CANON KABUSHIKI KAISHA, Tokyo (JP)

(72) Inventors: Daigo Yamauchi, Kanagawa (JP); Atsuyuki Yuzawa, Kanagawa (JP); Takeo Kawanami, Kanagawa (JP); Takehiro Miyashita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/073,821

(22) Filed: Dec. 2, 2022

(65) Prior Publication Data

US 2023/0176517 A1 Jun. 8, 2023

(30) Foreign Application Priority Data

Dec. 7, 2021 (JP) ................................ 2021-198631
Dec. 20, 2021 (JP) ................................ 2021-206558

(51) Int. Cl.
*G01G 21/16* (2006.01)
*G03G 21/16* (2006.01)

(52) U.S. Cl.
CPC .................. *G03G 21/1633* (2013.01); *G03G 2215/00544* (2013.01); *G03G 2215/00548* (2013.01); *G03G 2215/00679* (2013.01); *G03G 2221/1654* (2013.01)

(58) Field of Classification Search
CPC ...... G03G 21/1623–1638; G03G 2215/00544; G03G 2221/1651; G03G 2221/1654; G03G 2221/1687
See application file for complete search history.

(56) References Cited

U.S. PATENT DOCUMENTS 9,092,002 B2 * 7/2015 Shimoi ................ G03G 21/168
9,284,143 B2 * 3/2016 Takahashi .......... G03G 15/6573
9,557,707 B2 * 1/2017 Ueyama ............. G03G 21/1619
(Continued)

FOREIGN PATENT DOCUMENTS

JP H11348376 A 12/1999
JP 2005018011 A 1/2005
(Continued)

*Primary Examiner* — Justin N Olamit
(74) *Attorney, Agent, or Firm* — ROSSI, KIMMS & McDOWELL LLP

(57) ABSTRACT

An image forming apparatus includes an apparatus body, an image forming unit, an opening and closing cover, a fixed cover that constitutes a part of an exterior of the apparatus body with the opening and closing cover, and is configured to form a boundary portion with an upper edge of the opening and closing cover in a vertical direction, a positioning portion including a first engagement portion provided in the opening and closing cover, and a second engagement portion provided in the fixed cover, a first conveyance guide provided on the opening and closing cover, and a second conveyance guide provided on the fixed cover. The first engagement portion and the second engagement portion are configured to engage with each other to perform positioning of the opening and closing cover and the fixed cover in the vertical direction and positioning of the first conveyance guide and the second conveyance guide.

20 Claims, 45 Drawing Sheets

(56) References Cited

U.S. PATENT DOCUMENTS

| | | | | |
|---|---|---|---|---|
| 9,568,871 | B2 * | 2/2017 | Fukase | G03G 21/1647 |
| 10,241,465 | B2 * | 3/2019 | Naganuma | G03G 21/1633 |

FOREIGN PATENT DOCUMENTS

| | | | | | |
|---|---|---|---|---|---|
| JP | 2007292968 | A | | 11/2007 | |
| JP | 2010015059 | A | | 1/2010 | |
| JP | 2010033022 | A | * | 2/2010 | G03G 21/1633 |
| JP | 2010054881 | A | | 3/2010 | |
| JP | 2014144594 | A | | 8/2014 | |
| JP | 2015227908 | A | | 12/2015 | |
| JP | 2016185854 | A | | 10/2016 | |
| JP | 2021021918 | A | | 2/2021 | |

* cited by examiner

IMAGE FORMING APPARATUS

BACKGROUND OF THE INVENTION

Field of the Invention

The present invention relates to an image forming apparatus that forms an image on a sheet.

Description of the Related Art

In the related art, there is known an image forming apparatus in which a part of an exterior is configured by an opening and closing cover, and by opening the opening and closing cover, a duplex conveyance path for conveying a sheet of which an image is formed on one side to an image forming unit again can be opened (see JP 2016-185854 A).

The opening and closing cover is provided with a hook, and the opening and closing cover is positioned in a rotation direction with respect to the apparatus body by engaging the hook with an engagement portion provided in the apparatus body.

Incidentally, a cover forming a boundary portion with a cover such as the opening and closing cover of JP 2016-185854 A may be deformed due to various factors. For example, in the case of a cover positioned above the fixing unit, there is a possibility that deflection occurs due to heat or the like generated in the fixing unit.

Then, in a case where such deformation occurs, if positioning is performed only in the rotation direction as in JP 2016-185854 A, there is a possibility that the gap at the boundary portion becomes non-uniform. In addition, when the exterior rigidity is increased in order to withstand deformation of the fixing unit due to heat or the like by the exterior alone, as a result, there is a problem that size of the main body and cost are increased.

SUMMARY OF THE INVENTION

According to a first aspect of the present invention, an image forming apparatus including an apparatus body, an image forming unit provided inside the apparatus body and configured to form an image on a sheet, an opening and closing cover that constitutes a part of an exterior of the apparatus body and is openable and closable with respect to the apparatus body, a fixed cover that constitutes a part of an exterior of the apparatus body together with the opening and closing cover, and is configured to form a boundary portion with an upper edge of the opening and closing cover in a vertical direction in a closed state, a positioning portion including a first engagement portion provided in the opening and closing cover, and a second engagement portion provided in the fixed cover and configured to be engaged with the first engagement portion in a case where the opening and closing cover is in a closed state, a first conveyance guide provided on the opening and closing cover and configured to guide the sheet, and a second conveyance guide provided on the fixed cover and configured to guide the sheet together with the first conveyance guide in a case where the opening and closing cover is in a closed state. The first engagement portion and the second engagement portion are configured to engage with each other to perform positioning of the opening and closing cover and the fixed cover in the vertical direction and positioning of the first conveyance guide and the second conveyance guide.

According to a second aspect of the present invention, an image forming apparatus including an apparatus body including a rotatable image bearing member, a transfer member configured to form a transfer nip together with the image bearing member and transfer an image formed on the image bearing member to a recording material, a protruding portion provided adjacent to the transfer nip at a position upstream of the transfer nip in a conveyance direction of the recording material, and curves the recording material toward the image bearing member, an opening and closing unit configured to be openable and closable between a first closed position closed with respect to the apparatus body and a first open position opened with respect to the apparatus body, a biasing portion configured to bias the opening and closing unit toward the first closed position, a lock portion provided on one of the opening and closing unit and the apparatus body and movable between a lock position where the opening and closing unit located at the first close position is locked with respect to the apparatus body and an unlock position where the opening and closing unit is unlocked with respect to the apparatus body, and a cover portion configured to be openable and closable between a second closed position closed with respect to the apparatus body and a second open position opened with respect to the apparatus body, and cover the opening and closing unit positioned at the first closed position at the second closed position. The lock portion is located at the lock position in a case where the cover portion is located at the second closed position.

Further features of the present invention will become apparent from the following description of exemplary embodiments with reference to the attached drawings.

DESCRIPTION OF THE EMBODIMENTS

Hereinafter, embodiments for carrying out the present invention will be exemplarily described in detail with reference to the drawings. However, the dimensions, materials, shapes, and relative arrangements of the components described in the embodiment should be appropriately changed according to the configuration of the device to which the invention is applied and various conditions. That is, the scope of the present invention is not intended to be limited to the following embodiments.

First Embodiment

Figure 1:
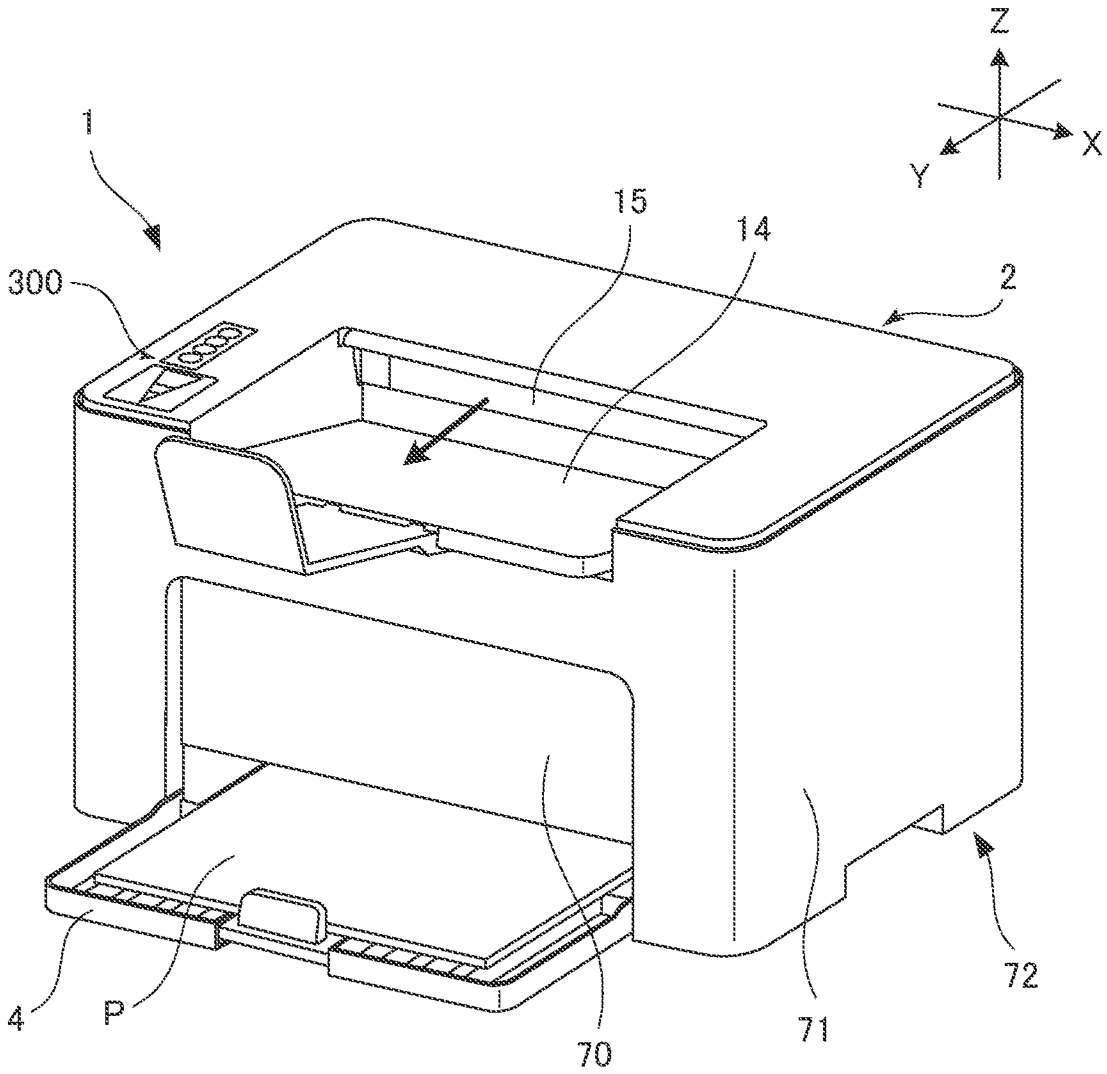
FIG. 1 is a perspective view illustrating an image forming apparatus according to a first embodiment.
Figure 2:
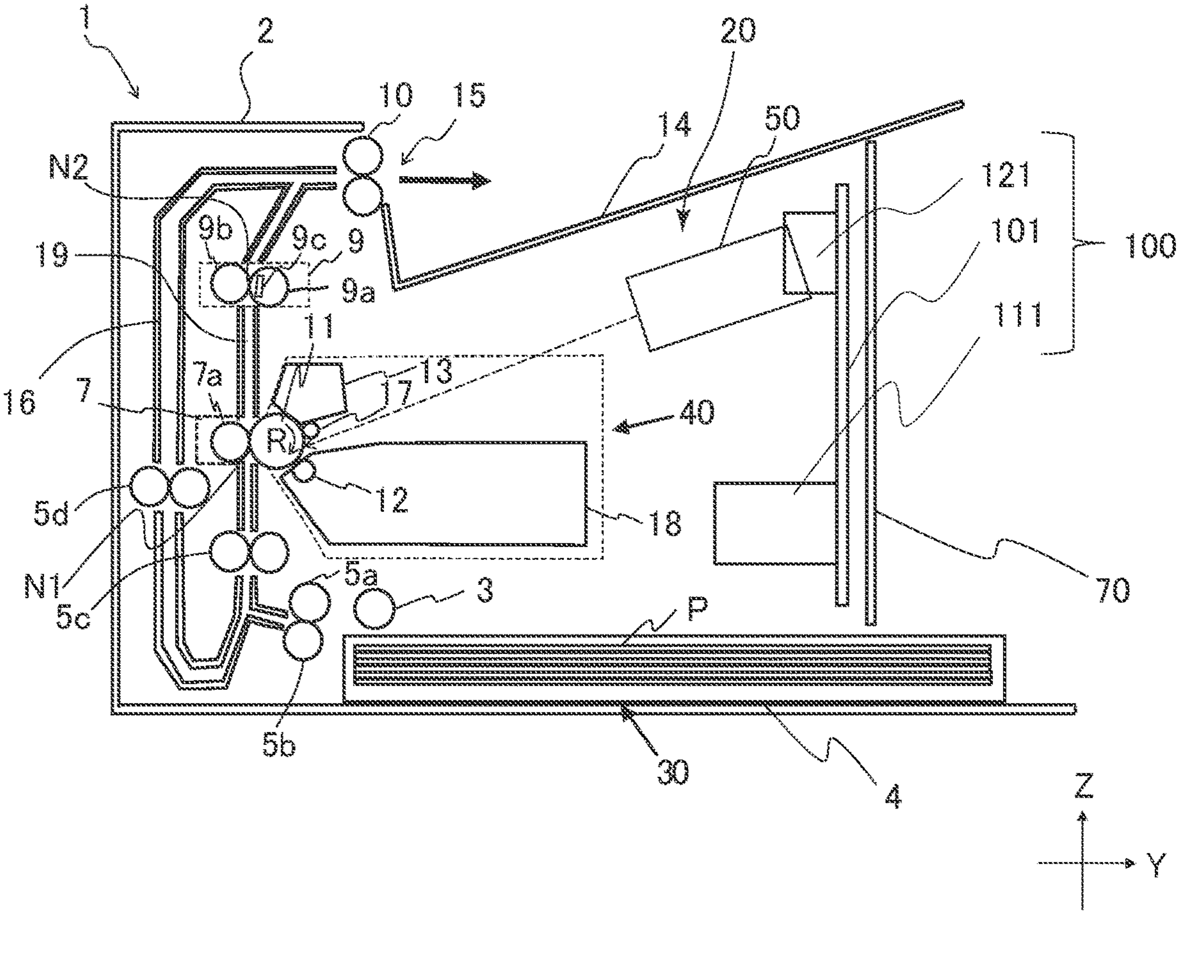
FIG. 2 is an overall schematic view illustrating an image forming apparatus.

FIG. 1 is a perspective view illustrating an image forming apparatus 1 according to a first embodiment, and FIG. 2 is a schematic view illustrating a configuration of the image forming apparatus 1. The image forming apparatus 1 is a monochrome printer that forms an image on a sheet (hereinafter, also referred to as a recording material) based on image information input from an external device. The sheet includes various sheet materials having different materials such as paper such as plain paper and thick paper, a plastic film such as a sheet for an overhead projector, a sheet having a special shape such as an envelope or index paper, and cloth.

In the following description, a height direction (vertical direction) of the image forming apparatus 1 when the image forming apparatus 1 is placed on a horizontal plane is defined as a Z direction. A direction that intersects with the Z direction and is parallel to a rotation axis direction (main scanning direction) of the photosensitive drum 11 to be described below is defined as an X direction. A direction intersecting the X direction and the Z direction is defined as a Y direction. The X direction, the Y direction, and the Z direction preferably intersect perpendicularly to each other. For convenience, a positive side in the X direction is referred to as a right side, a negative side in the X direction is referred to as a left side, a positive side in the Y direction is referred to as a forward or a front side, a negative side in the Y direction is referred to as a rear or a back side, a positive side in the Z direction is referred to as an upper side, and a negative side in the Z direction is referred to as a lower side.

Overall Configuration

As illustrated in FIGS. 1 and 2, the image forming apparatus 1 includes an image forming unit 20 that forms a toner image on a sheet, a feeding unit 30 that feeds the sheet P, a fixing unit 9 that fixes the toner image formed by the image forming unit 20 to the sheet, and a sheet discharge roller pair 10.

The image forming unit 20 includes a scanner unit 50, an electrophotographic process unit 40, and a transfer roller 7*a* that transfers the toner image formed on the photosensitive drum 11 of the process unit 40 to the sheet P. The process unit 40 includes a photosensitive drum 11, a cleaning unit 13 arranged around the photosensitive drum 11, a charging roller 17, a developing roller 12, and a developer container 230 including a supply unit 200 and a storage unit 18 that stores toner. The transfer roller 7*a* is disposed on the transfer portion 7 (hereinafter, also referred to as a transfer unit), and is biased toward the photosensitive drum 11 by a biasing member (not illustrated).

The photosensitive drum 11 as an image bearing member is a photosensitive member molded in a cylindrical shape. The photosensitive drum 11 of the present embodiment has a photosensitive layer formed of a negatively charged organic photosensitive member on a drum-shaped substrate formed of aluminum. In addition, the photosensitive drum 11 as an image bearing member is rotationally driven at a predetermined process speed in a predetermined direction (a direction R in FIG. 2) by a motor.

The charging roller 17 is in contact with the photosensitive drum 11 with a predetermined pressure contact force to form a charging unit. In addition, a desired charging voltage is applied by the charging high-voltage power supply, whereby the surface of the photosensitive drum 11 is uniformly charged to a predetermined potential. In the present exemplary embodiment, photosensitive drum 11 is negatively charged by charging roller 17.

The scanner unit 50 scans and exposes the surface of the photosensitive drum 11 by irradiating the photosensitive drum 11 with laser light corresponding to image information input from an external device using a polygon mirror. By this exposure, an electrostatic latent image corresponding to image information is formed on the surface of the photosensitive drum 11. Note that the scanner unit 50 is not limited to the laser scanner device, and for example, an LED exposing unit having an LED array in which a plurality of LEDs are arranged along a longitudinal direction of the photosensitive drum 11 may be adopted.

Figure 3:
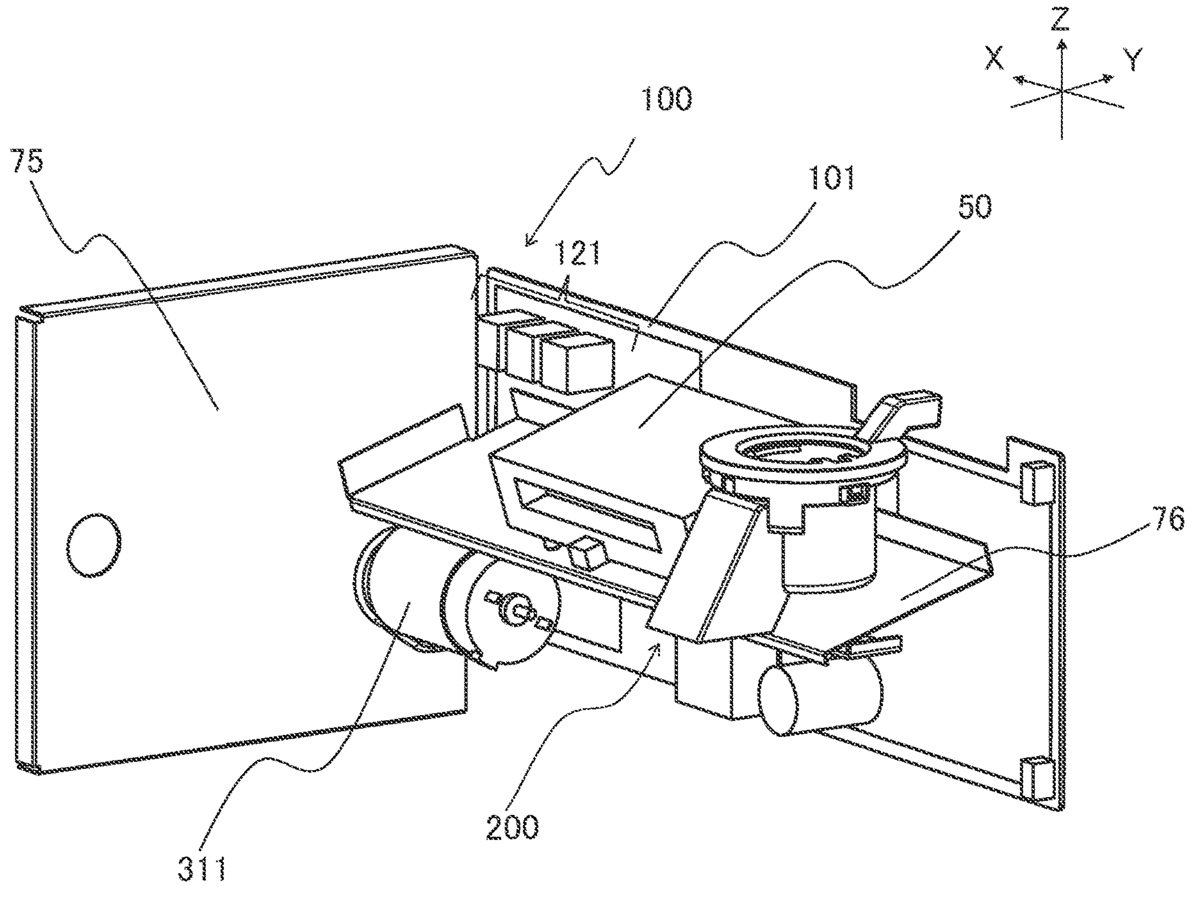
FIG. 3 is a perspective view illustrating a holding portion of a scanner unit.

As illustrated in FIG. 3, the apparatus body 2 of the image forming apparatus 1 includes a left plate frame 74 and a right plate frame 75, and a scanner holding member 76 is suspended on the left plate frame 74 and the right plate frame 75. The scanner holding member 76 holds a scanner unit 50. The scanner holding member 76 is fixed to the right plate frame 75 and the left plate frame 74 (not illustrated in FIG. 3), and is configured to pass below the supply unit 200 and bridge between the two frames. On the other hand, a drive motor 311 serving as a drive source is attached to the right plate frame 75, and a gear (pinion gear) connected to the drive motor 311 is provided on a positive side (right side) in the X direction of the right plate frame 75. The driving force of the drive motor 311 is transmitted to a feeding roller 5*a* and the photosensitive drum 11 via the gear.

The developing roller 12 is rotatably supported by the storage unit 18 as a toner storage unit. The developing roller 12 is disposed at an opening portion of the developer container 230 including the storage unit 18 so as to face the photosensitive drum 11. Note that the storage unit 18 may be provided with a supply roller that applies toner as a developer stored in the storage unit 18 to the surface of the developing roller 12.

The process unit 40 of the present embodiment uses a contact development method as a development method. That is, a toner layer carried on the developing roller 12 comes into contact with the photosensitive drum 11 at a developing portion (developing region) where the photosensitive drum 11 and the developing roller 12 face each other. A developing voltage is applied to the developing roller 12 by a developing high-voltage power supply. Under the developing voltage, the toner carried on the developing roller 12 is transferred from the developing roller 12 to the surface of the photosensitive drum 11 according to the potential distribution on the surface of the photosensitive drum 11, whereby the electrostatic latent image is developed into the toner image.

In addition, the toner of the present embodiment does not contain a magnetic component, and is a so-called nonmagnetic one-component developer in which the toner is carried on the developing roller 12 mainly by an intermolecular force or an electrostatic force (mirror image force). However, a one-component developer containing a magnetic component may be used. In addition, the one-component developer may contain an additive (For example, wax or silica fine particles) for adjusting fluidity and charging performance of the toner in addition to the toner particles. As the developer, a two-component developer composed of a nonmagnetic toner and a magnetic carrier may be used. When a developer having magnetism is used, for example, a cylindrical developing sleeve in which a magnet is disposed is used as the developer bearing member.

The fixing unit 9 is a heat fixing type unit that performs image fixing processing by heating and pressurizing toner on a sheet to melt the toner. The fixing unit 9 includes a heating roller 9*a* incorporating a fixing heater 9*c*, and a pressure roller 9*b* that presses against the heating roller 9*a*. In the present exemplary embodiment, the heating roller 9*a* is formed of a cylindrical heating film.

The feeding unit 30 includes a cassette 4 on which the sheet P is loaded, a pickup roller 3 as a conveying unit, a feeding roller 5*a*, and a separation roller 5*b*. A front cover 70 is provided on a part of the end surface on the front side of the image forming apparatus 1, and the front cover 70 covers the circuit board 100. A housing 72 includes the front cover 70, a sheet discharge tray 14, a back cover 73 (see FIG. 4), and an exterior cover 71 constituting an exterior of the image forming apparatus 1 other than the described above, and supports the back cover 73 in an openable and closable manner. In the housing 72, a discharge port 15 through which a sheet to be discharged to the sheet discharge tray 14 passes is formed.

As illustrated in FIG. 2, the image forming apparatus 1 includes a circuit board 100. The circuit board 100 includes a wiring board 101 made of an insulating material and electronic components 111 and 121 soldered to the wiring board 101. Since conductor wiring is provided on or inside the board of the wiring board 101, the electronic components 111 and 121 are electrically connected. The circuit board 100 has a function of converting an alternating current supplied from the outside of the image forming apparatus 1 into a direct current and a function of converting an input voltage in order to obtain a predetermined voltage value necessary for the image forming process.

The circuit board 100 is disposed in such a direction that the surface of the wiring board 101 on which the electronic components 111 and 121 are mounted intersects with the discharge direction. Further, the wiring board 101 is provided between the front cover 70 and the scanner unit 50 in the discharge direction. The electronic components 111 and 121 are provided on a surface facing the scanner unit 50 on the wiring board 101.

Next, an image forming operation of the image forming apparatus 1 will be described. When an image forming command is input to the image forming apparatus 1, an image forming process by the image forming unit is started on the basis of image information input from an external computer connected to the image forming apparatus 1. The scanner unit 50 irradiates the photosensitive drum 11 with laser light on the basis of the input image information. At this time, the photosensitive drum 11 is charged in advance by the charging roller 17, and an electrostatic latent image is formed on the photosensitive drum 11 by being irradiated with laser light. Thereafter, the electrostatic latent image is developed by the developing roller 12, and a toner image is formed on the photosensitive drum 11.

In parallel with the above-described image forming process, the pickup roller 3 of the feeding unit 30 feeds the sheet P supported by the cassette 4. The sheet P is separated one by one by the feeding roller 5*a* and the separation roller 5*b*, and is conveyed to a conveyance roller pair 5*c*. Then, the sheet P is conveyed toward a transfer nip N1 as an image forming unit formed by the transfer roller 7*a* and the photosensitive drum 11 by the conveyance roller pair 5*c* as a conveying unit.

A transfer voltage is applied to the transfer roller 7*a* from a transfer high-voltage power supply, and the toner image carried on the photosensitive drum 11 is transferred to the sheet P conveyed by the conveyance roller pair 5*c*. The sheet P to which the toner image has been transferred is conveyed to the fixing unit 9, and the toner image is heated and pressurized when passing through the nip portion between the heating roller 9*a* and the pressure roller 9*b* of the fixing unit 9. As a result, the toner particles are melted and then fixed, whereby the toner image is fixed on the sheet P. The sheet P having passed through the fixing unit 9 is discharged from the discharge port 15 to the outside of the image forming apparatus 1 (outside the apparatus) by the sheet discharge roller pair 10, and is stacked on the sheet discharge tray 14.

In a case where images are formed on both sides of the sheet P, the sheet discharge roller pair 10 guides the sheet P to the duplex conveyance path 16 by switching back the sheet P on which the image is formed on the first surface. The sheet P guided to the duplex conveyance path 16 is conveyed again toward the transfer roller 7*a* by the duplex conveyance roller pair 5*d*. After an image is formed on the second surface of the sheet P by the transfer roller 7*a*, the sheet P is discharged to the outside of the apparatus by the sheet discharge roller pair 10. After the toner image is transferred to the sheet P, the toner remaining on the photosensitive drum 11 is cleaned by the cleaning unit 13.

Note that the image forming apparatus 1 of the present embodiment has a configuration capable of forming images on both surfaces of the sheet P using the duplex conveyance path 16, but is not limited thereto. For example, the duplex conveyance path 16 may not be provided, and the image forming apparatus 1 may be configured to be able to form an image only on one side of the sheet P.

Configuration of Back Cover

Figure 4A:
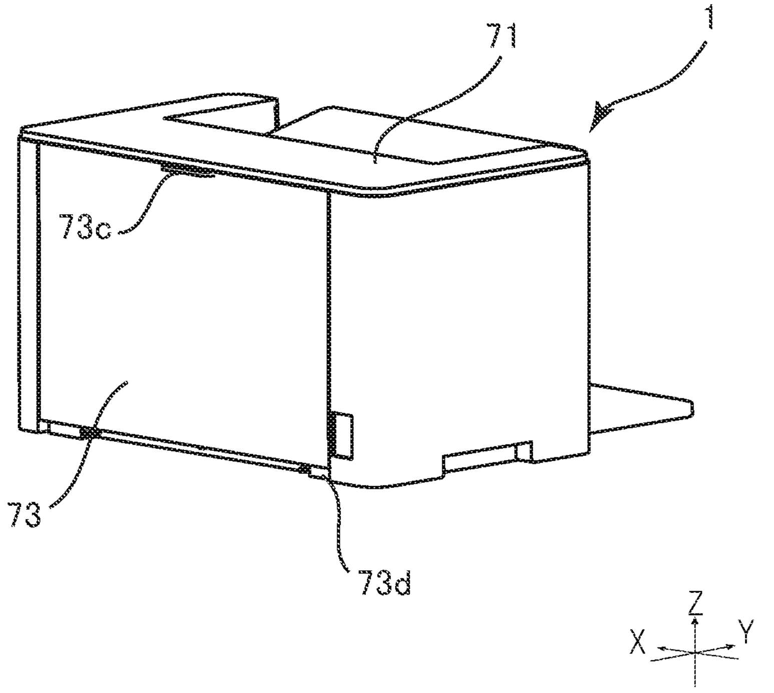
FIG. 4A is a perspective view illustrating an opening and closing operation of a back cover and a transfer unit, and is a view illustrating a case where the back cover is in a closed state.
Figure 4B:
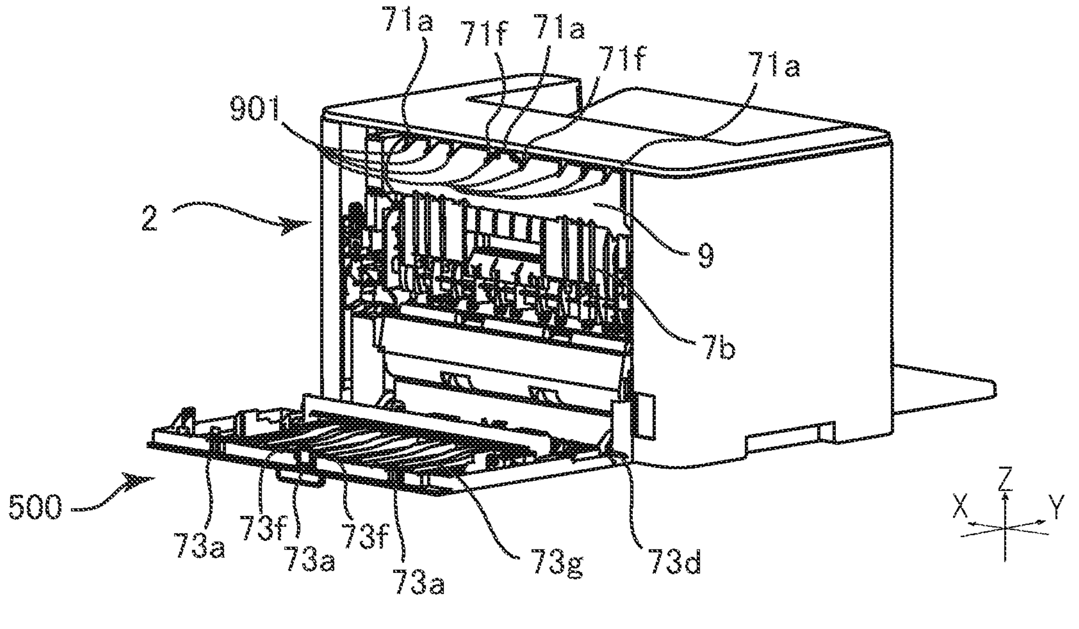
FIG. 4B is a perspective view illustrating an opening and closing operation of the back cover and the transfer unit, and is a view illustrating a case where the back cover is in an open state.
Figure 5A:
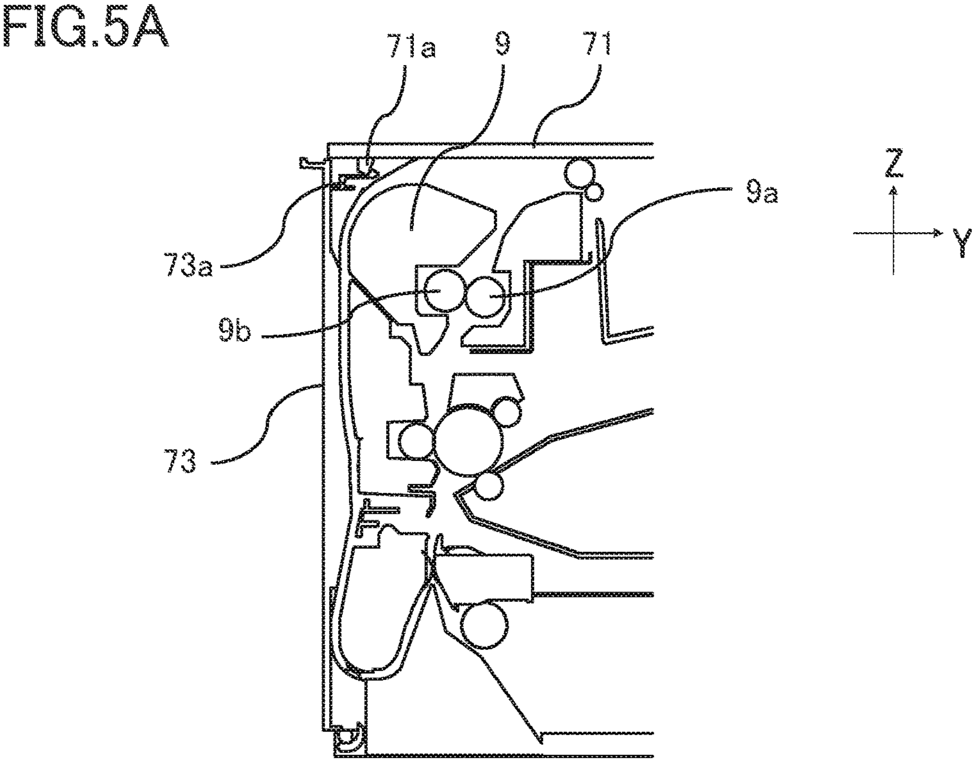
FIG. 5A is a cross-sectional view of the image forming apparatus at a position corresponding to a first positioning portion, and is a view illustrating a case where the back cover is in a closed state.
Figure 5B:
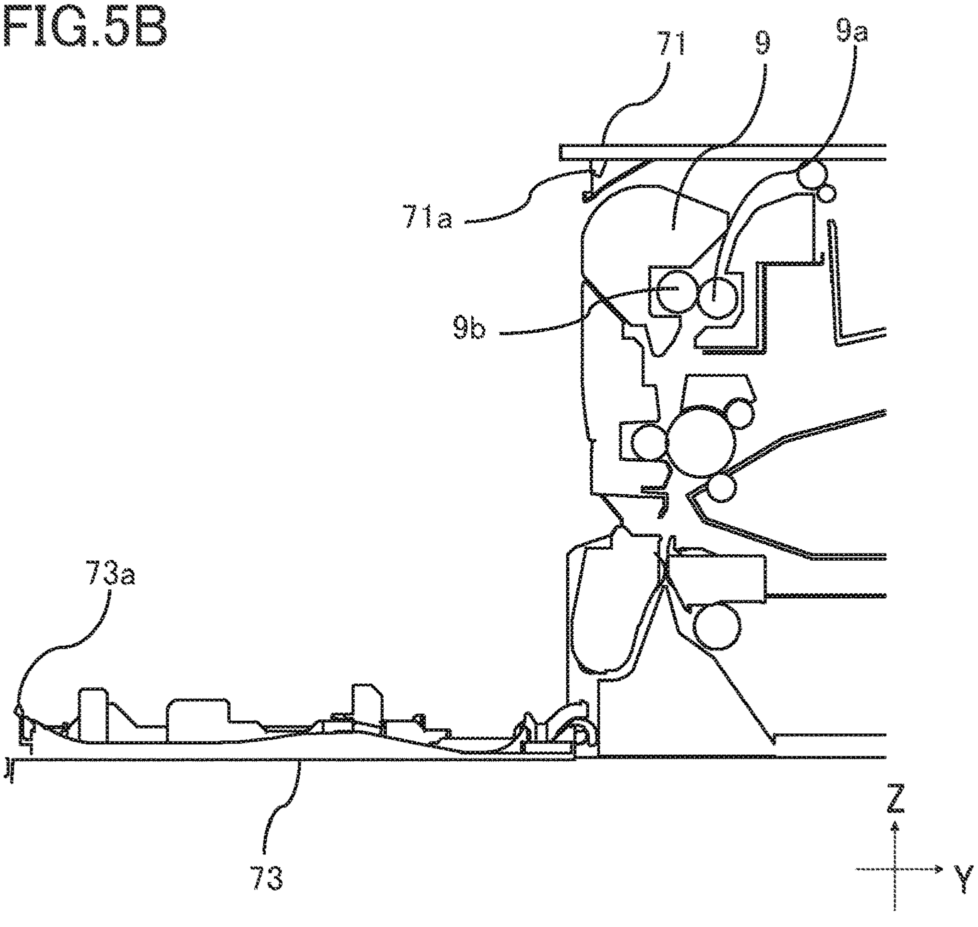
FIG. 5B is a cross-sectional view of the image forming apparatus at a position corresponding to the first positioning portion, and is a view illustrating a case where the back cover is in an open state.
Figure 6A:
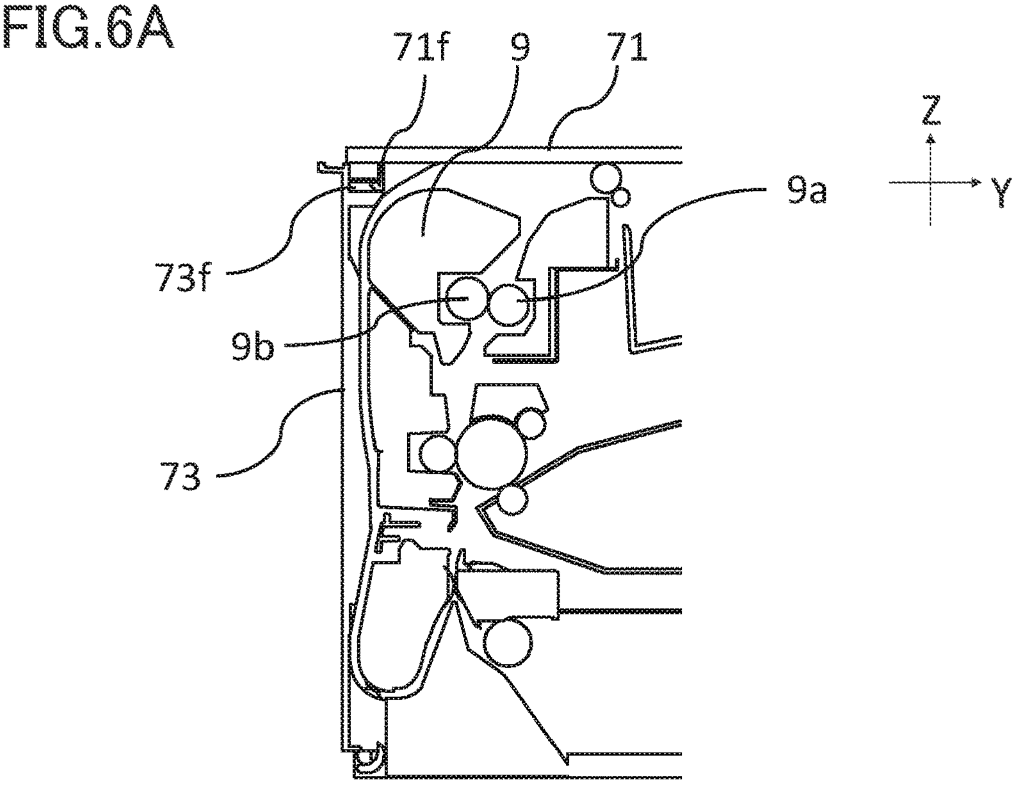
FIG. 6A is a cross-sectional view of the image forming apparatus at a position corresponding to a second positioning portion, and is a view illustrating a case where the back cover is in a closed state.
Figure 6B:
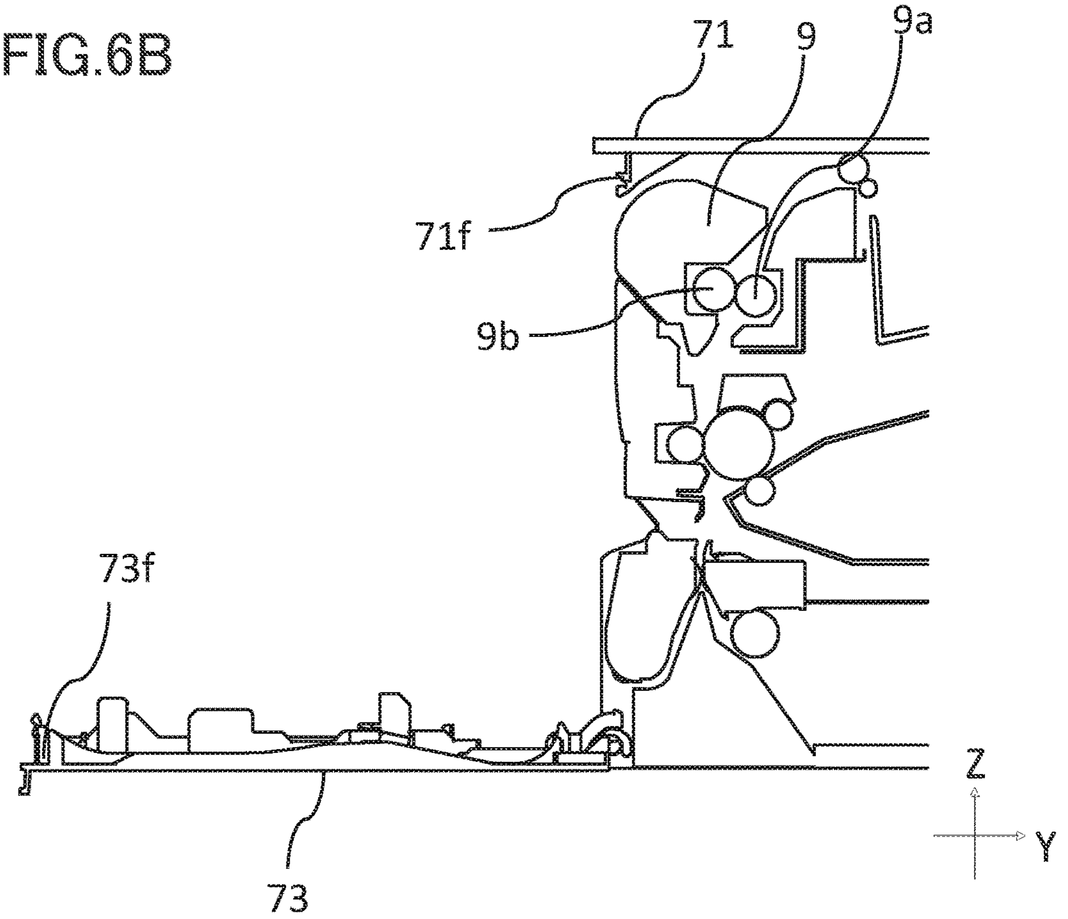
FIG. 6B is a cross-sectional view of the image forming apparatus at a position corresponding to the second positioning portion, and is a view illustrating a case where the back cover is in an open state.
Figure 7A:
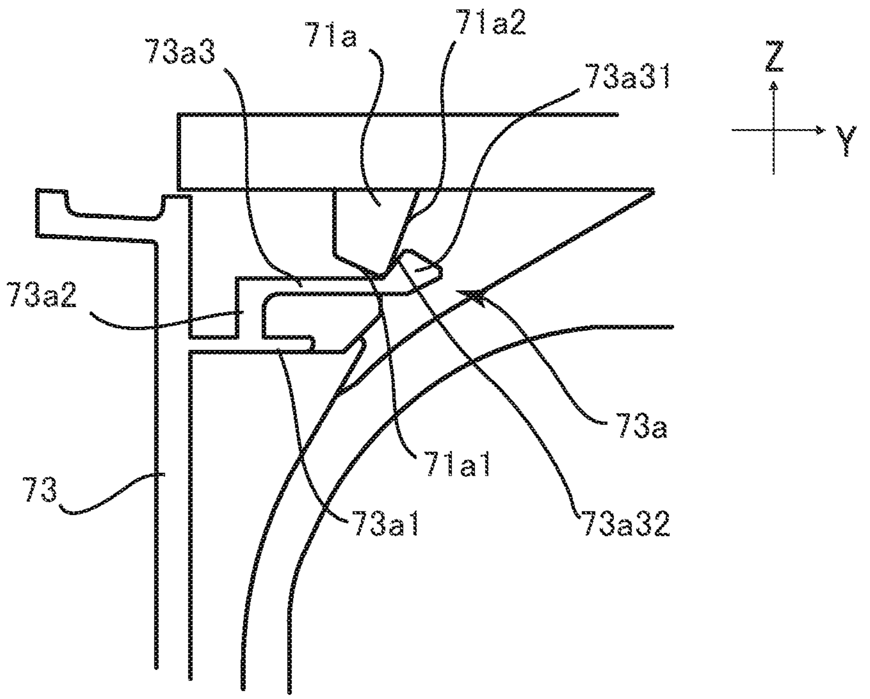
FIG. 7A is an enlarged view illustrating the first positioning portion.
Figure 7B:
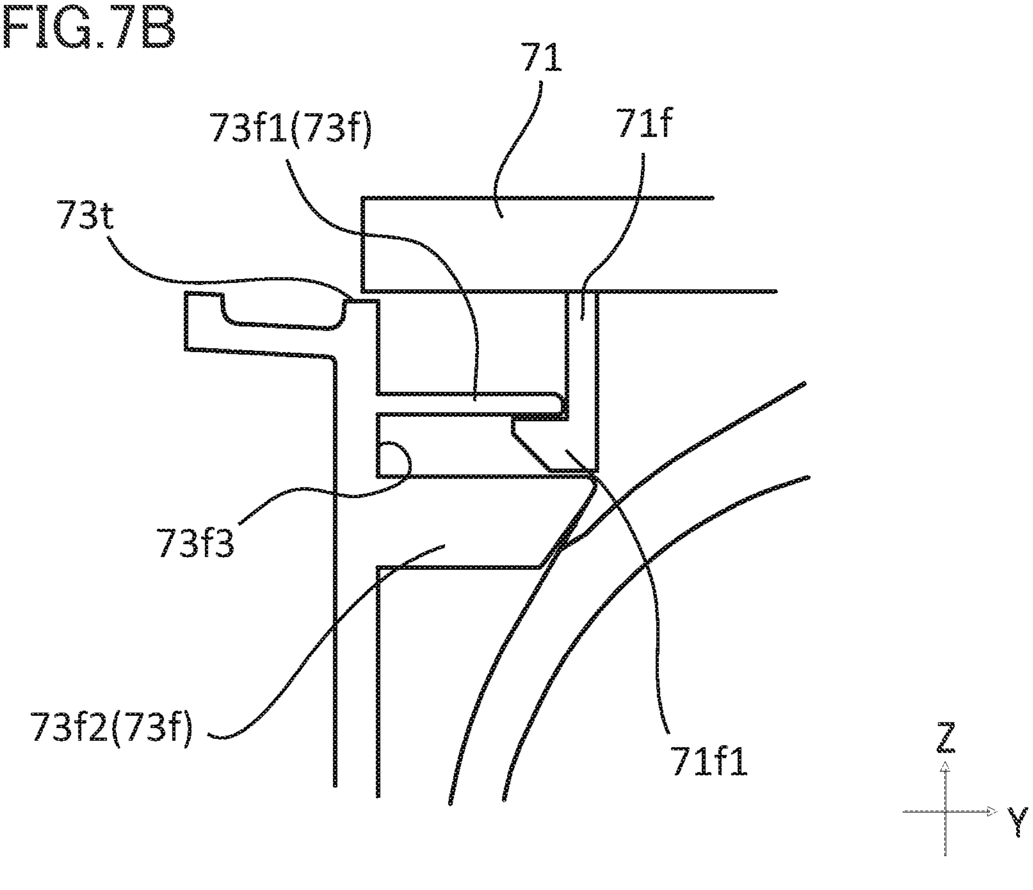
FIG. 7B is an enlarged view illustrating the second positioning portion.

FIGS. 4A and 4B are perspective views illustrating an opening and closing operation of the back cover and the transfer unit, FIGS. 5A to 6B are cross-sectional views illustrating a relationship between the back cover and the exterior cover, and FIGS. 7A and 7B are enlarged cross-sectional views illustrating a relationship between the back cover and the exterior cover. As illustrated in FIGS. 4A and 4B, the exterior of the apparatus body 2 in which the process unit 40 and the fixing unit 9 are incorporated is configured by an exterior cover 71, a back cover 73, and the like.

Here, the back side is the negative side in the Y direction, but in the image forming apparatus 1 of the present embodiment, the back side corresponds to the upstream in the discharge direction in which the sheet P is discharged from the discharge port 15 or the downstream in the feeding direction in which the sheet P is fed from the cassette 4. Alternatively, the surface on which a user interface unit 300 including the button or the operation panel illustrated in FIG. 1 is provided can also be expressed as the front side, and the back side can also be expressed as the opposite side. That is, when a user operates the user interface unit 300, the side facing the user interface unit can be expressed as a front side, and the opposite side can be expressed as a back side.

In the present embodiment, the exterior cover 71 is a fixed cover, and constitutes a part of a front surface and a side surface of apparatus body 2. The exterior cover 71 also constitutes an upper surface of apparatus body 2, and the upper surface portion is located above the fixing unit 9.

The back cover 73 is configured to constitute the back surface of the apparatus body 2, and is an opening and closing cover that can be opened and closed by rotating around a hinge portion 73*d* as a cover engagement portion. For this reason, the back cover 73 can be opened and closed between the closed position illustrated in FIG. 4A and the open position illustrated in FIG. 4B by holding and opening and closing the grip portion 73*c* provided on the outer surface of the back cover 73.

As illustrated in FIG. 4B, the inner surface of the back cover 73 is provided with a plurality of conveyance ribs 73*g* (first conveyance guides) for guiding the sheet P. The conveyance rib 73*g* forms an outer surface of the duplex conveyance path 16 together with the conveyance rib 7*b* formed on the back side of the transfer portion 7 of the process unit 40. Therefore, when the back cover 73 is opened, the duplex conveyance path 16 is opened, and the jammed sheet can be removed in the duplex conveyance path 16. When the back cover 73 is opened, the back side of the process unit 40 and the back side of the fixing unit 9 are exposed. Then, in the image forming apparatus 1 according to the present embodiment, the process unit 40 and the fixing unit 9 can be removed from the back side in a state where the back cover 73 is opened.

As described above, in the configuration of the present embodiment, it is possible to arrange the circuit board 100 in a space on the front side of the image forming apparatus 1 by configuring the image forming apparatus 1 such that a user and a service person can collectively perform maintenance work from the back side of the image forming apparatus 1.

As illustrated in FIG. 4B, a plurality of conveyance ribs 901 (second conveyance guides) for guiding the sheet P is provided on the inner surface of the exterior cover 71. The conveyance rib 901 forms a part of the duplex conveyance path 16 similarly to the conveyance rib 73*g* described above. The conveyance rib 901 may be formed integrally with the exterior cover 71, or may be a separate member as described in second embodiment described below.

The pressure roller 9*b* of the fixing unit 9 abuts on and separates from the heating roller 9*a* in conjunction with opening and closing of the back cover 73 by a link (not illustrated). Therefore, when the duplex conveyance path 16 is opened, the pressure roller 9*b* of the fixing unit 9 is in a separated state, and the contact pressure with the heating roller 9*a* is released.

Next, a positioning portion 500 that performs positioning for positioning the relative positional relationship between the exterior cover 71 and the back cover 73 will be described. The positioning portion 500 includes first positioning portions 73*a* and 71*a* that perform positioning in the rotation direction (Y direction) of the back cover 73, and second positioning portions 73*f* and 71*f* that position relative positions of the back cover 73 and the exterior cover 71 in the vertical direction.

The first positioning portions 73*a* and 71*a* include engagement portions (third engagement portions) 73*a* provided at a total of three positions near both ends in the X direction and near the center in the X direction at the upper end of the back cover 73. In addition, an engagement portion (fourth engagement portion) 71*a* provided in an upper portion of the exterior cover 71 is provided corresponding to the engagement portion 73*a* on the back cover 73 side.

These engagement portions 73*a* and 71*a* are configured to be engaged when the back cover 73 rotates from the open position illustrated in FIG. 5B to the closed position illustrated in FIG. 5A. More specifically, as illustrated in FIG. 7A, the engagement portion 73*a* is a protruding portion protruding from the inner surface of the back cover 73 toward the inside of the apparatus body 2, and includes a support portion 73*a*1, an erected portion 73*a*2, and a claw portion 73*a*3.

The support portion 73*al* protrudes from the inner surface of the back cover 73, and supports the erected portion 73*a*2 erected upward at a substantially central portion of the support portion 73*al*. A claw portion 73*a*3 extending toward the inside of the apparatus body 2 extends from the upper end of the erected portion 73*a*2, and an engaging claw 73*a*31 to be engaged with the engagement portion 71*a* on the exterior cover 71 side is provided at the tip of the claw portion 73*a*3.

A tip portion of the engaging claw 73*a*31 tapers toward the tip, and when the back cover 73 rotates from the open position to the closed position, the tip portion abuts on the inclined surface 71*al* on the outer surface side of the engagement portion 71*a* on the exterior cover 71 side. When the back cover 73 further rotates from this state, the engagement portion 73*a* is bent by elasticity of the claw portion 73*a*3 and the like, and the tip portion of the engaging claw 73*a*31 goes over the engagement portion 71*a* on the exterior cover 71 side.

On the rear end side of the engaging claw 73*a*31, an inclined surface 73*a*32 inclined in a direction opposite to the tip portion (inclined downward toward the outside) is provided. Therefore, when the tip portion of the engaging claw 73*a*31 gets over the engagement portion 71*a* on the exterior cover 71 side, the back cover 73 is drawn into the machine body along the inclination of the inclined surface 73*a*32. Then, the inclined surface 73*a*32 engages with the inclined surface 71*a*2 on the inner side of the engagement portion 71*a* inclined in the direction opposite to the inclined surface 71*al* on the outer surface side, whereby the back cover 73 is held at the closed position and is positioned in the rotation direction (Y direction).

The second positioning portions 73*f* and 71*f* include a total of two engagement portions (first engagement portions) 73*f* provided in the vicinity of the engagement portion 73*a* in the vicinity of the center in the X direction of the back cover 73. In addition, the second positioning portions 73*f* and 71*f* include an engagement portion (second engagement portion) 71*f* provided in an upper portion of the exterior cover 71 corresponding to the engagement portion 73*f* on the back cover 73 side.

These engagement portions 73*a* and 71*a* are configured to be engaged when the back cover 73 rotates from the open position illustrated in FIG. 6B to the closed position illustrated in FIG. 6A. More specifically, as illustrated in FIG. 7B, the engagement portion 73*f* is a protruding portion protruding from the inner surface of the back cover 73 toward the inside of the apparatus body 2, and includes a pair of protrusions 73*f*1 and 73*f*2 provided with a predetermined gap in the vertical direction.

Among the pair of protrusions 73*f*1 and 73*f*2, the protrusion 73*f*1 on the upper side is a first restricting portion that defines a restricting position on the upper side in the relative positional relationship between the back cover 73 and the exterior cover 71. The protrusion 73*f*2 on the lower side serves as a second restricting portion that defines a restricting position on the lower side in the relative positional relationship between the back cover 73 and the exterior cover 71.

The engagement portion 71*f* on the exterior cover 71 side is a claw portion that engages with the engaging groove 73*f*3 between the first and second protrusions 73*f*1 and 73*f*2, protrudes downward from the inner surface of the exterior cover upper surface, and an engaging claw 71*f*1 that engages with the engaging groove 73*f*3 is formed at the lower end thereof.

Therefore, when the back cover 73 rotates from the open position to the closed position, the engagement groove 73*f*3 approaches the engaging claw 71*f*1. At this time, when exterior cover 71 is shifted upward with respect to back cover 73, the first protrusion 73*f*1 and the engaging claw 71*f*1 collide with each other, and when exterior cover 71 is shifted downward, the second protrusion 73*f*2 and the engaging claw 71*f*1 collide with each other. Then, as the rotation of the back cover 73 progresses, the relative positional relationship between the back cover 73 and the exterior cover 71 is aligned such that the engaging claw 71*f*1 enters the engagement groove 73*f*3. The back cover 73 and the exterior cover 71 are aligned in the vertical direction until the back cover 73 is in the open position.

As described above, in the present embodiment, the relative position between back cover 73 and exterior cover 71 is determined by positioning portion 500. In particular, the relative positions of the back cover 73 and the exterior cover 71 in the vertical direction (Z direction) are positioned by the engagement portions 73*f* and 71*f*. Therefore, at the boundary portion between the upper edge 73*t* of the back cover 73 in the closed state and the exterior cover 71, the gap between the back cover 73 and the exterior cover 71 can be easily managed, and the gap can be made as small as possible. That is, the boundary portion between the back cover 73, the fixed cover, and the exterior cover 71 can be formed with high accuracy. In addition, the back cover 73 can correct warpage in molding of the exterior cover 71 and deformation due to heat of the fixing heater 9*c* or the like. As a result, it is not necessary to secure heat resistance rigidity as the exterior cover 71 alone, and downsizing and cost reduction as the main body can be achieved.

When the back cover 73 is closed, the conveyance rib 73*g* and the conveyance rib 901 are connected to each other, and both function as guides for guiding the sheet P. In the present exemplary embodiment, not only the gap between back cover 73 and exterior cover 71 can be reduced, but also conveyance rib 73*g* and conveyance rib 901 can be positioned with high accuracy when back cover 73 is closed. As a result, there is also an effect that the conveyability of the sheet P in the duplex conveyance path 16 can be improved.

Second Embodiment

Next, a second embodiment will be described. In the first embodiment described above, the engagement portions 71*a* and 71*f* are integrally formed with the exterior cover 71, but the present embodiment is different from the first embodiment described above in that the engagement portions 71*a* and 71*f* are formed on a conveyance rib holding portion. Therefore, in the following description, only differences from the first embodiment will be described, and description of other configurations will be omitted.

Figure 8A:
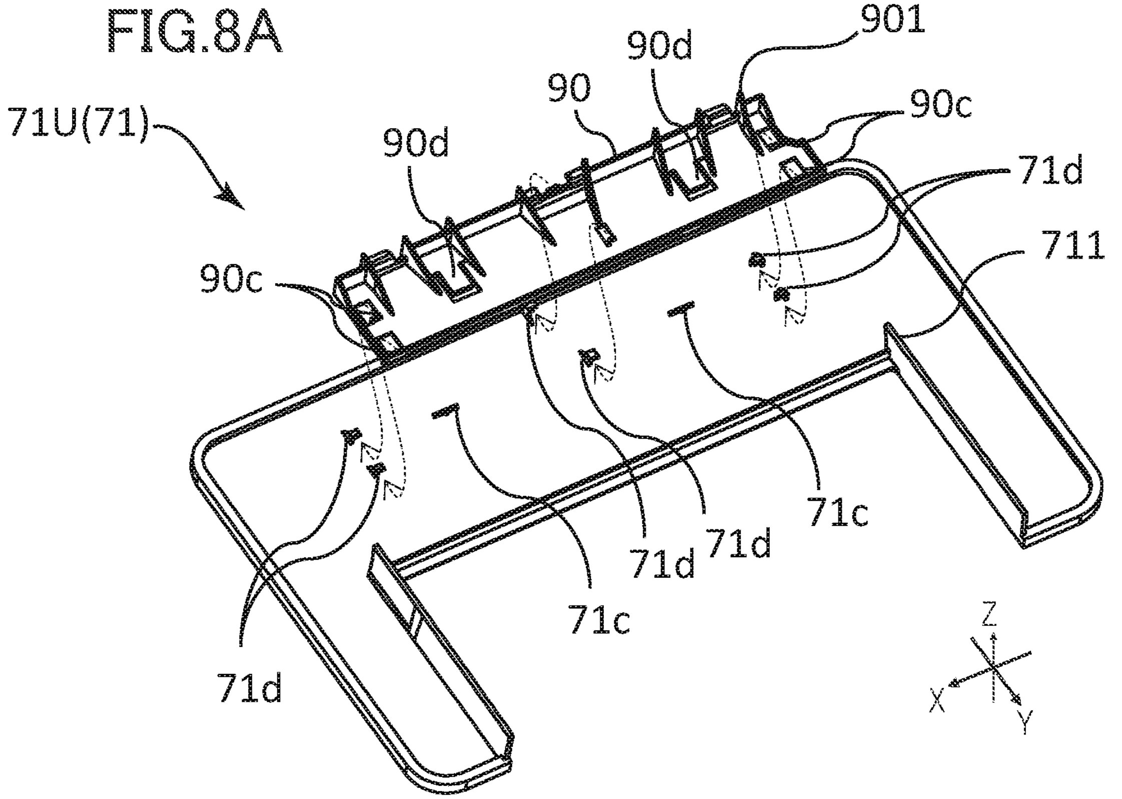
FIG. 8A is an exploded view illustrating an exterior cover according to a second embodiment.
Figure 8B:
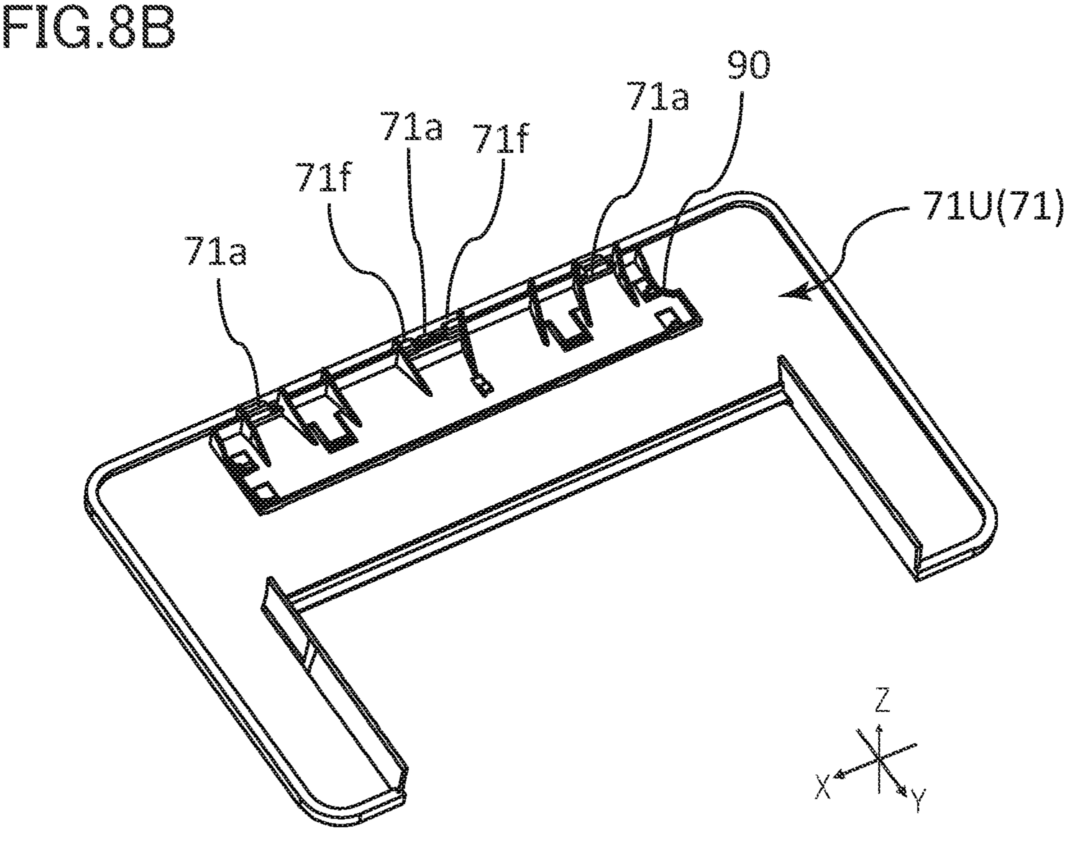
FIG. 8B is a perspective view illustrating the exterior cover according to the second embodiment.
Figure 9A:
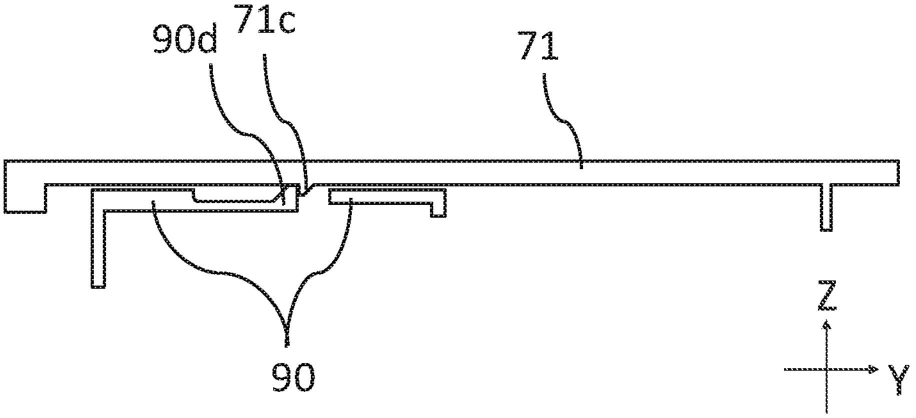
FIG. 9A is a cross-sectional view illustrating an exterior cover according to the second embodiment.
Figure 9B:
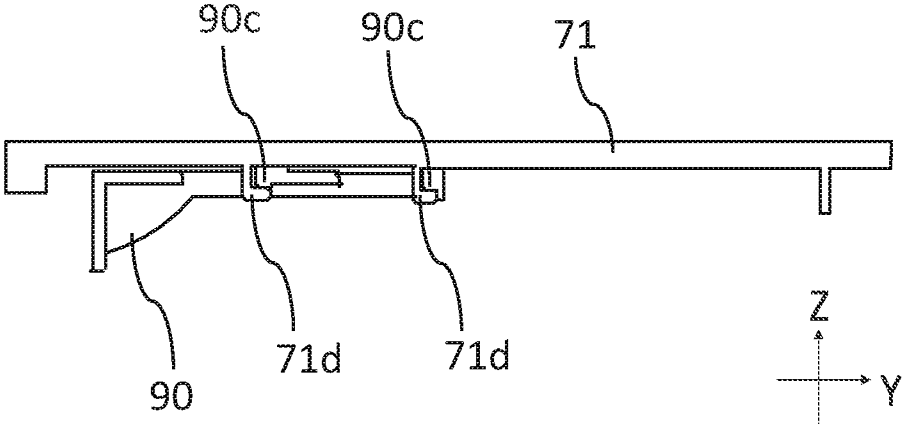
FIG. 9B is a cross-sectional view of the exterior cover at a position different from that in FIG. 9A.

FIGS. 8A and 8B are perspective views of the exterior cover 71 and a conveyance rib holding portion 90, and FIGS. 9A and 9B are cross-sectional views of the exterior cover 71 and the conveyance rib holding portion 90. As illustrated in FIG. 8A, an upper surface portion 71U of the exterior cover 71 includes a cover main body 711 and a conveyance rib holding portion 90 formed separately from the cover main body 711 and attached to the cover main body 711.

More specifically, as illustrated in FIGS. 8A, 9A, and 9B, a first mounting claw (conveyance rib holding portion positioning) 71*d* to which the conveyance rib holding portion 90 is attached is provided on the inner surface of the cover main body 711. The conveyance rib holding portion 90 is formed with an engagement hole 90*c* with which the first mounting claw 71*d* of the cover main body 711 is engaged, and the conveyance rib holding portion 90 is fixed in the Z direction and the X direction by the engagement of the first mounting claw 71*d* with the engagement hole 90*c*.

The conveyance rib holding portion 90 is provided with a second mounting claw 90*d*. The second mounting claw 90*d* overlaps the rib 71*c* provided on the exterior cover 71 in the Z direction of the main body, whereby the conveyance rib holding portion 90 is fixed to the exterior cover 71 in the Y direction.

Further, the conveyance rib holding portion 90 includes a conveyance rib 901 (second conveyance guide) that forms a duplex conveyance path (sheet conveyance path) 16 on the upstream in the sheet conveyance direction of the conveyance rib 73*g* of the back cover 73. As illustrated in FIG. 8B, the engagement portions 71*a* on the exterior cover 71 side forming the above-described first positioning portions are provided at three positions of the central portion and both end portions of the conveyance rib. Further, the engagement portions 71*f* on the exterior cover 71 side forming the above-described second positioning portion are provided at a total of two positions near the engagement portion 73*a* near the center.

As described above, either the engagement portion 71*a* on the exterior cover 71 side forming the first positioning portion or the engagement portion 71*f* on the exterior cover 71 side forming the second positioning portion can be formed and attached to a separate member such as the conveyance rib holding portion 90 instead of being integrally molded with the cover.

In the above-described embodiment, the second positioning portions 73*f* and 71*f* are arranged at the central portion in the X direction. This is because the central portion of the exterior cover 71 in the X direction is particularly susceptible to the heat of the fixing heater 9*c*. That is, when the image forming apparatus 1 is viewed from the back side (when viewed from the negative side toward the positive side in the Y direction), the exterior cover 71 may be deformed into a convex shape under the influence of heat. Therefore, by arranging the second positioning portions 73*f* and 71*f* at the central portion in the X direction, even when such deformation occurs, the gap between the exterior cover 71 and the back cover 73 is configured to be as small as possible.

The first positioning portions 73*a* and 71*a* need to be provided at least at positions on both ends in the X direction, and as described above, the second positioning portions 73*f* and 71*f* are arranged at the central portion in the X direction. That is, the second positioning portions 73*f* and 71*f* are provided at positions sandwiched by the plurality of first positioning portions 73*a* and 71*a* in the X direction. In other words, the third engagement portions 73*a* are provided at a plurality of positions of the back cover 73 in the rotation axis direction of the back cover 73. In addition, the fourth engagement portions 71*a* are provided at a plurality of positions of the fixed cover 71 in the rotation axis direction of the back cover 73. The first engagement portion 73*f* is disposed between the plurality of third engagement portions 73*a* in the rotation axis direction of the back cover 73. The second engagement portion 71*f* is disposed between the plurality of fourth engagement portions 71*a* in the rotation axis direction of the back cover 73.

In the above-described embodiment, the engagement portions 73*a* and 73*f* are provided on the back cover 73 by integral molding, but the present invention is not necessarily limited thereto, and may be formed on a member attached to the cover main body of the back cover 73.

In addition, the shapes of the first and second engagement portions 73*f* and 71*f* and the third and fourth engagement portions 73*a* and 71*a* may be configured to have a relationship opposite to that of the above-described embodiment. For example, the first and second restricting portions may be formed on the exterior cover 71 side, and the engaging claws may be formed on the back cover 73 side. That is, the first and second restricting portions may be formed on one side of the back cover 73 and the exterior cover 71, and the engaging claw may be formed on the other side of the back cover 73 and the exterior cover 71.

Furthermore, in the above-described embodiment, the first and second restricting portions are formed by the pair of protrusions 73*f*1 and 73*f*2, but the present invention is not limited thereto, and for example, the first and second restricting portions may be formed by the upper end portion, the lower end portion, and the like of the hole into which the engaging claw 71*f*1 penetrates. Furthermore, the invention according to the above-described embodiment can be applied to any type of image forming apparatus having an opening and closing cover, such as an inkjet type image forming apparatus, regardless of the electrophotographic image forming apparatus.

Third Embodiment

Hereinafter, a third embodiment will be described. In the following description, the same reference numerals are given to the same configurations as those of the first embodiment, and the description thereof will be omitted.

Control Block

Figure 10:
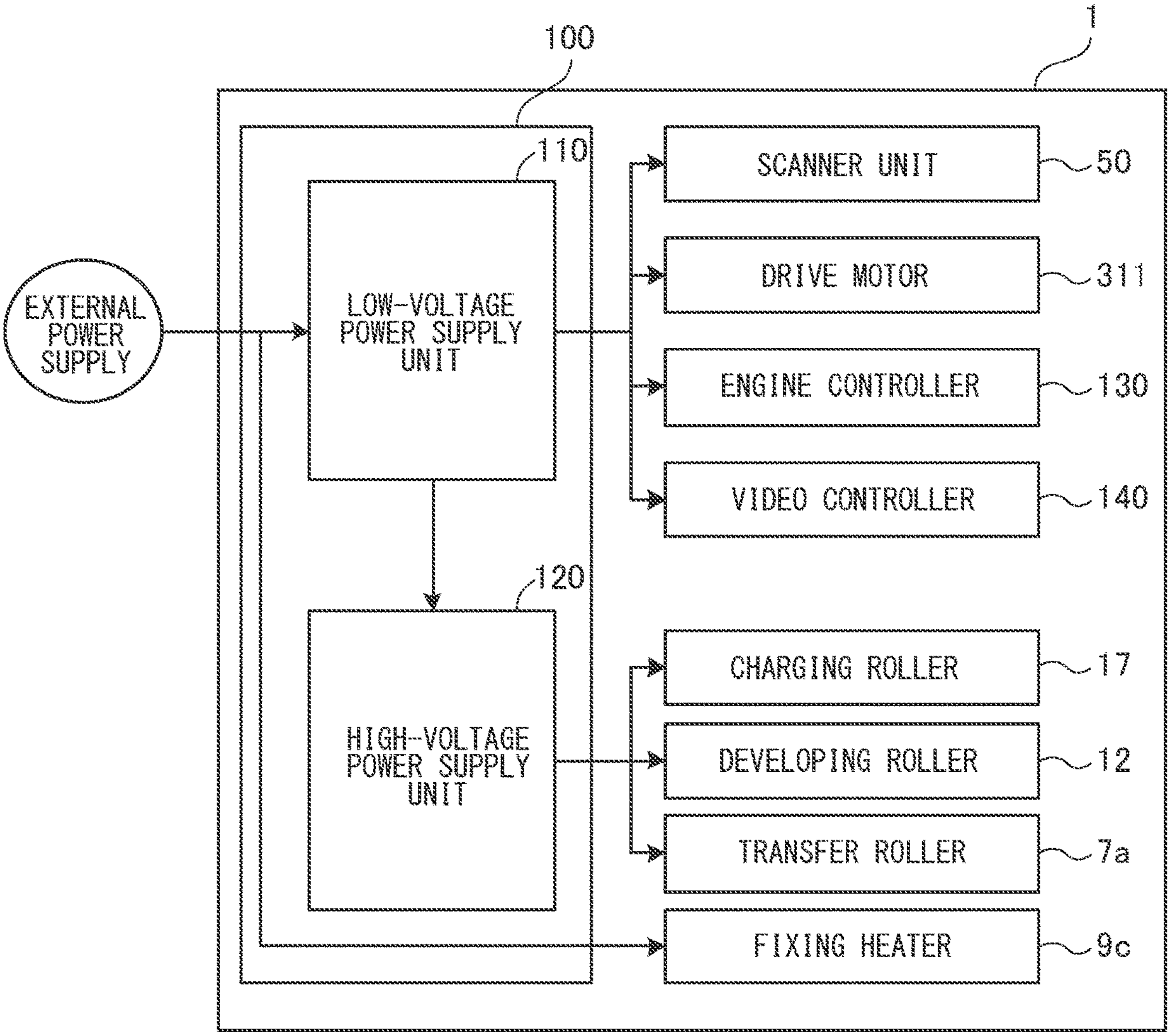
FIG. 10 is a block diagram for explaining a function of a power supply board according to a third embodiment.

FIG. 10 is a block diagram for explaining a function of the circuit board 100 according to the present exemplary embodiment. The circuit board 100 includes a low-voltage power supply unit 110 and a high-voltage power supply unit 120. The low-voltage power supply unit 110 takes in power from an external power supply via a power supply input unit (not illustrated) mounted on a substrate end portion, and converts an AC voltage into a stable DC voltage by a rectifying and smoothing circuit including an electrolytic capacitor. Thereafter, the low-voltage power supply unit 110 converts the DC voltage into a high-frequency AC voltage by a switching element such as a transistor, and then inputs the high-frequency AC voltage to the low-voltage power supply transforming unit. The low-voltage power supply transforming unit converts a high-frequency AC voltage, which is an input voltage, into an AC voltage (output voltage) having a desired voltage value. The low-voltage power supply unit 110 converts the AC voltage into a DC voltage again, and outputs the obtained DC voltage to the high-voltage power supply unit 120. In the low-voltage power supply unit 110, since the loss of each circuit component is expressed as heat, a heat sink (not illustrated) made of aluminum or iron is provided to dissipate heat.

The high-voltage power supply unit 120 converts a voltage (for example, 24 V) supplied from the low-voltage power supply unit 110 into a high voltage necessary for an image forming process such as charge, development, and transfer. The voltage supplied from the low-voltage power supply unit 110 is converted into a voltage for charging by a charging transforming unit, and is supplied to the charging roller 17. The voltage supplied from the low-voltage power supply unit 110 is converted into a voltage for developing by a developing transforming unit 123 and supplied to the developing roller 12. The voltage supplied from the low-voltage power supply unit 110 is converted into a voltage for transfer by a transfer transforming unit, and is supplied to the transfer roller 7*a*.

The low-voltage power supply unit 110 supplies a voltage (for example, 3.3 V or 5 V) not only to the high-voltage power supply unit 120 but also to the scanner unit 50, the drive motor 311, an engine controller 130, and a video controller 140. Here, the engine controller 130 plays a role of integrally controlling various process members. The engine controller 130 includes a central processing unit (CPU) (not illustrated), a random access memory (RAM) used for calculation and temporary storage of data necessary for controlling the image forming apparatus 1, a read only memory (ROM) for storing programs for controlling the image forming apparatus 1 and various data, and the like. The video controller 140 has a role of communicating with an external device such as a personal computer, receiving print data, and notifying the engine controller 130 of a result of analyzing the print data. The engine controller 130 and the video controller 140 may be provided on a substrate different from circuit board 100, or may be provided on the same substrate.

The AC power from the commercial power supply received by the power input unit is supplied not only to the low-voltage power supply unit 110 but also to the fixing heater 9*c*. The driving of the roller and the like in the fixing unit 9 is performed by the drive motor 311.

Positioning Configuration of Process Unit

Figure 11:
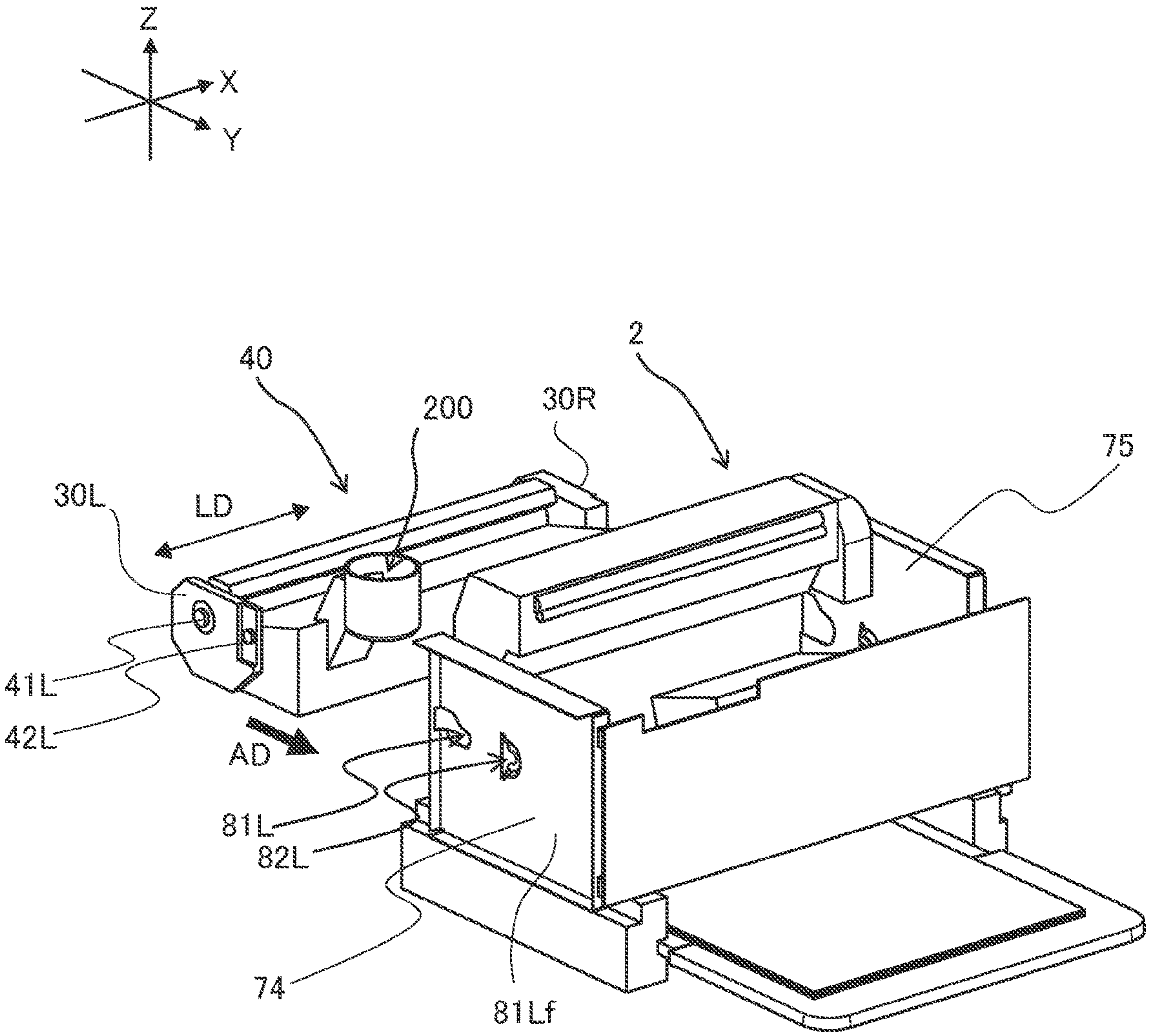
FIG. 11 is a perspective view illustrating an image forming apparatus in a state before attaching a process unit according to a third embodiment.
Figure 12A:
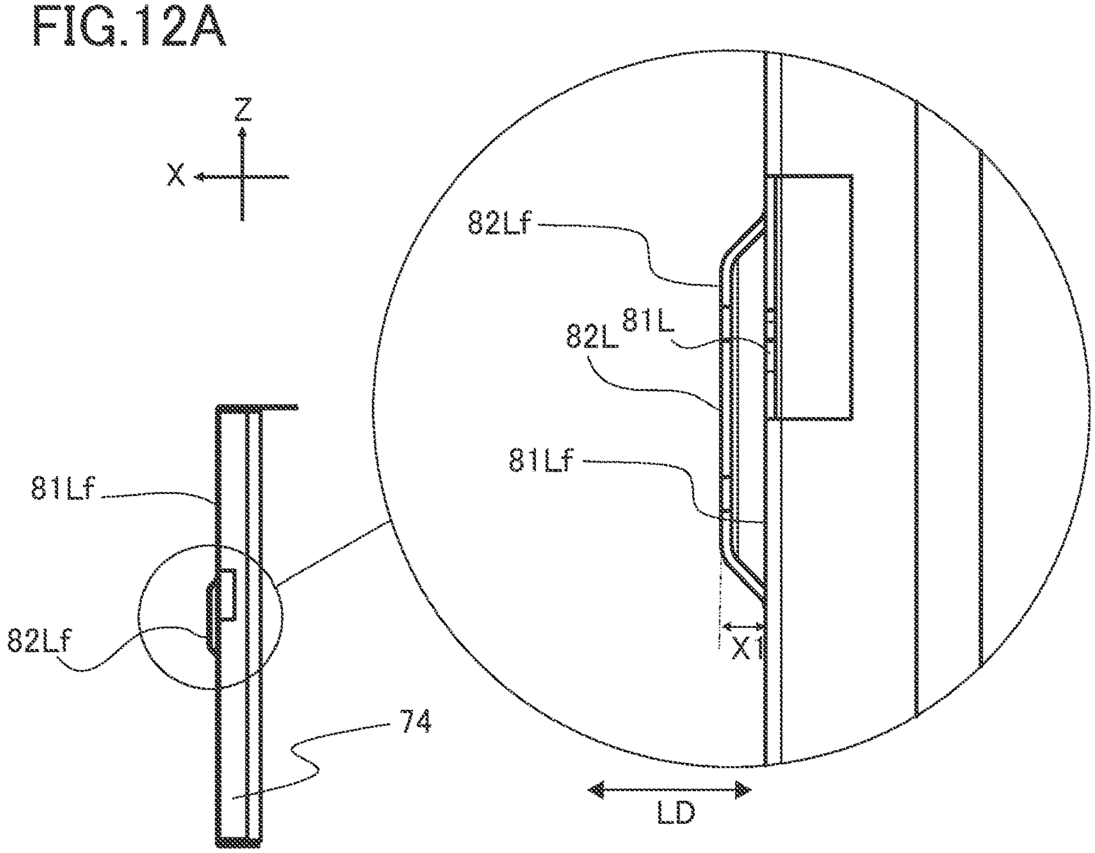
FIG. 12A is a rear view and an enlarged view illustrating a positioning configuration of the process unit by a left plate frame.
Figure 12B:
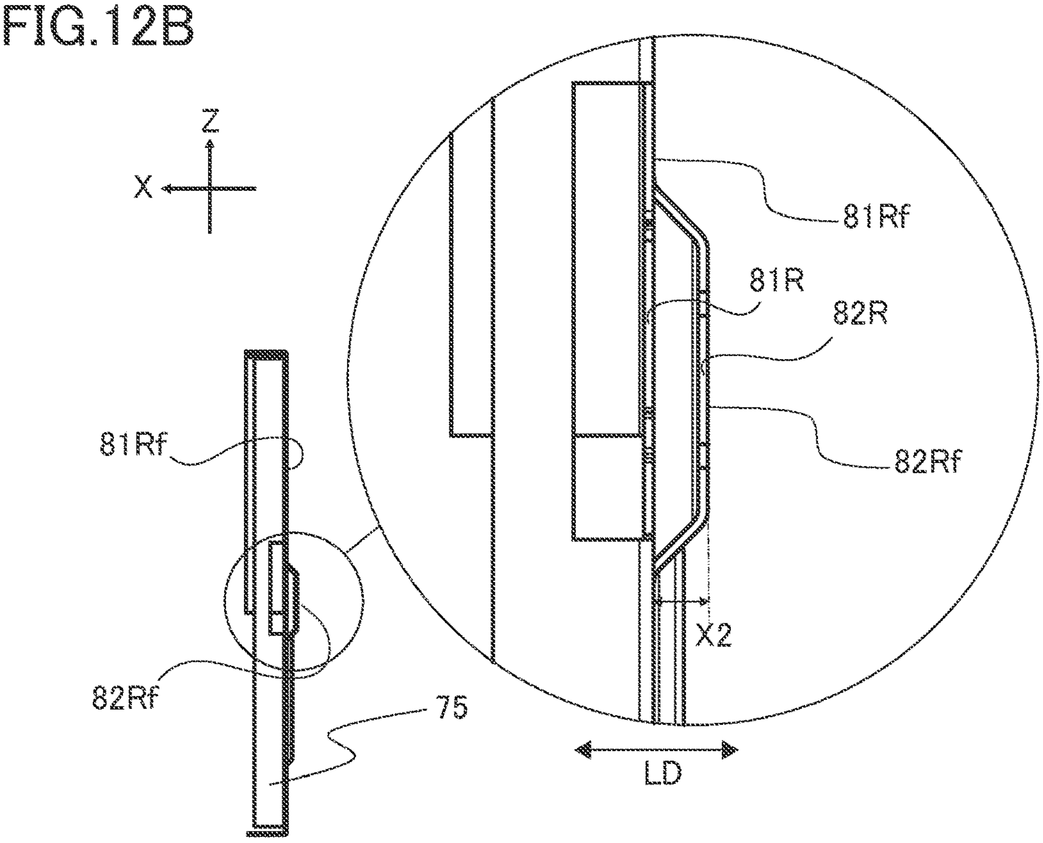
FIG. 12B is a rear view and an enlarged view illustrating a positioning configuration of the process unit by a right plate frame.

Next, a positioning configuration of the process unit 40 will be described with reference to FIGS. 11 to 13. FIG. 11 is a perspective view illustrating the image forming apparatus 1 in a state before the process unit 40 is attached. FIG. 12A is a rear view and an enlarged view illustrating a positioning configuration of the process unit 40 by the left plate frame 74, and FIG. 12B is a rear view and an enlarged view illustrating a positioning configuration of the process unit 40 by the right plate frame 75.

As illustrated in FIG. 11, the process unit 40 has a left side surface 30L and a right side surface 30R which are end surfaces in a longitudinal direction LD parallel to the X direction. The left side surface 30L is provided with a left positioning boss 41L and a left rotation restricting boss 42L, and the right side surface 30R is provided with a right positioning boss 41R (not illustrated) and a right rotation restricting boss 42R (not illustrated). The left positioning boss 41L and the right positioning boss 41R are disposed upstream of the left rotation restricting boss 42L and the right rotation restricting boss 42R, respectively, in an attachment direction AD of the process unit 40.

In the present embodiment, the positioning boss and the rotation restricting boss having a boss shape are provided in the process unit 40, but the present invention is not limited thereto. That is, the process unit 40 may be provided with a positioning portion and a rotation regulating portion that are not having the boss shape.

The apparatus body 2 of the image forming apparatus 1 includes the left plate frame 74 and the right plate frame 75 made of sheet metal members, and the left plate frame 74 and the right plate frame 75 face each other with a gap in the longitudinal direction LD.

As illustrated in FIGS. 11 and 12A, the left plate frame 74 has a left first surface 81Lf and a left second surface 82Lf extending in the attachment direction AD (Y direction) and the direction along the Z direction. The left second surface 82Lf is disposed inside the apparatus body 2 by a distance X1 from the left first surface 81Lf in the longitudinal direction LD by drawing the left first surface 81Lf. That is, the left first surface 81Lf and the left second surface 82Lf are not on the same plane. In the present embodiment, the left second surface 82Lf includes a surface parallel to the attachment direction AD (Y direction) and the Z direction, but is not limited thereto. For example, the left second surface 82Lf may be a curved surface along the attachment direction AD (Y direction) and the Z direction.

A left positioning portion 81L with which the left positioning boss 41L can be engaged is formed on the left first surface 81Lf, and the left positioning portion 81L is a notch with the upstream in the attachment direction AD opened. A left rotation restricting portion 82L with which the left rotation restricting boss 42L can be engaged is formed on the left second surface 82Lf, and the left rotation restricting portion 82L is a U-shaped notch opened on the upstream in the attachment direction AD. Since the left second surface 82Lf is formed by drawing, an inclined surface that guides the left positioning boss 41L toward the left positioning portion 81L may be formed.

Since the left first surface 81Lf and the left second surface 82Lf are provided apart from each other by the distance X1 in the longitudinal direction LD, the left rotation restricting portion 82L is also arranged apart from the left positioning portion 81L by the distance X1 in the longitudinal direction LD. In other words, the left rotation restricting portion 82L is disposed at a position different from the left positioning portion 81L in the longitudinal direction LD.

Similarly, as illustrated in FIGS. 11 and 12B, the right plate frame 75 has a right first surface 81Rf and a right second surface 82Rf extending along the attachment direction AD (Y direction) and the Z direction. The right second surface 82Rf is disposed inside the apparatus body 2 by a distance X2 from the right first surface 81Rf in the longitudinal direction LD by drawing the right first surface 81Rf. That is, the right first surface 81Rf and the right second surface 82Rf are not on the same plane. In the present embodiment, the right first surface 81Rf and the right second surface 82Rf are configured by surfaces parallel to the attachment direction AD (Y direction) and the Z direction, but the present invention is not limited thereto. For example, the right second surface 82Rf may be a curved surface along the attachment direction AD (Y direction) and the Z direction.

A right positioning portion 81R with which the right positioning boss 41R can be engaged is formed on the right first surface 81Rf, and the right positioning portion 81R is a notch with the upstream in the attachment direction AD opened. A right rotation restricting portion 82R with which the right rotation restricting boss 42R can be engaged is formed on the right second surface 82Rf, and the right rotation restricting portion 82R is a U-shaped notch opened on the upstream in the attachment direction AD. Since the right second surface 82Rf is formed by drawing, an inclined surface that guides the right positioning boss 41R toward the right positioning portion 81R may be formed.

Since the right first surface 81Rf and the right second surface 82Rf are provided apart from each other by the distance X2 in the longitudinal direction LD, the right rotation restricting portion 82R is also disposed apart from the right positioning portion 81R by the distance X2 in the longitudinal direction LD. In other words, the right rotation restricting portion 82R is disposed at a position different from the right positioning portion 81R in the longitudinal direction LD.

Figure 13:
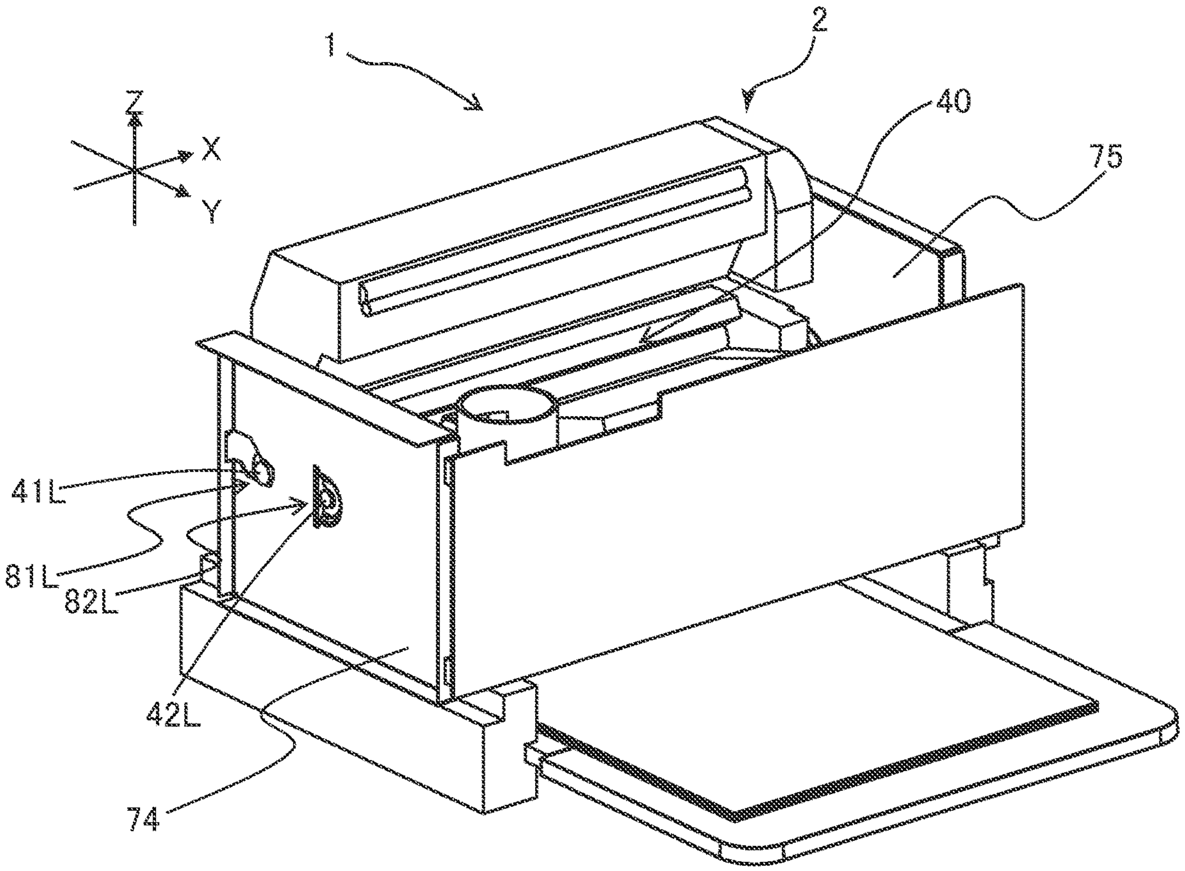
FIG. 13 is a perspective view illustrating an image forming apparatus in a state in which the process unit according to the third embodiment is attached.

FIG. 13 is a perspective view illustrating the image forming apparatus 1 in a state where the process unit 40 is attached. As illustrated in FIGS. 11 to 13, in a state where the process unit 40 is attached to the apparatus body 2, the left positioning boss 41L and the left rotation restricting boss 42L of the process unit 40 are engaged with the left positioning portion 81L and the left rotation restricting portion 82L of the left plate frame 74, respectively. Similarly, in a state where the process unit 40 is attached to the apparatus body 2, the right positioning boss 41R and the right rotation restricting boss 42R of the process unit 40 are engaged with the right positioning portion 81R and the right rotation restricting portion 82R of the right plate frame 75, respectively.

The process unit 40 is positioned in the attachment direction AD by engaging the left positioning boss 41L and the right positioning boss 41R with the left positioning portion 81L and the right positioning portion 81R, respectively. In the process unit 40, the left rotation restricting boss 42L and the right rotation restricting boss 42R are engaged with the left rotation restricting portion 82L and the right rotation restricting portion 82R, respectively, so that rotational movement about the left positioning boss 41L and the right positioning boss 41R is restricted. That is, the process unit 40 is positioned in the Z direction.

Figure 25A:
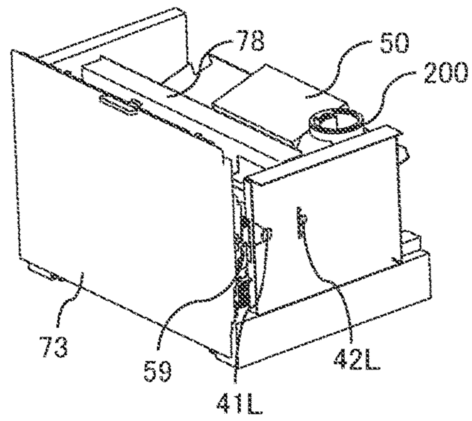
FIG. 25A is a perspective view illustrating the image forming apparatus in a state where the back cover is closed.
Figure 25B:
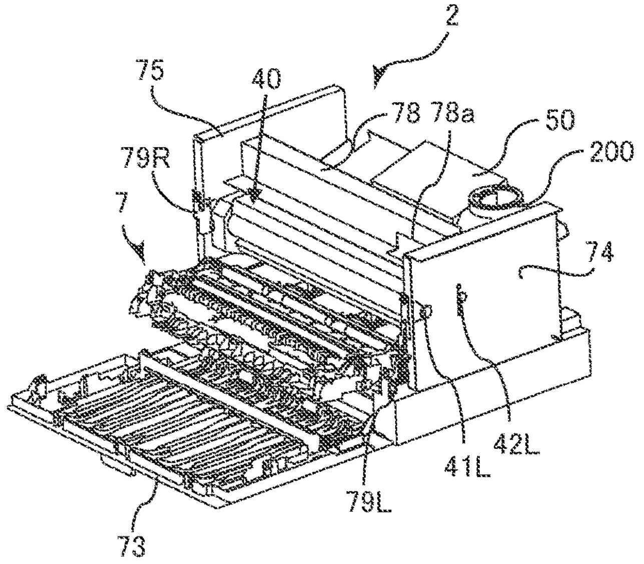
FIG. 25B is a perspective view illustrating the image forming apparatus in a state in which the transfer unit is opened.

In this state, the process unit 40 is fixed to the left plate frame 74 and the right plate frame 75 from the back side to the front side by left and right fixing members 79L and 79R (see FIG. 25B) to be described below.

In the present embodiment, since the left positioning portion 81L and the left rotation restricting portion 82L are provided on the left plate frame 74 which is the same sheet metal member, the cumulative tolerance is reduced, and the positioning accuracy of the process unit 40 can be improved. In addition, since the left positioning portion 81L is disposed upstream of the left rotation restricting portion 82L in the attachment direction AD, the notch shape forming the left positioning portion 81L formed on the left first surface 81Lf also requires a relatively small area. As described above, the rigidity of the left plate frame 74 can be maintained by reducing the area of the notch formed in the left plate frame 74. By maintaining the rigidity of the left plate frame 74, positioning accuracy of the process unit 40 with respect to the apparatus body 2 can be improved, and it is not necessary to form the left plate frame 74 thick, so that weight reduction and cost reduction can be achieved. The same applies to the right plate frame 75.

Developer Container

Figure 14:
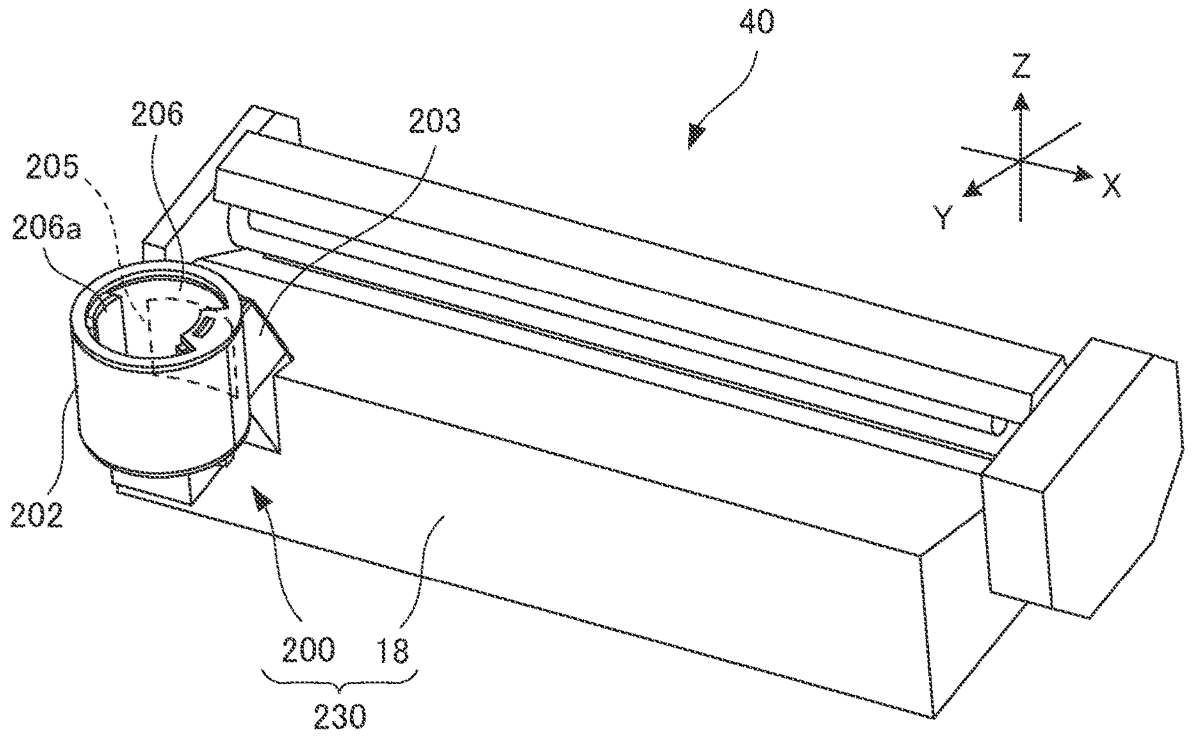
FIG. 14 is a perspective view illustrating the process unit according to the third embodiment.

Next, the developer container 230 and its peripheral configuration will be described with reference to FIGS. 14 and 15. As illustrated in FIG. 14, the developer container 230 includes a storage unit 18 and a supply unit 200 that communicates with the storage unit 18 and receives toner supplied from the outside in a state where the process unit 40 is attached to the apparatus body 2. The supply unit 200 includes an operation unit 201, a cylindrical toner receiving unit 202, a supply path portion 203 that connects the toner receiving unit 202 and the storage unit 18, and a main body shutter unit 206 as a main body shutter. A side surface opening 205 connected to the supply path portion 203 is formed on an inner wall of the toner receiving unit 202.

Figure 15:
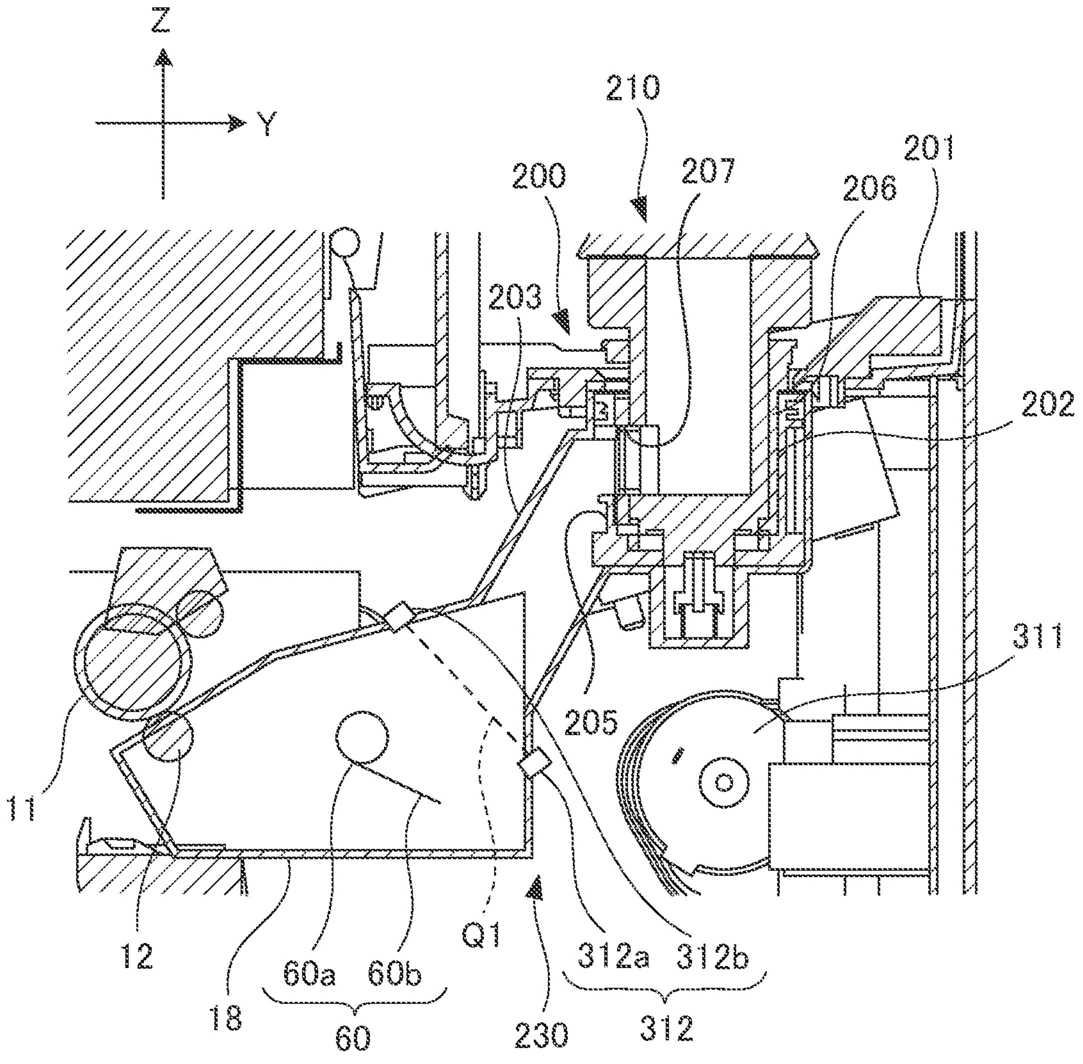
FIG. 15 is a cross-sectional view illustrating a supply unit and a developer container according to the third embodiment.

As illustrated in FIG. 15, a supply pack 210 to be described below is attached to the supply unit 200, and the toner discharged from the supply pack 210 is supplied to the storage unit 18 through the opening 207 of the main body shutter unit 206, the side surface opening 205 of the toner receiving unit 202, and the supply path portion 203.

As illustrated in FIGS. 14 and 15, the supply path portion 203 is connected to one end side of the storage unit 18 in the longitudinal direction of the developer container 230, that is, in the X direction. As illustrated in FIG. 15, a stirring member 60 that rotates about a rotation shaft 60*a* extending in the X direction is provided inside the storage unit 18. The stirring member 60 has a blade portion 60*b* fixed to the rotation shaft 60*a*, and is driven by the drive motor 311 to rotate, thereby stirring the toner in the storage unit 18 and conveying the toner toward the developing roller 12. In the present embodiment, the stirring member 60 is configured by the rotation shaft 60*a* and the blade portion 60*b*, but a spiral-shaped stirring member may be used as a configuration for spreading the toner over the entire length of the storage unit 18.

In addition, the stirring member 60 has a role of circulating the toner not used for development but peeled off from the developing roller 12 in the storage unit 18 and uniformizing the toner in the storage unit 18. Note that the stirring member 60 is not limited to a rotating form. For example, a stirring member that swings may be employed. In addition to the stirring member 60, another stirring member may be further provided.

In addition, the storage unit 18 is provided with a remaining amount detection unit 312 for detecting the toner amount in the storage unit 18, and the remaining amount detection unit 312 includes a light emitting unit 312*a* and a light receiving unit 312*b*. The light emitted from the light emitting unit 312*a* passes through the inside of the storage unit 18 and is received by the light receiving unit 312*b*. That is, the light emitting unit 312*a* and the light receiving unit 312*b* form an optical path Q1 inside the storage unit 18. Note that, in the light emitting unit 312*a* and the light receiving unit 312*b*, a light emitting element and a light receiving element may be arranged inside the storage unit 18, respectively, or the light emitting element and the light receiving element may be arranged outside the storage unit 18, respectively, and light may be guided to the inside and the outside of the storage unit 18 by a light guide unit.

Furthermore, the light emitting unit 312*a* and the light receiving unit 312*b* are provided at a central portion of the storage unit 18 in the X direction. By providing the light emitting unit 312*a* and the light receiving unit 312*b* at the central portion of the storage unit 18, the remaining amount of toner in the storage unit 18 can be favorably detected. That is, the developer (toner) may be unevenly distributed at the end in the X direction of the storage unit 18, but since the uneven distribution of the developer is small at the central portion of the storage unit 18, the actual remaining amount of the toner can be detected.

In the present embodiment, an LED is used as the light emitting unit 312*a*, and a phototransistor turned on by the light from the LED is used as the light receiving unit 312*b*.

However, the present invention is not limited thereto. For example, a halogen lampor a fluorescent lamp may be applied to the light emitting unit 312*a*, and a photodiode or an avalanche photodiode may be applied to the light receiving unit 312*b*.

Supply Unit

Figure 16A:
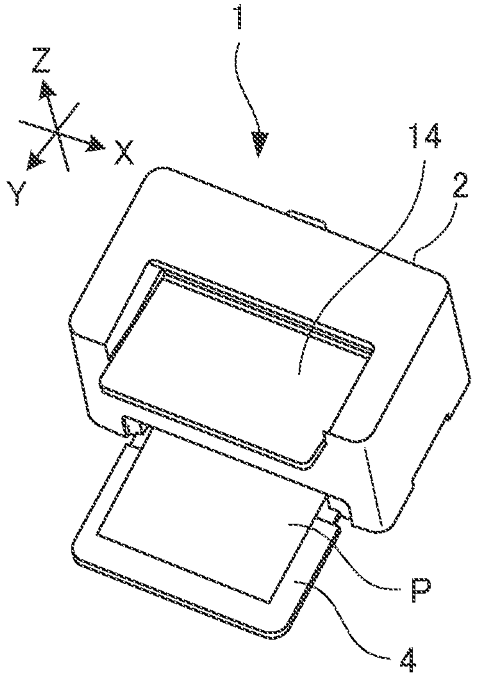
FIG. 16A is a perspective view illustrating an image forming apparatus in a state where a sheet discharge tray according to the third embodiment is closed.
Figure 16B:
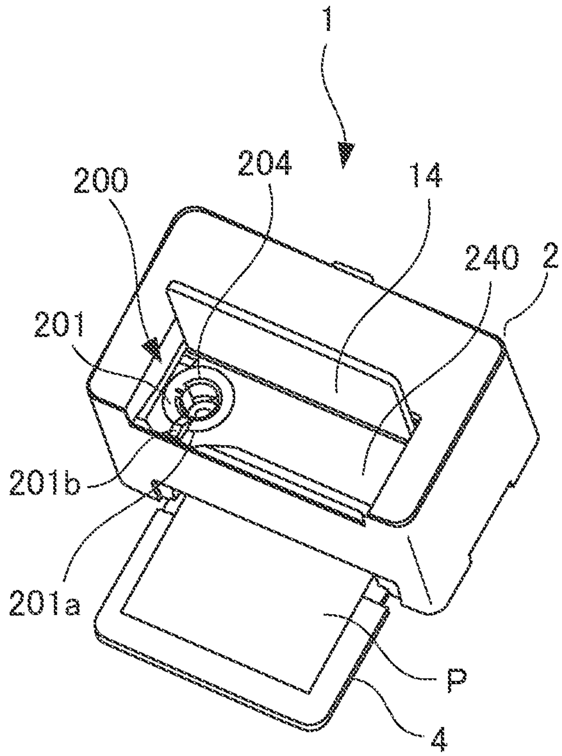
FIG. 16B is a perspective view illustrating the image forming apparatus in a state where the sheet discharge tray according to the third embodiment is opened.
Figure 16C:
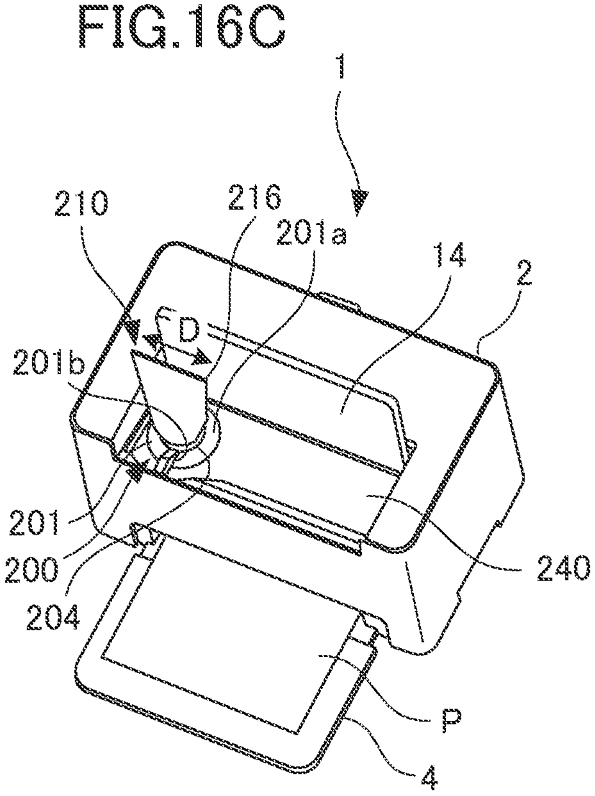
FIG. 16C is a perspective view illustrating the image forming apparatus in a state where a supply pack is attached to the supply unit.

Next, the supply unit 200 will be described with reference to FIGS. 16A to 17C. The sheet discharge tray 14 is supported so as to be openable and closable between a closed position where the recording material P can be stacked as illustrated in FIG. 16A and an open position opened with respect to the apparatus body 2 of the image forming apparatus 1 as illustrated in FIG. 16B. The sheet discharge tray 14 covers the supply unit 200 in the closed position. When the sheet discharge tray 14 is opened to the open position, a top surface portion 240 and the supply unit 200 disposed on the top surface portion 240 are exposed. As illustrated in FIG. 16C, a supply pack 210 is detachably attached to the supply unit 200 so that a user or a service person can supply toner from the outside without removing the developer container 230 from the apparatus body 2 (housing 72). Hereinafter, a worker such as a user and a service person is generally referred to as a user.

The supply unit 200 is disposed on the same side as the cassette 4 in the Y direction with respect to the photosensitive drum 11. In other words, in a plan view, the supply unit 200 is arranged on one side (front side) that is the same side as the cassette 4 with respect to the photosensitive drum 11, and an opening portion 91 (see FIG. 23B) to be described below is arranged on the other side (back side) with respect to the photosensitive drum 11. As a result, both the toner and the recording material P can be supplied on the front side of the image forming apparatus 1, and usability can be improved.

As illustrated in FIGS. 16B and 16C, the operation unit 201 is disposed on the top surface portion 240, and forms a supply port 204 which is a receiving port for supplying toner. The operation unit 201 includes a ring portion 201*a* provided to surround the supply port 204 and rotatably supported by the top surface portion 240 or the toner receiving unit 202, and a lever portion 201*b* provided integrally with the ring portion 201*a*. The operation unit 201 is a member for externally operating opening and closing of the main body shutter unit 206 and the pack shutter unit 214.

Figure 17A:
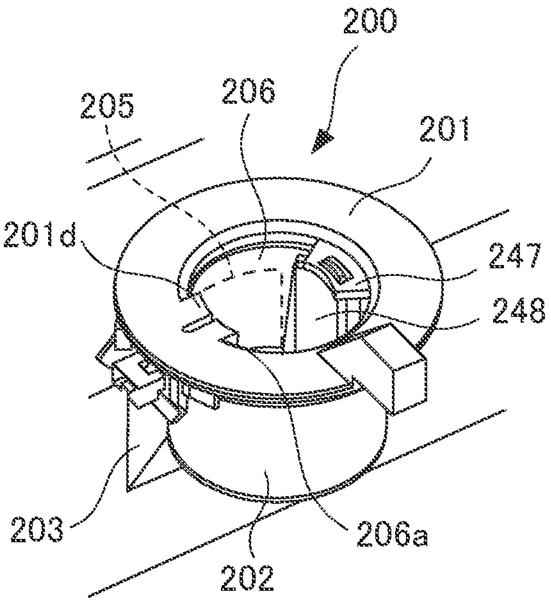
FIG. 17A is a perspective view illustrating the supply unit according to the third embodiment.
Figure 17B:
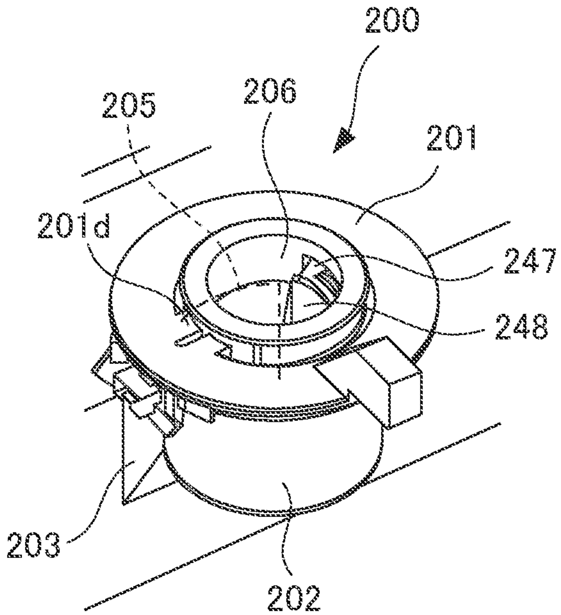
FIG. 17B is a perspective view illustrating the supply unit and a part of the supply pack according to the third embodiment.

As illustrated in FIG. 17A, the toner receiving unit 202 is provided with guide portions 247 and 248 which are disposed inside the main body shutter unit 206 and are integrated with the toner receiving unit 202. The main body shutter unit 206 is a cylindrical member concentric with the toner receiving unit 202, and is rotatably provided inside the toner receiving unit 202. The main body shutter unit 206 has an opening 207 (see FIG. 17C), and the opening 207 and the side surface opening 205 of the toner receiving unit 202 are shifted from each other at the closed position illustrated in FIG. 17A. A seal member 243 is fixed to the main body shutter unit 206 so as to surround the peripheral edge portion of the opening 207.

Since the side surface opening 205 is covered by the main body shutter unit 206 located at the closed position, it is indicated by a broken line in FIG. 17A. Therefore, the side surface opening 205 is shielded by the main body shutter unit 206, and the toner is not discharged to the supply path portion 203.

Figure 17C:
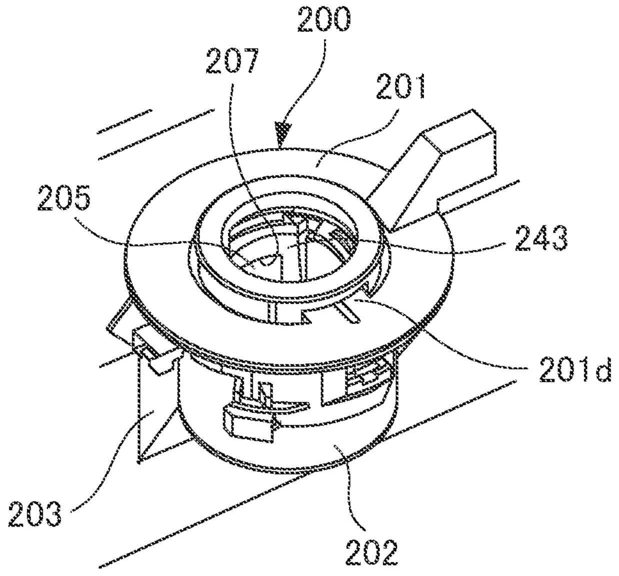
FIG. 17C is a perspective view illustrating the supply unit when an operation unit is located at a supply position.
Figure 17C:
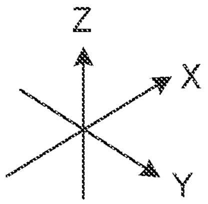

In addition, when the main body shutter unit 206 is located at the open position illustrated in FIG. 17C, the opening 207 overlaps the side surface opening 205 of the toner receiving unit 202. Therefore, the toner supplied from the supply pack 210 (see FIG. 16C) attached to the supply unit 200 can be discharged to the supply path portion 203 through the side surface opening 205 and the opening 207.

The main body shutter unit 206 is provided with a main body shutter unit drive transmission protrusion 206*a*, and the main body shutter unit drive transmission protrusion 206*a* is used to receive drive from the supply pack 210 and rotate the main body shutter unit 206, which will be described below in detail. When the operation unit 201 is rotated while the supply pack 210 is attached to the supply unit 200, the main body shutter unit 206 moves between the closed position and the open position.

The operation unit 201 is provided with an operation unit drive transmission protrusion 201*d* protruding radially inward from the inner peripheral surface of the toner receiving unit 202. The operation unit drive transmission protrusion 201*d* is engaged with the main body shutter unit drive transmission protrusion 206*a* via a pair of drive transmission surfaces 214*b* (see FIG. 20B) of the pack shutter unit 214 of the supply pack 210. The main body shutter unit 206 moves from the closed position illustrated in FIG. 17A to the open position illustrated in FIG. 17C as the lever portion 201*b* of the operation unit 201 is rotated 90 degrees counterclockwise by the user.

When an image is formed on the recording material P, it is necessary to block the side surface opening 205 by the main body shutter unit 206 so that the toner is stirred in the storage unit 18 by the stirring member 60 (see FIG. 15) and the toner does not leak from the side surface opening 205. Therefore, at the time of image formation, the operation unit 201 is located at the operation position illustrated in FIG. 17A so that the main body shutter unit 206 is located at the closed position. On the other hand, when toner is supplied from the supply pack 210 to be described below to the storage unit 18, it is necessary to open the side surface opening 205. Therefore, at the time of toner supply, the operation unit 201 is located at the supply position illustrated in FIG. 17C so that the main body shutter unit 206 is located at the open position.

Arrangement and Configuration of Supply Unit

Figure 18:
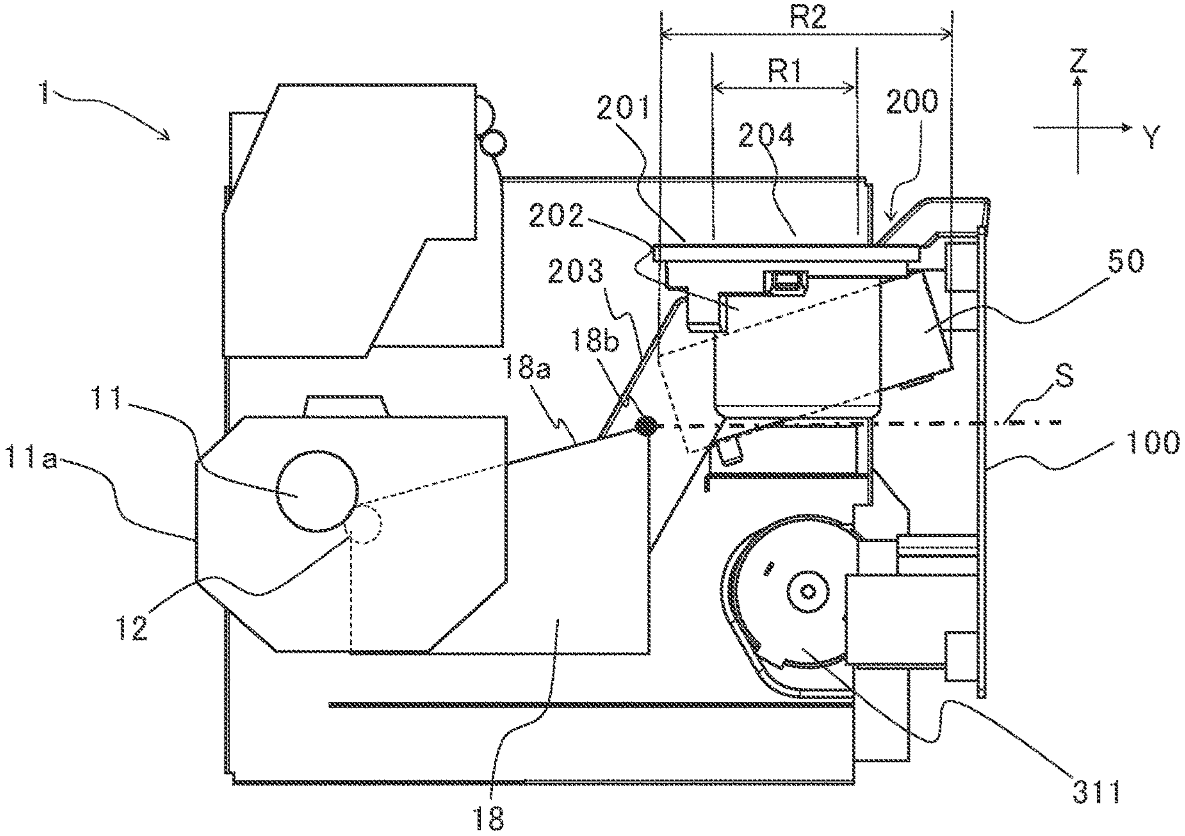
FIG. 18 is a left side view illustrating the image forming apparatus according to the third embodiment.

Next, the arrangement and configuration of the supply unit 200 will be described in detail. FIG. 18 is a left side view illustrating the image forming apparatus 1. In FIG. 18, the exterior cover 71 and the left plate frame 74 are not illustrated.

As illustrated in FIG. 18, at least a part of the supply unit 200 overlaps the scanner unit 50 as viewed in the rotation axis direction (X direction) of the photosensitive drum 11. A portion overlapping the supply unit 200 of the scanner unit 50 is indicated by a dotted line in FIG. 18. Specifically, the toner receiving unit 202 and the supply path portion 203 of the supply unit 200 are disposed so as to overlap the scanner unit 50 as viewed in the rotation axis direction of the photosensitive drum 11. Here, in the horizontal direction (Y direction), a region where the supply port 204 is provided is defined as a region R1, and a region where the scanner unit 50 is provided is defined as a region R2. In this case, the region R1 overlaps the region R2 as viewed in the rotation axis direction of photosensitive drum 11.

In addition, a virtual plane passing through the upper end portion 18*b* located at the uppermost side in the frame body 18*a* of the storage unit 18 and parallel to the horizontal plane is defined as a virtual plane S. The virtual plane S is indicated by an alternate long and short dash line in FIG. 18. All of the operation units 201 of the supply unit 200, a part of the toner receiving unit 202, and a part of the supply path portion 203 are located above the virtual plane S. In other words, a part of the supply unit 200 is located above the virtual plane S. A part of a portion above the virtual plane S of the toner receiving unit 202 and the supply path portion 203 overlaps the scanner unit 50 when viewed in the rotation axis direction of the photosensitive drum 11.

On the other hand, a part of the storage unit 18 also overlaps the drum frame body 11*a* when viewed in the rotation axis direction of the photosensitive drum 11, and is indicated by a broken line in FIG. 18. In this manner, by increasing the volume of the storage unit 18, the toner capacity stored in the storage unit 18 can be increased. The drum frame body 11*a* rotatably supports the photosensitive drum 11, and the storage unit 18 rotatably supports the developing roller 12 that carries the developer.

Figure 19:
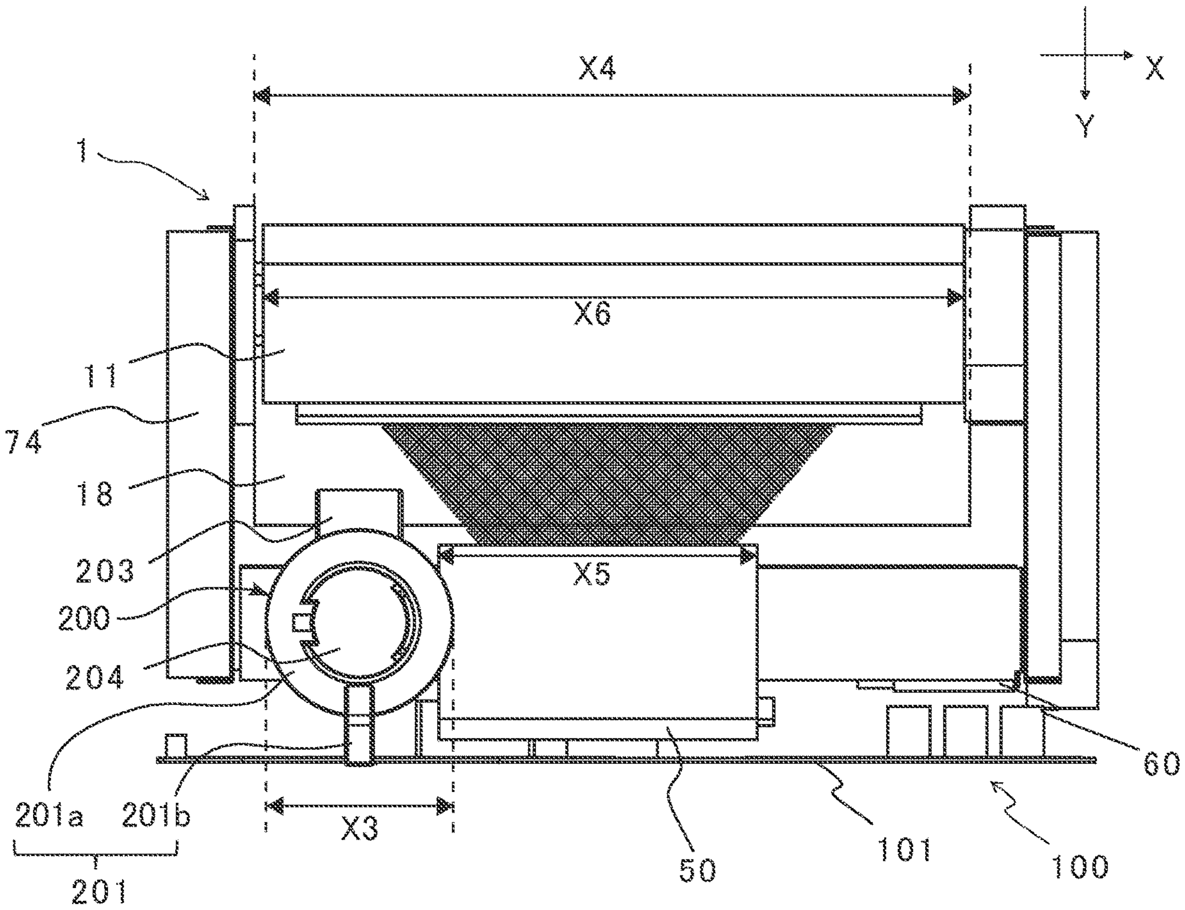
FIG. 19 is a plan view illustrating the image forming apparatus according to the third embodiment.

FIG. 19 is a plan view illustrating the image forming apparatus 1 in which the exterior cover 71 is not illustrated. In the X direction, a width X3 of the supply port 204 is shorter than a width X4 of the storage unit 18. The laser light emitted from the scanner unit 50 to the photosensitive drum 11 spreads in a trapezoidal shape as illustrated in FIG. 19 by the action of a polygon mirror and a lens (both are not illustrated). Therefore, in the X direction, a width X5 of the scanner unit 50 is shorter than a width X6 of the photosensitive drum 11. As a result, a space is created between the left end of the scanner unit 50 and the left plate frame 74, and in the present embodiment, the supply unit 200 is provided in the space.

Further, in the X direction, the supply unit 200 (width X3) and the scanner unit 50 (width X5) are provided side by side in a region (width X4) where the storage unit 18 is provided. As a result, it is possible to reduce the influence of the providing of the supply unit 200 on the size of the image forming apparatus 1.

Figure 26A:
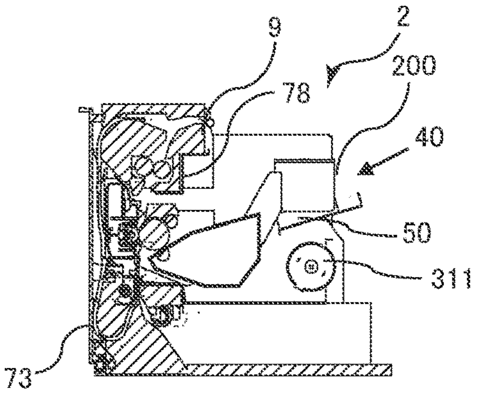
FIG. 26A is a cross-sectional view illustrating the image forming apparatus in a state where the back cover is closed.
Figure 26B:
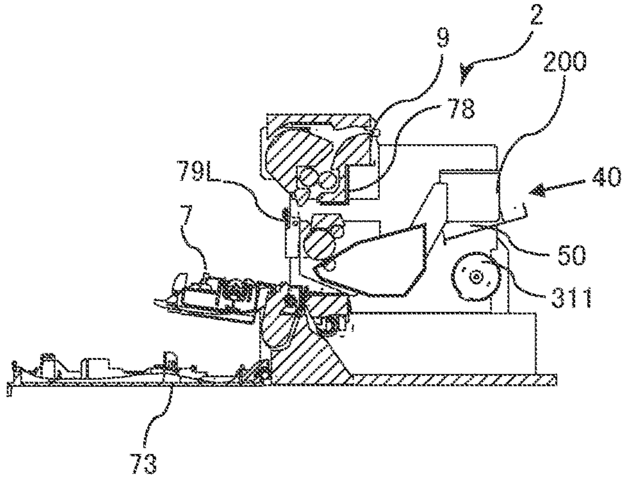
FIG. 26B is a cross-sectional view illustrating the image forming apparatus in a state in which the transfer unit is opened.

Further, the process unit 40 is disposed so as to at least partially overlap the scanner unit 50 in plan view. Further, as illustrated in FIG. 26A, the process unit 40 is disposed so as to at least partially overlap the fixing unit 9 in plan view. With such an arrangement of the process unit 40, the scanner unit 50, and the fixing unit 9, it is possible to increase the toner capacity of the storage unit 18 without increasing the size of the image forming apparatus 1. Note that the arrangement of the process unit 40, the scanner unit 50, and the fixing unit 9 is not limited to the above-described arrangement.

Figure 20A:
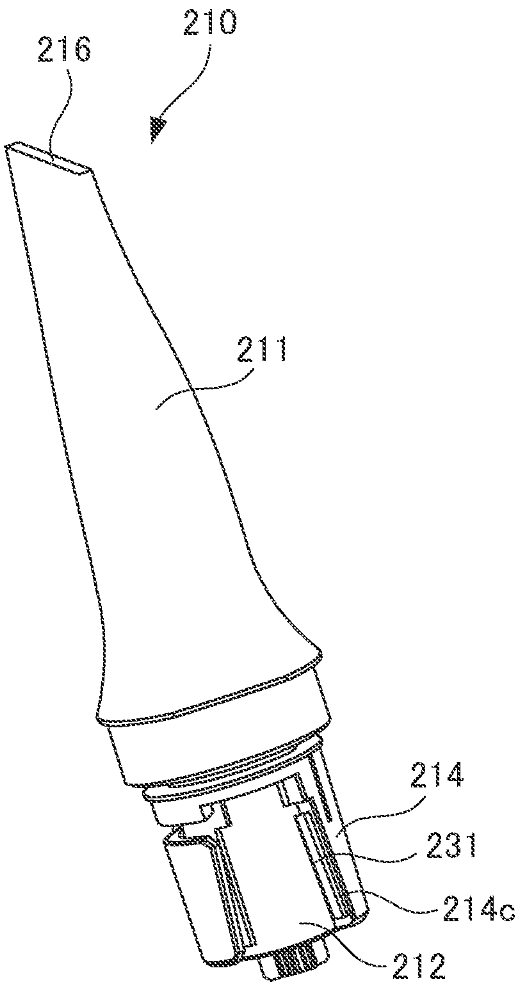
FIG. 20A is a perspective view illustrating the supply pack when a pack shutter unit is located at a closed position.
Figure 20B:
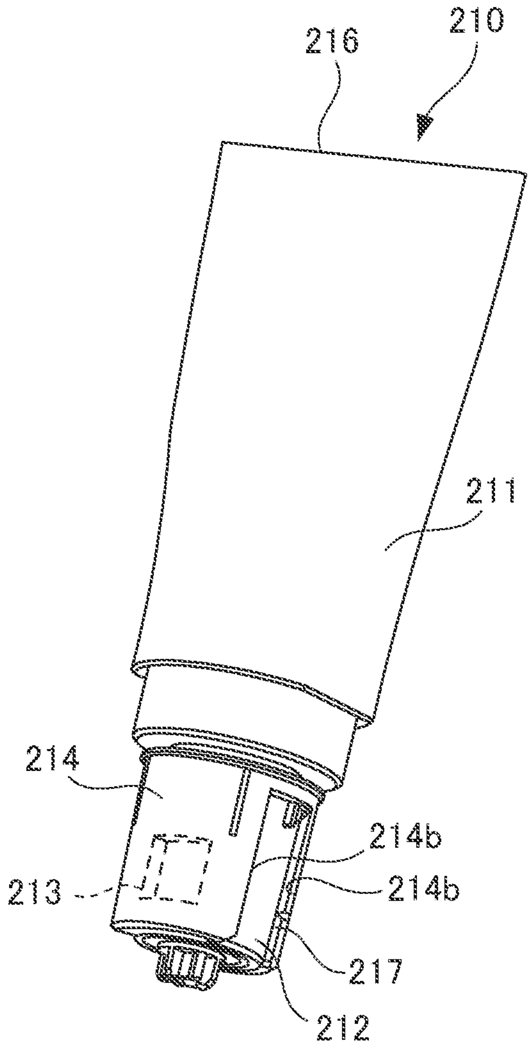
FIG. 20B is another perspective view illustrating the supply pack when the pack shutter unit according to the third embodiment is located at the closed position.
Figure 21A:
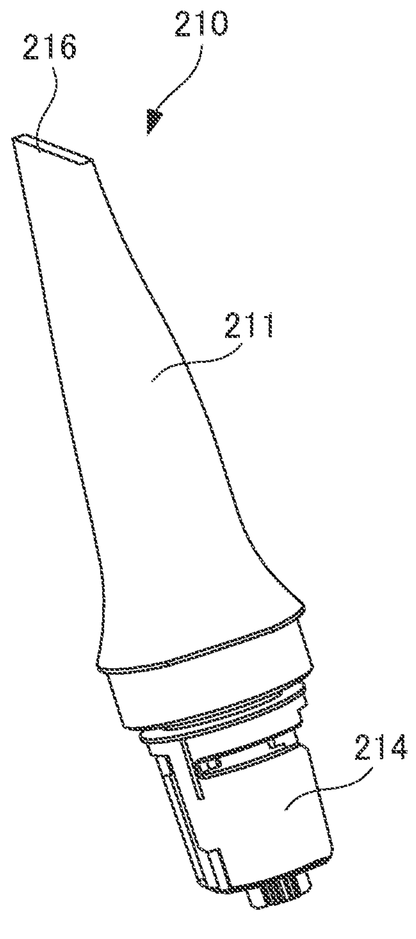
FIG. 21A is a perspective view illustrating the supply pack when the pack shutter unit is located at an open position.
Figure 21B:
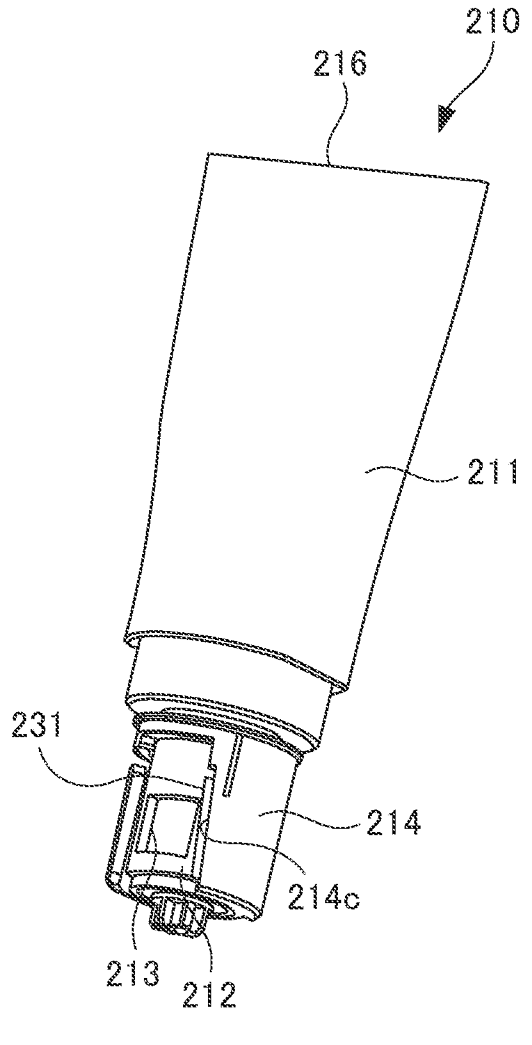
FIG. 21B is another perspective view illustrating the supply pack when the pack shutter unit is located at the open position.
Figure 22A:
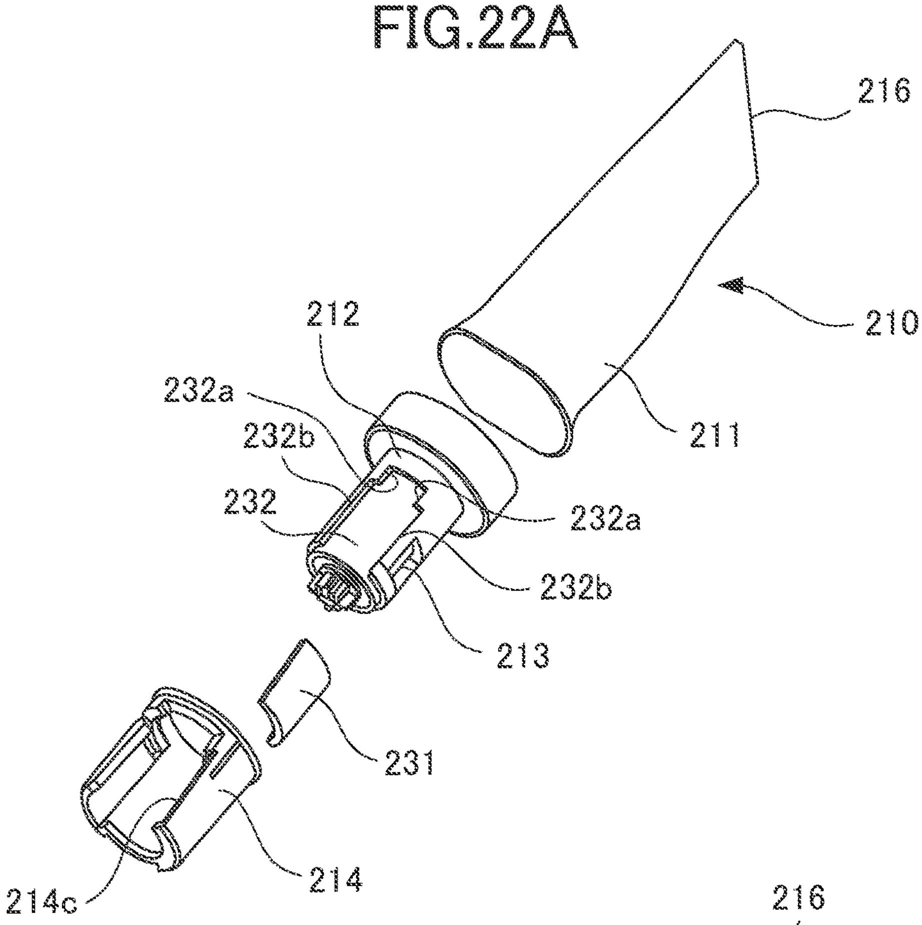
FIG. 22A is an exploded perspective view illustrating the supply pack.
Figure 22B:
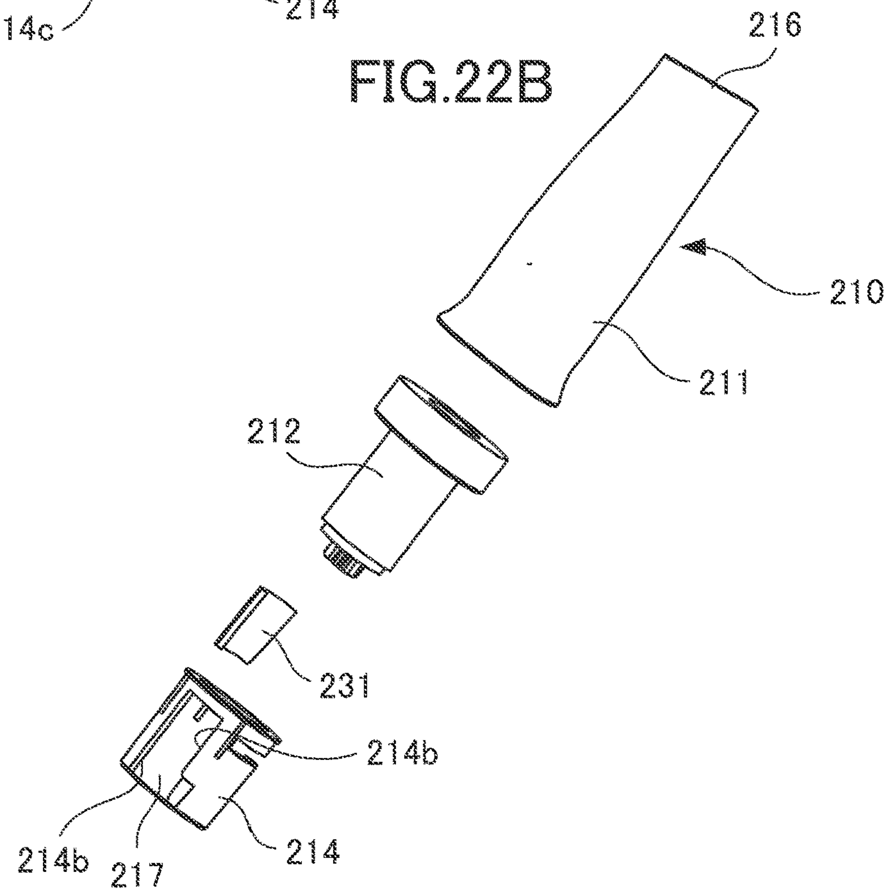
FIG. 22B is another exploded perspective view illustrating the supply pack.

As illustrated in FIG. 3, the supply unit 200 is disposed on the side opposite to the side where the drive motor 311 is present when the position of the scanner unit 50 is set as a reference in the rotation axis direction (X direction) of the photosensitive drum 11. In the present embodiment, since the drive motor 311 is relatively small, the drive motor 311 and the supply unit 200 do not overlap in the Z direction as illustrated in FIG. 18. However, since the supply unit 200 is disposed on the opposite side with the scanner unit 50 interposed therebetween as described above, the drive motor 311 can be replaced with a large-sized one that overlaps the supply unit 200 in the Z direction. Therefore, the degree of freedom in design can be improved. Supply Pack Next, the configuration of the supply pack 210 will be described with reference to FIGS. 20A to 22B. FIGS. 20A and 20B are perspective views illustrating the supply pack when the pack shutter unit 214 is located at the closed position. FIGS. 21A and 21B are perspective views illustrating the supply pack when the pack shutter unit 214 is located at the open position. FIGS. 22A and 22B are exploded perspective views illustrating the supply pack.

The supply pack 210 as a toner container includes a pouch portion 211 which is a bag containing toner to be supplied, a cylindrical insertion unit 212 to be inserted into the supply port 204, and a pack shutter unit 214 as a container shutter. The insertion unit 212 as a nozzle unit communicates with the pouch portion 211. An opening 213 as an opening portion through which the toner in the pouch portion 211 is discharged to the outside is formed in the insertion unit 212. The pouch portion 211 is formed of a plastic bag body which is easily deformed, but is not limited thereto. For example, the pouch portion 211 may be constituted by a bottle container made of resin, or may be constituted by a container made of paper or vinyl.

In the pouch portion 211, a pouch end portion 216 is formed at an end portion opposite to the insertion unit 212. The pouch portion 211 has a flat shape toward the pouch end portion 216, and the pouch end portion 216 extends in the radial direction orthogonal to the rotation axis direction of the pack shutter unit 214.

The pack shutter unit 214 is a cylindrical member concentric with the insertion unit 212, and is provided radially outside the insertion unit 212. The pack shutter unit 214 has the opening 214*c*, and can transition to a closed position to shield the opening 213 of the insertion unit 212 or an open position to open the opening 213 by rotating with respect to the insertion unit 212. When the opening 214*c* of the pack shutter unit 214 and the opening 213 of the insertion unit 212 overlap, toner can be supplied from the supply pack 210 to the supply unit 200.

Further, a seal member 231 that can be rubbed against the outer peripheral surface of the insertion unit 212 is fixed to the inner peripheral surface of the pack shutter unit 214, and the seal member 231 shields the opening 213 of the insertion unit 212 when the pack shutter unit 214 is located at the closed position.

As illustrated in FIG. 22A, the insertion unit 212 is formed with a guided portion 232 recessed from the outer peripheral surface of the insertion unit 212, and the guided portion 232 includes a pair of a first guided portion 232*a* and a second guided portion 232*b*. When the supply pack 210 is attached to the supply unit 200, the guide portions 247 and 248 integrated with the toner receiving unit 202 enter the guided portion 232. As a result, the relative movement between the insertion unit 212 and the toner receiving unit 202 in the circumferential direction around the rotation axis of the pack shutter unit 214 is restricted.

As illustrated in FIG. 22B, the outer peripheral surface of the pack shutter unit 214 is provided with an alignment portion 217 engaged with the operation unit 201, and a drive transmission surface 214*b* facing each other with the alignment portion 217 interposed therebetween in the circumferential direction of the outer periphery of the pack shutter unit 214. That is, the outer peripheral surface of the pack shutter unit 214 is formed with a groove (recess that is recessed inward in the radial direction of the pack shutter unit 214) shape in which the alignment portion 217 is a groove bottom surface (recess bottom surface) and the drive transmission surface 214*b* is a groove side surface. The groove is opened at the distal end of the outer peripheral surface of the pack shutter unit 214 in the insertion direction of the insertion unit 212. When the drive transmission surface 214*b* receives a force in the circumferential direction from the operation unit drive transmission protrusion 201*d* of the operation unit 201, the pack shutter unit 214 rotates with respect to the insertion unit 212.

In the insertion unit 212, when the pack shutter unit 214 is at the closed position, the opening 214*c* provided in the pack shutter unit 214 and the guided portion 232 provided to be recessed from the outer peripheral surface of the insertion unit 212 overlap each other in the rotational phase in the circumferential direction. In this state, the guide portions 247 and 248 of the supply unit 200 are inserted into the guided portion 232 of the supply pack 210, and the opening 214*c* is fitted to the peripheral edge of the seal member 243 provided on the inner peripheral surface of the main body shutter unit 206. In a state where the supply pack 210 is attached to the supply unit 200, the first guided portion 232*a* on the upstream in the insertion direction of the guided portion 232 is engaged with the guide portion 247, and the second guided portion 232*b* on the downstream faces the guide portion 248. A surface extending in the circumferential direction, which is a step portion between the first guided portion 232*a* and the second guided portion 232*b*, is engaged with a surface extending in the circumferential direction, which is a step portion between the guide portion 247 and the guide portion 248, in the insertion direction to determine a position in the insertion direction between the insertion unit 212 and the operation unit 201. The opening 214*c* has a shape that expands in width toward the distal end side of the insertion unit 212 and opens in a notched shape. A pair of opposing portions forming the opening 214*c* and facing each other in the circumferential direction sandwiches the seal member 243 in the circumferential direction.

The drive transmission surface 214*b* of the pack shutter unit 214 is engaged with the operation unit drive transmission protrusion 201*d* of the operation unit 201 and is engaged with the main body shutter unit drive transmission protrusion 206*a* of the main body shutter unit 206. The pack shutter unit 214 is moved (rotated) by operation force of the operation unit 201, and transmits the operation force to the main body shutter unit 206 to also move the main body shutter unit 206. That is, the drive transmission surface 214*b* has a region that engages with and abuts on the operation unit drive transmission protrusion 201*d* as a force receiving region. The operation unit drive transmission protrusion 201*d* has a convex shape extending radially inward from the inner peripheral surface of the operation unit 201, and the drive transmission surface 214*b* has a region engaging with and abutting on the main body shutter unit drive transmission protrusion 206*a* as a force applying region.

Toner Supply Procedure

Next, a toner supply procedure using the supply pack 210 will be described with reference to FIGS. 16A to 22B. First, as illustrated in FIGS. 16A to 16C, the user removes the recording material P on the sheet discharge tray 14 and opens the sheet discharge tray 14 from the closed position to the open position. As a result, the supply unit 200 is exposed. Since the supply unit 200 is provided on the upper front surface of the image forming apparatus 1, it is easy to supply toner.

In a state where the sheet discharge tray 14 is opened to the open position and the supply unit 200 is exposed, the operation unit 201 is positioned at the operation position. Then, the user attaches the supply pack 210 to the supply unit 200 by aligning the operation unit drive transmission protrusion 201*d* (see FIG. 17A) provided in the supply unit 200 and an alignment notch 217 (see FIG. 22B) provided in the supply pack 210. When the positions of the operation unit drive transmission protrusion 201*d* and the alignment notch 217 do not match, the supply pack 210 interferes with the operation unit drive transmission protrusion 201*d*, and the supply pack 210 cannot be inserted.

FIG. 16C is a perspective view illustrating a state in which the supply pack 210 is attached to the supply unit 200. In the present embodiment, as illustrated in FIG. 16C, the supply pack 210 can be attached to the supply unit 200 when the arrow D direction, which is the extending direction of the pouch end portion 216, is parallel to the X direction. When the supply pack 210 is inserted deep into the supply unit 200, the drive transmission surface 214*b* forming the alignment notch 217 engages with the operation unit drive transmission protrusion 201*d* of the operation unit 201. In addition, the drive transmission surface 214*b* of the pack shutter unit 214 is engaged with the main body shutter unit drive transmission protrusion 206*a* of the main body shutter unit 206.

That is, the rotation of the operation unit 201 is transmitted to the pack shutter unit 214, and the rotation of the pack shutter unit 214 is transmitted to the main body shutter unit 206. As a result, the main body shutter unit 206 and the pack shutter unit 214 are engaged with each other and integrated, and the operation unit 201, the pack shutter unit 214, and the main body shutter unit 206 are interlocked.

Then, as illustrated in FIG. 17C, the user rotates the lever portion 201*b* of the operation unit 201 counterclockwise by 90 degrees. As a result, the operation unit 201 rotates from the operation position to the supply position, and the pack shutter unit 214 and the main body shutter unit 206 rotate from the close position to the open position. As a result, the opening 214*c* of the pack shutter unit 214, the opening 213 of the insertion unit 212 of the supply pack 210, the opening 207 of the main body shutter unit 206, and the side surface opening 205 of the toner receiving unit 202 overlap. As a result, the toner in the supply pack 210 is discharged to the storage unit 18 through the supply path portion 203.

In other words, when the operation unit 201 is located at the supply position, the supply unit 200 is in a supply available state capable of supplying toner from the supply pack 210 to the storage unit 18. At this time, the opening 213 of the supply pack 210 and the side surface opening 205 of the toner receiving unit 202 communicate with each other.

When the toner supply from the supply pack 210 to the storage unit 18 is completed, the user returns the operation unit 201 from the supply position to the operation position. That is, the user rotates the lever portion 201*b* of the operation unit 201 clockwise by 90 degrees. As a result, the pack shutter unit 214 and the main body shutter unit 206 rotate from the open position to the closed position.

In other words, when the operation unit 201 is located at the operating position, the supply unit 200 is in a supply disabled state in which toner cannot be supplied from the supply pack 210 to the storage unit 18. At this time, the opening 213 of the supply pack 210 and the side surface opening 205 of the toner receiving unit 202 do not communicate with each other.

Then, the user removes the supply pack 210 from the supply unit 200. As described above, in a state where the supply pack 210 is detached from the supply unit 200, the pack shutter unit 214 is located at the closed position, so that it is possible to prevent toner leakage from the opening 213 of the supply pack 210.

Back Cover and Transfer Unit

Next, peripheral configurations of the back cover 73 and the transfer unit 7 will be described with reference to FIGS. 23A to 24D. As illustrated in FIGS. 23A to 24D, an opening portion 91 formed by an exterior cover 71 and a back cover 73 covering the opening portion 91 are provided on the back surface of the image forming apparatus 1. The back cover 73 as a cover unit is supported to be openable and closable about the cover engagement portion 73*d* between a closed position as a second closed position closed with respect to the apparatus body 2 and an open position as a second open position opened with respect to the apparatus body 2. The back cover 73 covers the opening portion 91, the transfer unit 7, and the process unit 40 in the closed position, and opens the opening portion 91 to expose the transfer unit 7 and the process unit 40 in the open position. Further, the transfer unit 7 as an opening and closing unit is supported so as to be openable and closable about the rotation shaft 7*c*.

On the outer surface 73*b* of the back cover 73, that is, the surface constituting the exterior surface of the housing 72, a grip portion 73*c* that can be gripped when the user opens and closes the back cover 73 is provided. A plurality of (three in the present embodiment) engaging claws 73*a*, a plurality of conveyance ribs 73*g*, and a pressing rib 73*e* are provided on an inner side surface 373*f* opposite to the outer surface 73*b* of the back cover 73.

Figure 23A:
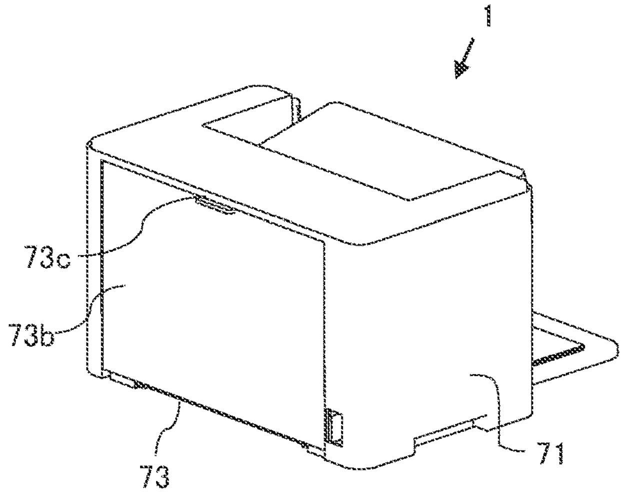
FIG. 23A is a perspective view illustrating the image forming apparatus in a state where the back cover is closed.
Figure 24A:
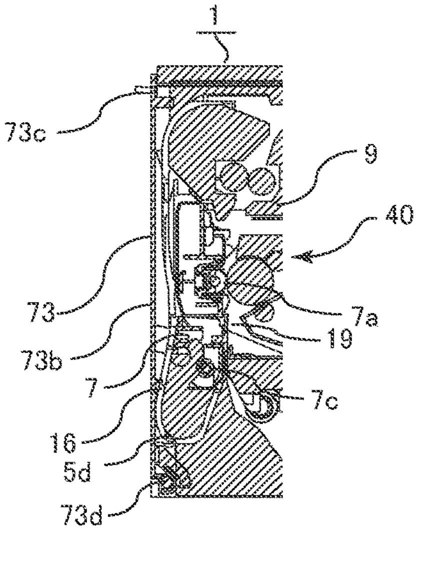
FIG. 24A is a cross-sectional view illustrating the image forming apparatus in a state where the back cover is closed.

The back cover 73 is held at the closed position illustrated in FIGS. 23A and 24A by engagement of the engaging claws 73*a* as the engagement portions with the exterior cover 71. In a state where the back cover 73 is located at the closed position, the transfer unit 7 is drawn into the apparatus body 2 by links 96L and 96R (see FIG. 27) to be described below, and is in a closed state until operated by the user. The transfer roller 7*a* transfers the toner image carried on the photosensitive drum 11 to the recording material P when the transfer unit 7 is located at the closed position.

Figure 23B:
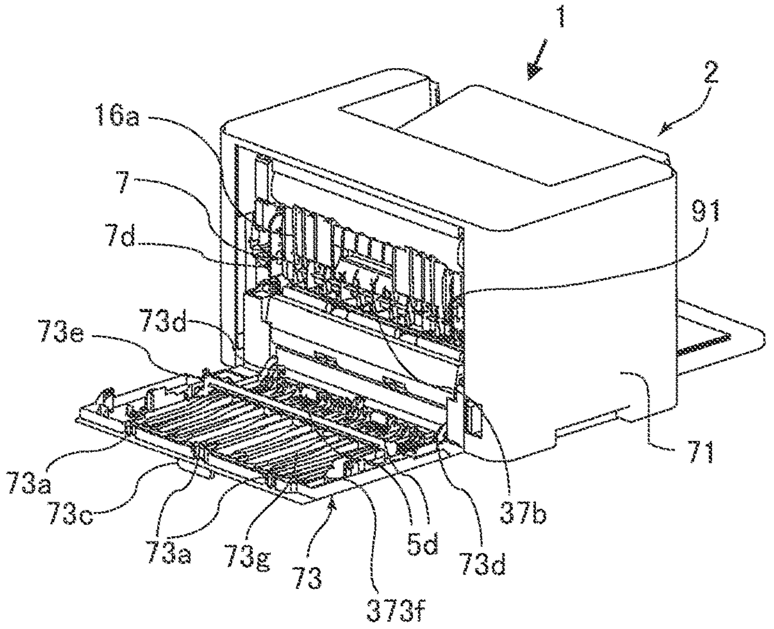
FIG. 23B is a perspective view illustrating the image forming apparatus in a state where the back cover is opened.
Figure 24B:
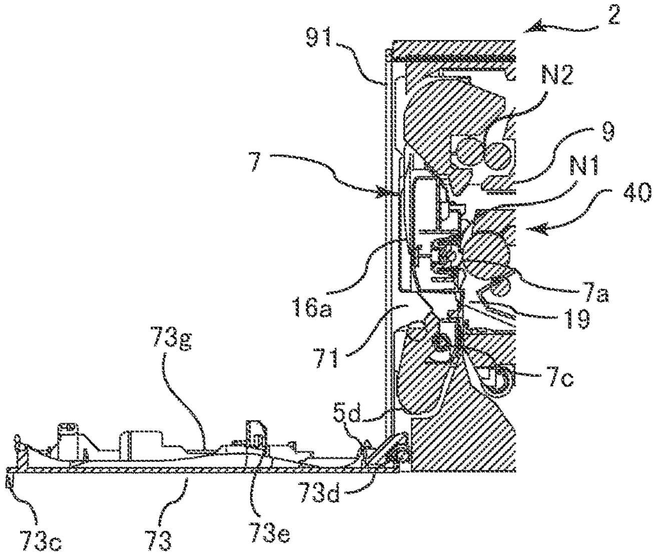
FIG. 24B is a cross-sectional view illustrating the image forming apparatus in a state where the back cover is opened.

As illustrated in FIGS. 23B and 24B, when the back cover 73 is opened to the open position, the duplex conveyance path 16 through which the recording material P conveyed by the duplex conveyance roller pair 5*d* passes is opened. The duplex conveyance path 16 is formed by a plurality of conveyance ribs 73g of the back cover 73 and a plurality of conveyance ribs 73g formed on the outer surface of the transfer unit 7. In other words, the conveyance rib 73g constitutes a part of the duplex conveyance path 16 when the back cover 73 is located at the closed position. That is, the back cover 73 is movable between a closed position where the back cover 73 covers the duplex conveyance path 16 and an open position where the duplex conveyance path 16 is exposed to the outside and opened. The duplex conveyance path 16 and the conveyance path 19 are conveyance paths on which the recording material P is conveyed.

In addition, the pressure roller 9b of the fixing unit 9 abuts on or separates from the heating film 9a in conjunction with opening and closing of the back cover 73 by a link (not illustrated). Therefore, when the back cover 73 is located at the open position and the duplex conveyance path 16 is opened, the pressure roller 9b is separated from the heating film 9a.

Figure 23C:
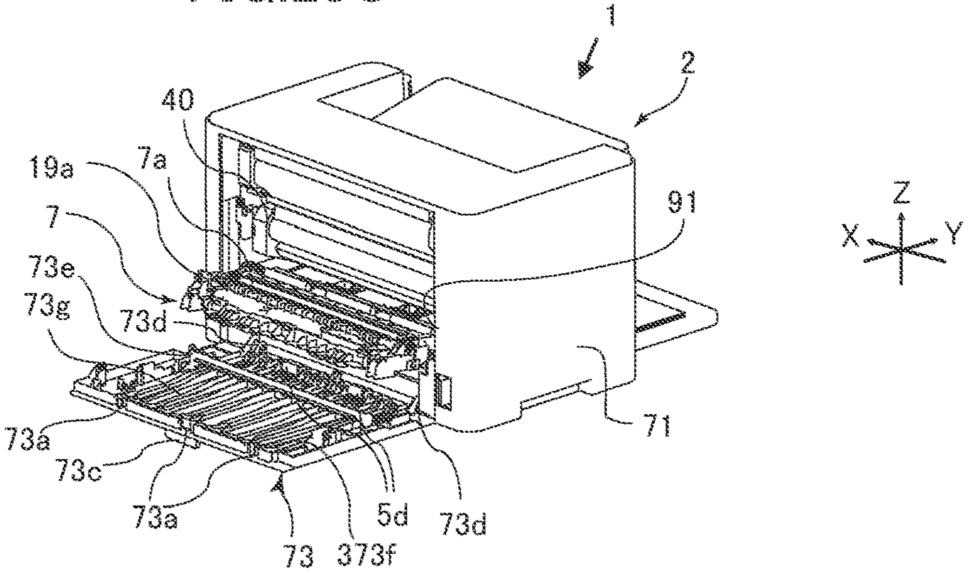
FIG. 23C is a perspective view illustrating the image forming apparatus in a state in which the transfer unit is opened.
Figure 24C:
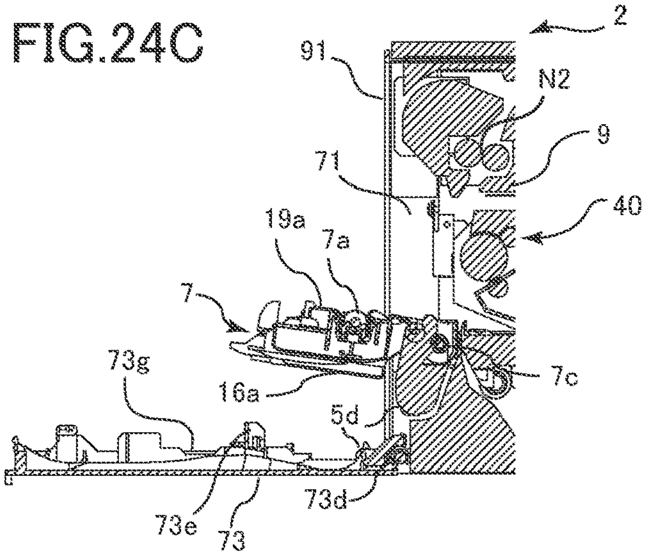
FIG. 24C is a cross-sectional view illustrating the image forming apparatus in a state where the transfer unit is opened.
Figure 24C:
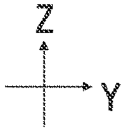

Next, as illustrated in FIGS. 23C and 24C, when the transfer unit 7 is opened around the rotation shaft 7c in a state where the back cover 73 is located at the open position, the conveyance path 19 is opened. The recording material P fed by the pickup roller 3 and conveyed by the conveyance roller pair 5c, the transfer nip N1, and the fixing nip N2 passes through the conveyance path 19. That is, the transfer unit 7 can be opened and closed between a closed position as a first closed position where the transfer unit 7 covers the conveyance path 19 and is closed with respect to the apparatus body 2 and an open position as a first open position where the transfer unit 7 exposes the conveyance path 19 to the outside and is opened with respect to the apparatus body 2. Note that the conveyance path 19 can be opened even in a state where the process unit 40 is attached to the apparatus body 2 when the transfer unit 7 is located at the open position.

A conveyance rib 19a constituting the conveyance path 19 is provided on the inner side surface of the transfer unit 7. A grip portion 37b (see FIG. 23B) is provided on the outer surface of the transfer unit 7 together with the plurality of conveyance ribs 73g, and the transfer unit 7 is rotated between the closed position and the open position by the user operating the grip portion 37b.

Jam Recovery

Next, a jam recovery method when a jam occurs in the duplex conveyance path 16 or the conveyance path 19 will be described. When the jam of the recording material P occurs during the image forming operation, the user opens the back cover 73 from the closed position to the open position as illustrated in FIGS. 23A and 23B and FIGS. 24A and 24B. As a result, the duplex conveyance path 16 is opened and when a jam occurs in the vicinity of the duplex conveyance path 16, the jammed recording material P can be removed.

On the other hand, when the jam occurs near the transfer nip N1, the user opens the back cover 73 and the transfer unit 7 to the open position as illustrated in FIGS. 23C and 24C. As a result, the conveyance path 19 is opened, and the jammed recording material P in the vicinity of the conveyance path 19 can be removed. As described above, even if a jam occurs in the duplex conveyance path 16 or the conveyance path 19, the jam recovery can be performed from the back side of the image forming apparatus 1 while the process unit 40 is attached to the apparatus body 2. Therefore, the jam recovery is not complicated, and the jam recovering property can be improved.

Figure 24D:
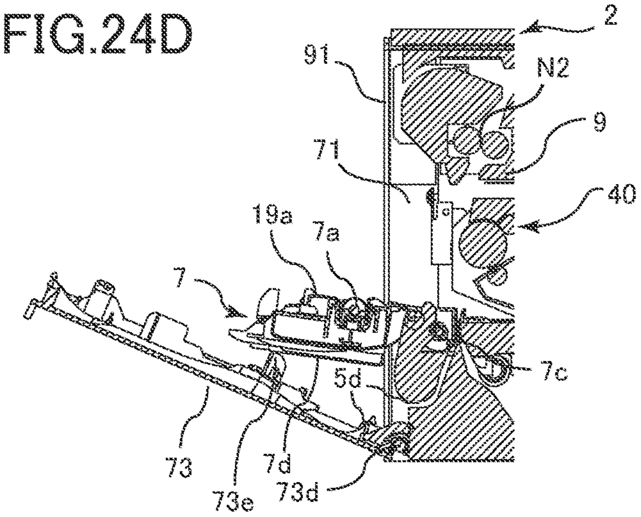
FIG. 24D is a cross-sectional view illustrating the image forming apparatus in a process of closing the back cover.

After the jam recovery is completed, the user closes the back cover 73 from the open position to the closed position while keeping the transfer unit 7 at the open position as illustrated in FIG. 24D. Then, back cover 73 rotates alone until back cover 73 is closed by about 25° from the open position. Thereafter, the pressing rib 73e of the back cover 73 comes into contact with a pressed portion 7d of the transfer unit 7. When the back cover 73 is closed to the closed position in this state, the transfer unit 7 is also moved from the open position to the closed position by being pressed by the pressing rib 73e. Therefore, the closing operation of the transfer unit 7 can be omitted, and usability can be improved. Note that the user can also close the transfer unit 7 before closing the back cover 73.

Attachment and Detachment of Process Unit

Next, with reference to FIGS. 25A to 26D, for example, a method of attaching and detaching the process unit 40 when the process unit 40 is replaced or maintained will be described. When detaching the process unit 40 from the apparatus body 2, the user moves the back cover 73 and the transfer unit 7 to the open position as illustrated in FIGS. 25A and 25B and FIGS. 26A and 26B similarly to the jam recovery described above. As a result, the process unit 40 is exposed to the outside, but in this state, the process unit 40 is fixed to the left plate frame 74 and the right plate frame 75 by the fixing members 79L and 79R.

In the present embodiment, the process unit 40 is fixed to the left plate frame 74 and the right plate frame 75 using the fixing members 79L and 79R and screws made of sheet metal members, but the present invention is not limited thereto. For example, the process unit 40 may be held on the apparatus body 2 by a biasing member using a spring or the like, or the process unit 40 may be held on the apparatus body 2 by using a biasing force to the photosensitive drum 11 by the transfer roller 7a of the transfer unit 7.

Figure 25C:
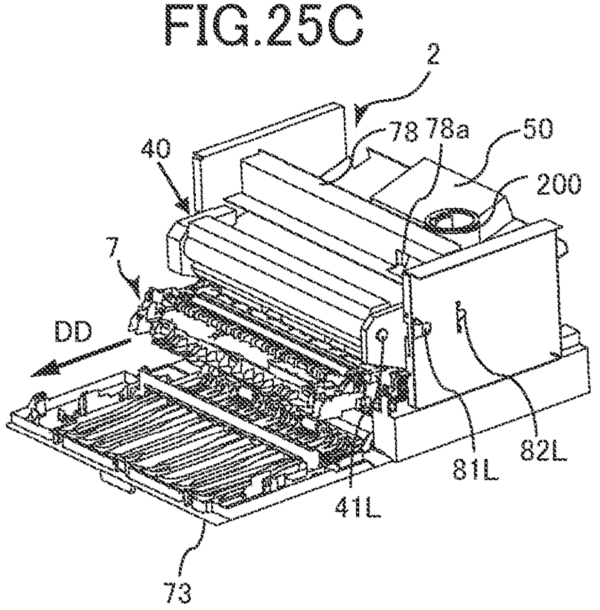
FIG. 25C is a perspective view illustrating a state in which removal of the process unit is started.
Figure 25C:
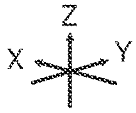
Figure 26C:
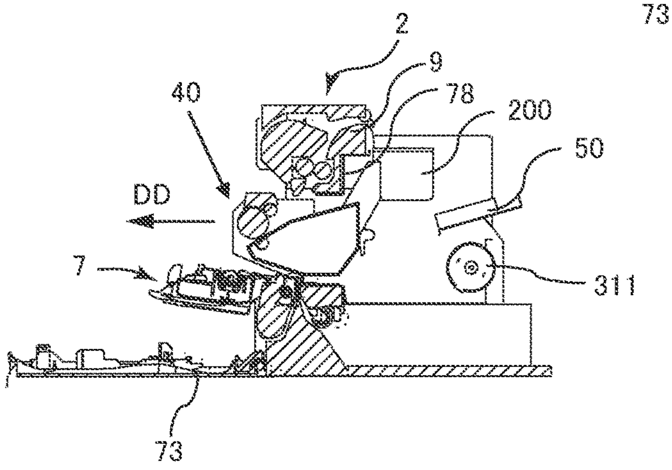
FIG. 26C is a cross-sectional view illustrating a state in which removal of the process unit is started.

In order to detach the process unit 40 from the apparatus body 2, first, the fixing members 79L and 79R are detached. Then, the engagement of the drive transmission portion between the pinion gear of the drive motor 311 and the photosensitive drum 11 is released, and the process unit 40 is moved in a detachment direction DD opposite to the attachment direction AD (see FIG. 11) as illustrated in FIGS. 25C and 26C. As a result, the left positioning boss 41L and the right positioning boss 41R are separated from the left positioning portion 81L and the right positioning portion 81R, and the left rotation restricting boss 42L and the right rotation restricting boss 42R are separated from the left rotation restricting portion 82L and the right rotation restricting portion 82R. That is, the process unit 40 is detachable from the housing 72 of the apparatus body 2 via the opening portion 91 when the back cover 73 is located at the open position and the transfer unit 7 is located at the open position. Since the opening portion 91 is located behind the apparatus body 2 and can secure a relatively large area, the process unit 40 can be easily attached and detached, and maintainability of the process unit 40 can be improved.

In the present embodiment, the fixing unit 9 is held by a fixing stay 78 suspended between the left plate frame 74 and the right plate frame 75. In order to reduce the size of the image forming apparatus 1, the supply unit 200 which is a part of the process unit 40 overlaps the fixing unit 9 in the X direction and the Z direction. In other words, the supply unit 200 is disposed upstream of the fixing unit 9 in the detachment direction DD, and is disposed so as to at least partially overlap the fixing unit 9 as viewed in the detachment direction DD.

Figure 25D:
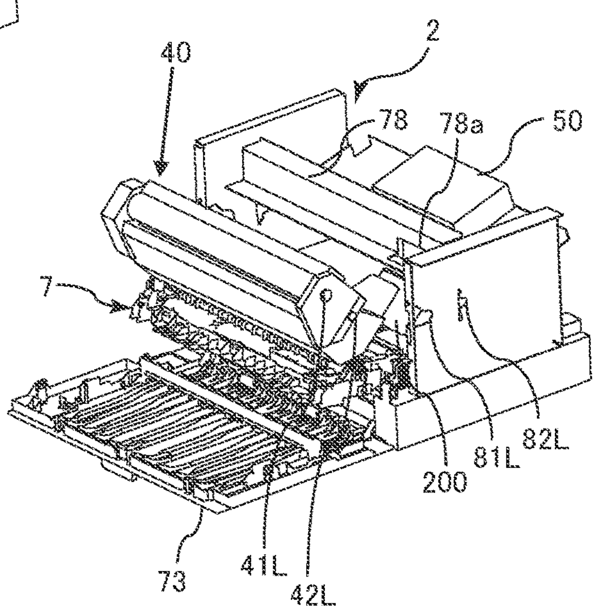
FIG. 25D is a perspective view illustrating a process of removing the process unit.
Figure 26D:
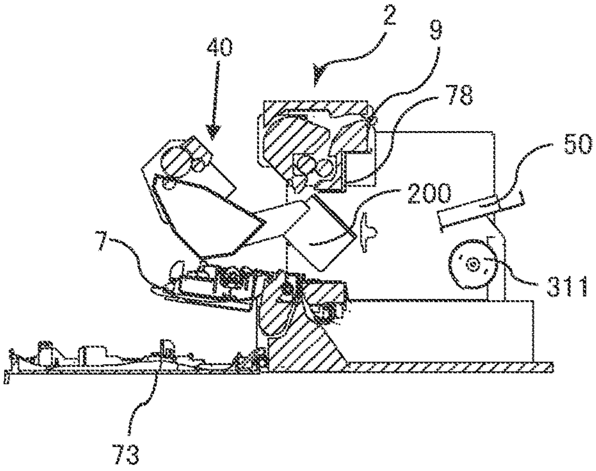
FIG. 26D is a cross-sectional view illustrating a process of removing the process unit.

Therefore, as illustrated in FIGS. 25D and 26D, the user moves the process unit 40 in the detachment direction DD while rotating the process unit 40 about an axis parallel to the X direction in the process of pulling out the process unit 40 from the apparatus body 2. In addition, the fixing stay 78 is provided with a notch portion 78*a*, and the supply unit 200 is configured to pass through the notch portion 78*a* when the process unit 40 is pulled out from the apparatus body 2.

Note that the process unit 40 may be configured not to overlap the fixing unit 9 in a pull-out direction DD so that the process unit 40 can be pulled out in the pull-out direction DD without being rotated. Furthermore, for example, the process unit 40 may be configured not to overlap the fixing unit 9 in the Z direction so as to pull out the process unit 40 in the −Y direction.

The process unit 40 may be attached to the apparatus body 2 by reversing the procedure of the method for detaching the process unit 40 described above. That is, the process unit 40 is attached to the apparatus body 2 in the attachment direction AD (see FIG. 11) while being rotated about the X axis.

As described above, in the present embodiment, in the toner supply type image forming apparatus 1, the jam recovery and the attachment and detachment of the process unit 40 are performed from the same opening portion 91 on the back side of the image forming apparatus 1. As a result, for example, an area occupied by a movement locus of the process unit 40 when the process unit 40 is attached or detached can be reduced, and space efficiency in the image forming apparatus 1 can be increased. In addition, the opening portion 91 can secure a relatively large area, and workability in attachment and detachment of the process unit 40 and jam recovery is good. Therefore, it is possible to reduce the size of the main body while increasing the toner capacity accommodated in the storage unit 18, and to improve the jam recovering property and the maintainability of the process unit 40.

Configuration of Link

Next, the configurations of the links 96L and 96R for stably holding the transfer unit 7 at the closed position and the open position will be described with reference to FIGS. 27 to 34B. As illustrated in FIGS. 27 to 29D, the apparatus body 2 is provided with the links 96L and 96R, link holders 97L and 97R, and tension springs 98L and 98R as biasing portions.

More specifically, the link holder 97L is fixed to the left plate frame 74 by a screw, and the link holder 97L and the transfer unit 7 are connected by a link 96L. A tension spring 98L is provided between the link 96L and a spring hooking portion 74*a* provided on the left plate frame 74.

Similarly, the link holder 97R is fixed to the right plate frame 75 by a screw, and the link holder 97R and the transfer unit 7 are connected by a link 96R. A tension spring 98R is provided between the link 96R and a spring hooking portion (not illustrated) provided on the right plate frame 75. The link 96R, the link holder 97R, and the tension spring 98R provided on the right (+X direction) side of the transfer unit 7 have the same configurations as the link 96L, the link holder 97L, and the tension spring 98L provided on the left (−X direction) side of the transfer unit 7. Therefore, the link 96L, the link holder 97L, the tension spring 98L, and the peripheral configuration thereof will be mainly described below, and the description of the link 96R, the link holder 97R, the tension spring 98R, and the peripheral configuration thereof will be omitted.

As illustrated in FIGS. 28A to 29D, the link holder 97L fixed to the left plate frame 74 has a protruding portion 97Lg protruding toward the back side (−Y direction) of the image forming apparatus 1. An upper surface 97Lh of the protruding portion 97Lg extends parallel to the Y direction, and a surface of the protruding portion 97Lg on the −Y direction side constitutes a contact surface 97Lb. A recess 97Li is provided in the lowermost portion of the contact surface 97Lb. The protruding portion 97Lg is provided with a substantially triangular holding hole 97La extending in the X direction.

The link 96L includes a rotation shaft 96La engaged with the holding hole 97La with a gap, a link shaft 96Lb, and a link hole portion 96Lc provided on the opposite side of the rotation shaft 96La with the link shaft 96Lb interposed therebetween. The rotation shaft 96La is sufficiently smaller than the holding hole 97La, and is configured to be movable in the holding hole 97La. The tension spring 98L is locked to the link shaft 96Lb, and the tension spring 98L biases the link shaft 96Lb toward the spring hooking portion 74*a*. The engagement portion 7L of the transfer unit 7 is engaged with the link hole portion 96Lc. The engagement portion 7L includes a shaft portion extending in the −X direction from the transfer unit 7 and penetrating the link hole portion 96Lc, and a rib for preventing the shaft portion from coming off provided at a distal end of the shaft portion.

As illustrated in FIGS. 28A to 28D, in a state where the transfer unit 7 is located at the closed position, the link shaft 96Lb of the link 96L is biased toward the apparatus body 2 side along the Y direction by the tension spring 98L. When the engagement portion 7L is biased by the link hole portion 96Lc of the link 96L, the transfer unit 7 is biased toward the apparatus body 2 along the Y direction and is stably held at the closed position.

As illustrated in FIGS. 29A to 30A, in a state where the transfer unit 7 is located at the open position, a spring bent portion 96Lg provided in the vicinity of the rotation shaft 96La of the link 96L abuts on the tension spring 98L. The tension spring 98L is curved in the vicinity of the spring bent portion 96Lg by being pressed by the spring bent portion 96Lg. In the present embodiment, the tension spring 98L is constituted by a coil spring, but is not limited thereto. For example, the tension spring 98L may include a torsion bar or the like.

At this time, the link shaft 96Lb of the link 96L is engaged with the recess 97Li provided at the lowermost portion of the contact surface 97Lb. Further, since the tension spring 98L is curved by the spring bent portion 96Lg, the link shaft 96Lb of the link 96L is biased toward the rotation shaft 96La by the tension spring 98L. Since the recess 97Li has a shape recessed in a direction toward the rotation shaft 96La, the link shaft 96Lb is stably held by the recess 97Li. Therefore, the transfer unit 7 in which the moment acts in the opening direction by its own weight about the rotation shaft 7*c* is stably held at the open position by the engagement of the engagement portion 7L with the link hole portion 96Lc of the link 96L.

Figure 30A:
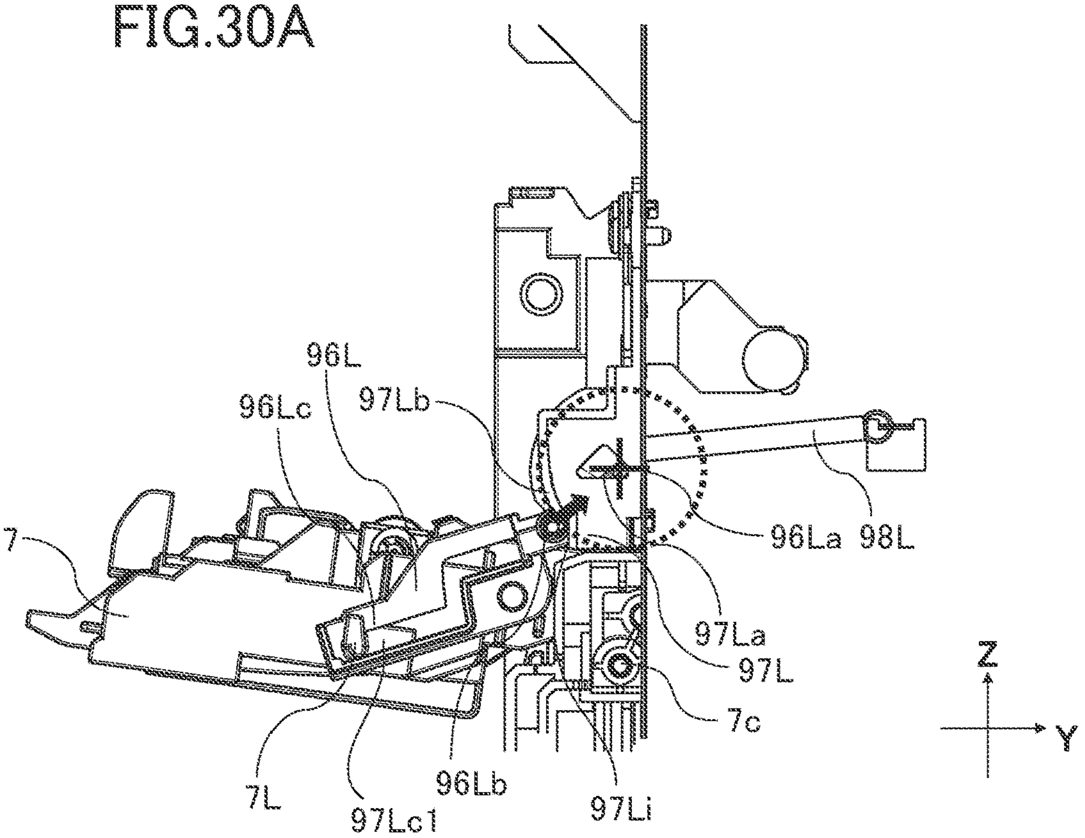
FIG. 30A is a side view illustrating the link when the transfer unit is located at the open position.
Figure 30B:
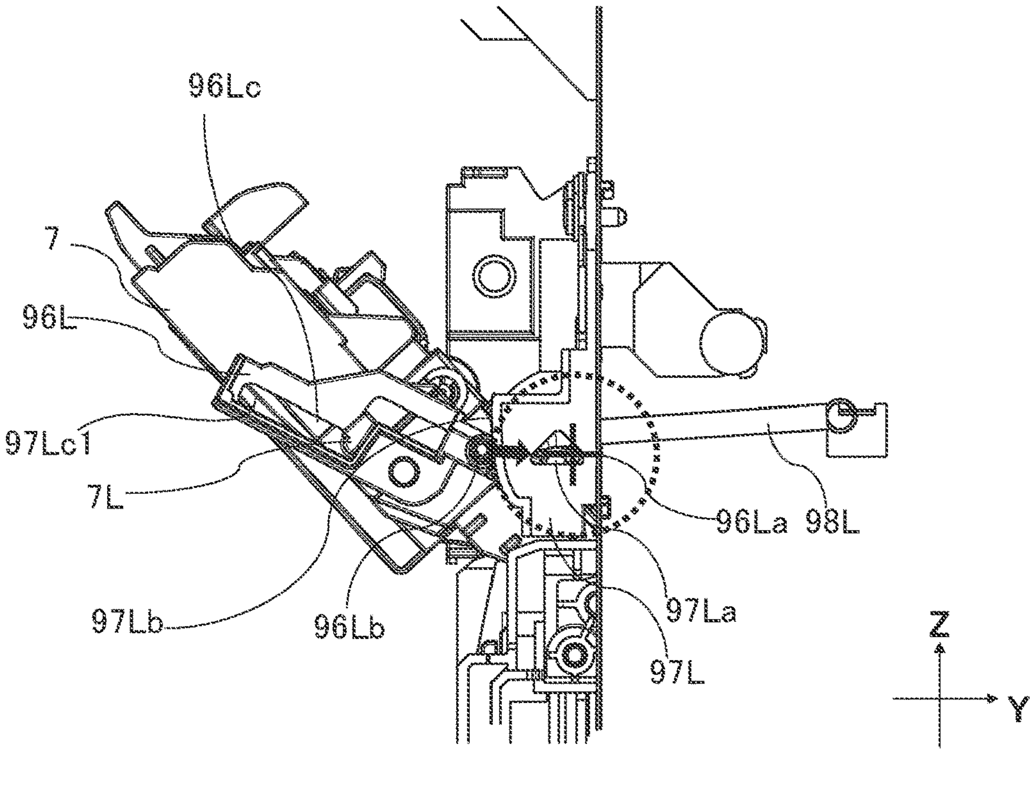
FIG. 30B is a side view illustrating the link in a state where the transfer unit is slightly lifted from the open position.

Next, the action of the link 96L when closing the transfer unit 7 from the open position to the closed position will be described with reference to FIGS. 30A to 33B. As illustrated in FIGS. 30A and 30B, the lower side of the contact surface 97Lb of the link holder 97L has an arc shape centered on the rotation shaft 96La. When the user lifts the transfer unit 7 located at the open position toward the closed position, a moment in the closing direction is transmitted from the transfer unit 7 to the link 96L via the engagement portion 7L and the link hole portion 96Lc. Then, the link shaft 96Lb of the link 96L moves upward while sliding on the contact surface 97Lb.

As described above, the lower side of the contact surface 97Lb has an arc shape centered on the rotation shaft 96La, and the link shaft 96Lb is biased toward the rotation shaft 96La by the tension spring 98L. Therefore, the biasing force acting on the link 96L from the tension spring 98L hardly acts as a rotation moment in the closing direction (or opening direction) of the link 96L about the rotation shaft 96La. Therefore, when opening and closing the transfer unit 7, the user can open and close the transfer unit 7 without feeling the biasing force of the tension spring 98L and without feeling discomfort.

The radius of the arc-shaped contact surface 97Lb is set to be slightly larger than the distance from the rotation shaft 96La to the link shaft 96Lb, and the rotation shaft 96La slightly floats in the −Y direction from the state of abutting the holding hole 97La. Therefore, when the transfer unit 7 is closed from the open position to the closed position, the link shaft 96Lb can reliably slide on the contact surface 97Lb, and the operation of the link 96L can be stabilized.

Figure 31A:
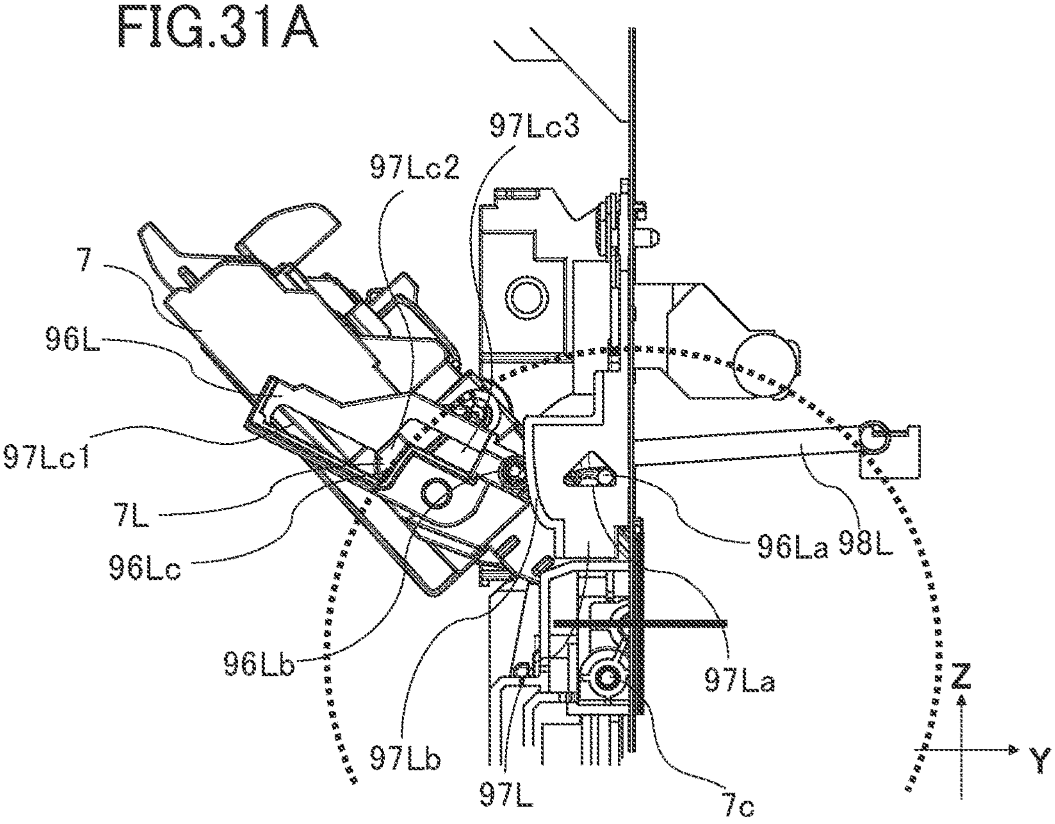
FIG. 31A is a side view illustrating the link on the way of the transfer unit to the closed position.
Figure 31B:
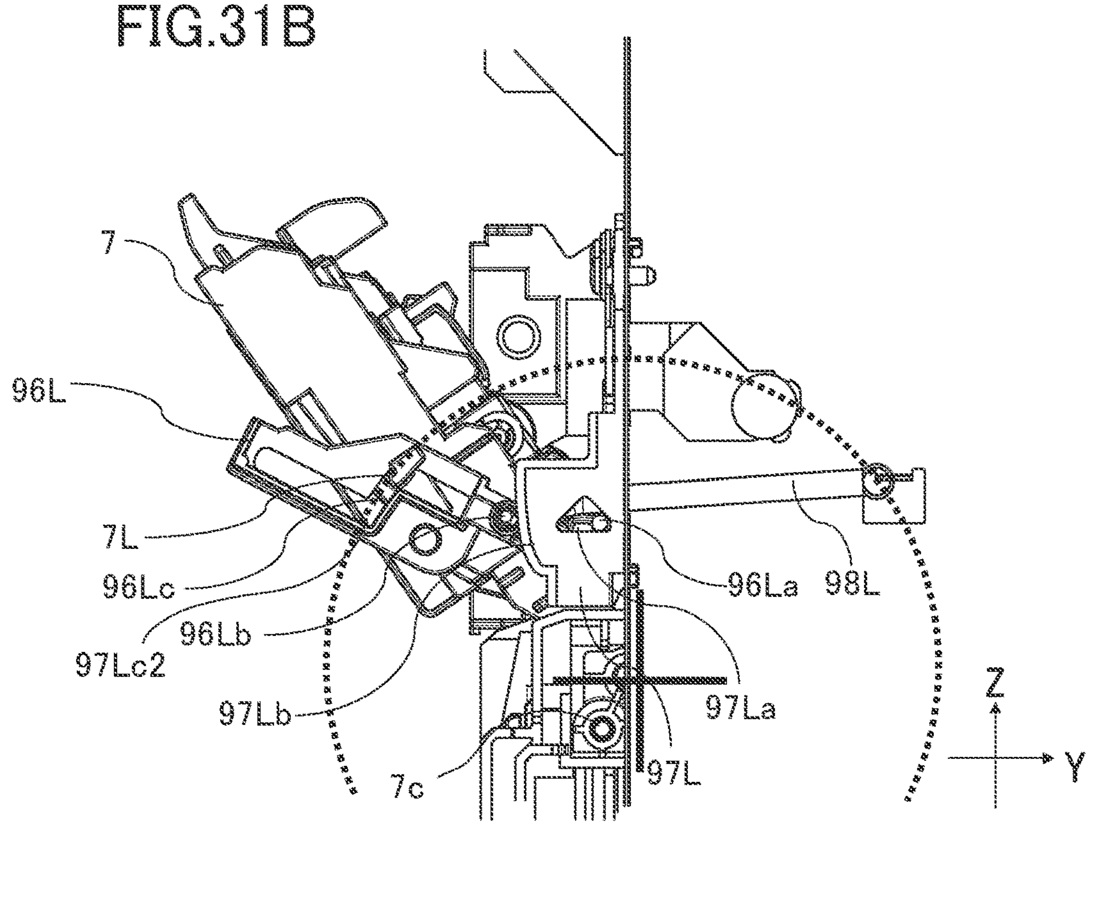
FIG. 31B is a side view illustrating the link on the way of the transfer unit to the closed position.

Next, as illustrated in FIGS. 31A and 31B, when the user further closes the transfer unit 7, only the transfer unit 7 is closed without rotating the link 96L. Here, the link hole portion 96Lc of the link 96L includes an arc portion 96Lc2 centered on the rotation shaft 7*c* of the transfer unit 7, a first straight portion 96Lc1, and a second straight portion 96Lc3. The first straight portion 96Lc1 extends from one end of the arc portion Lc2 in a direction away from the rotation shaft 96La. The second straight portion 96Lc3 extends from the other end of the arc portion Lc2 in a direction approaching the rotation shaft 96La.

When the transfer unit 7 is closed from the state illustrated in FIG. 30A to the state illustrated in FIG. 30B, the engagement portion 7L of the transfer unit 7 advances in the first straight portion 96Lc1 toward the arc portion 96Lc2. Since the movement locus of the engagement portion 7L intersects the first straight portion 96Lc1, the link 96L also rotates in conjunction with the rotation of the transfer unit 7.

When the transfer unit 7 is closed from the state illustrated in FIG. 31A to the state illustrated in FIG. 31B, the engagement portion 7L of the transfer unit 7 advances in the arc portion 96Lc2 toward the second straight portion 96Lc3. At this time, since the movement locus of the engagement portion 7L is along the arc portion 96Lc2, the link 96L does not rotate even if the transfer unit 7 rotates. Since the link 96L has the link shaft 96Lb biased toward the contact surface 97Lb by the tension spring 98L, the posture of the link can be maintained even when the transfer unit 7 is closed from the posture of FIG. 31A to the posture of FIG. 31B. In the state illustrated in FIGS. 31A and 31B, the bending of the tension spring 98L due to the spring bent portion 96Lg is eliminated, and the tension spring takes a linear posture.

As a result, for example, even if the transfer unit 7 is vigorously closed to the state illustrated in FIG. 30A and FIG. 30B and the inertial force in the closing direction is generated in the link 96L, the force from the transfer unit 7 does not act on the link 96L while the engagement portion 7L passes through the arc portion 96Lc2. Therefore, the inertial force in the closing direction of the link 96L can be attenuated, and the link 96L can be reduced from being completely closed vigorously.

Figure 32A:
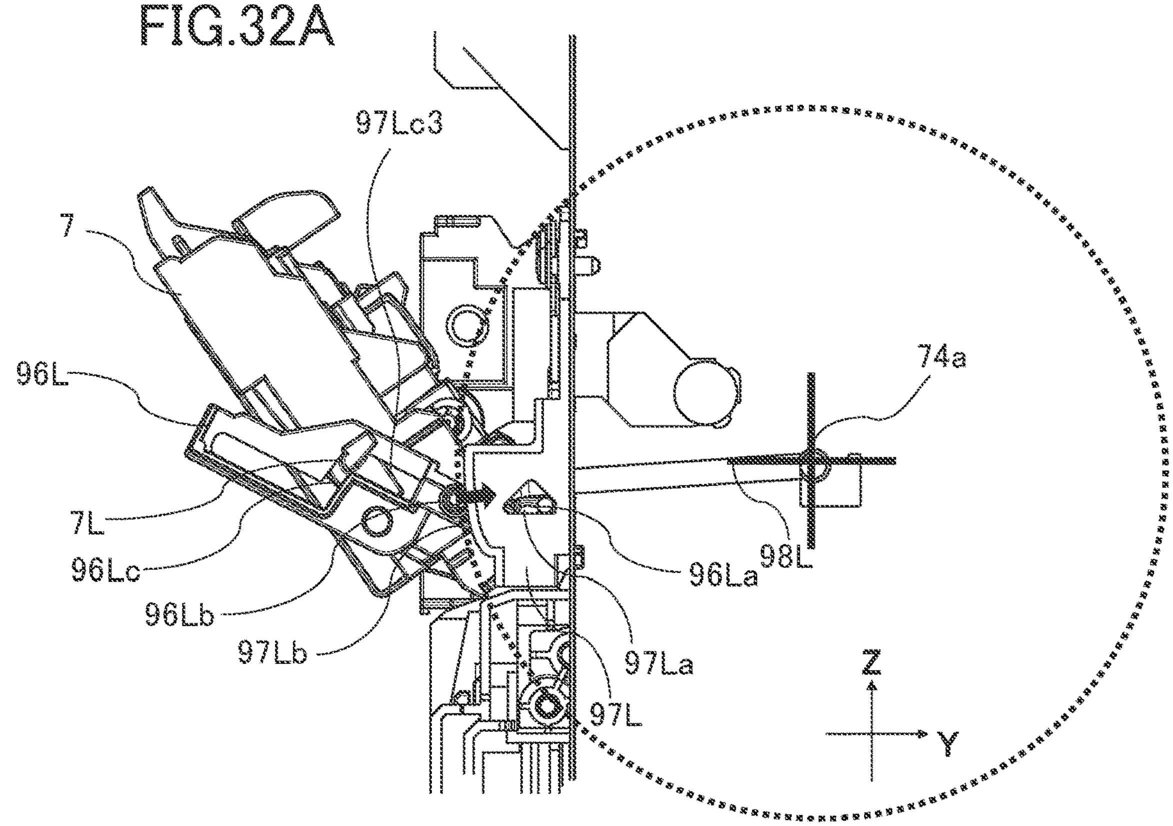
FIG. 32A is a side view illustrating the link on the way of the transfer unit to the closed position.
Figure 32B:
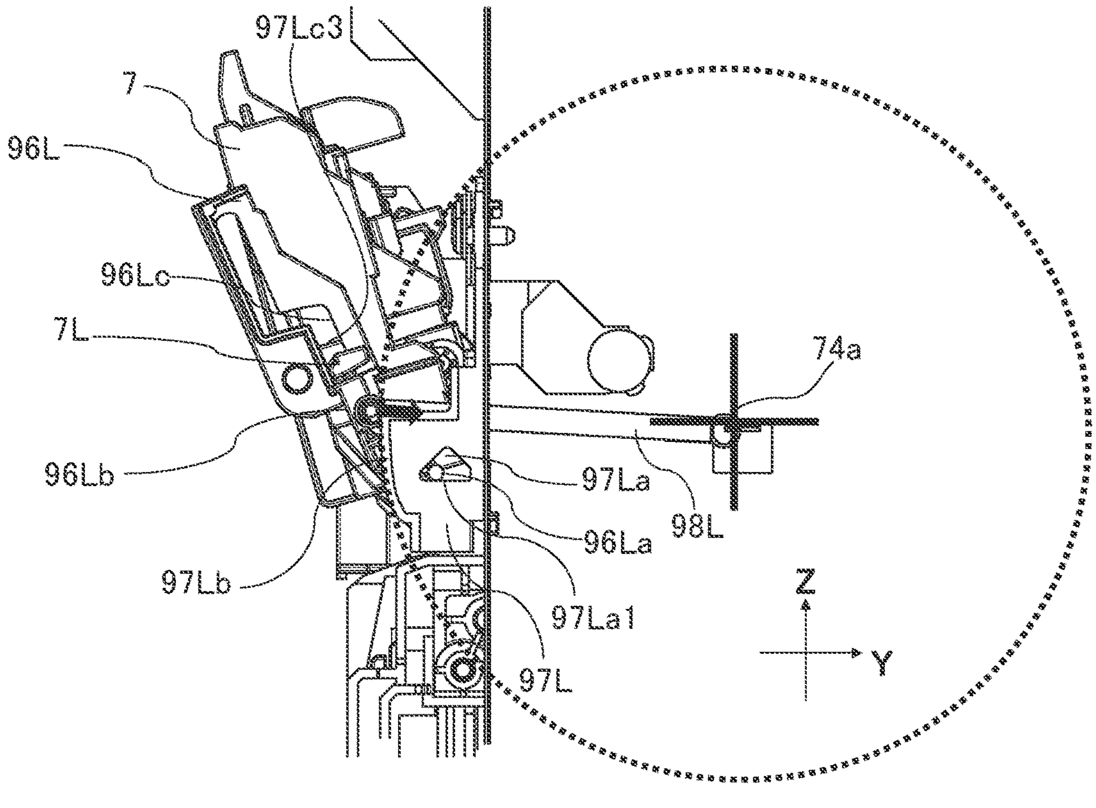
FIG. 32B is a side view illustrating the link on the way of the transfer unit to the closed position.

Next, as illustrated in FIGS. 32A and 32B, when the user further closes the transfer unit 7, the engagement portion 7L of the transfer unit 7 advances in the second straight portion 96Lc3. Since the movement locus of the engagement portion 7L intersects the second straight portion 96Lc3, the link 96L also rotates in conjunction with the rotation of the transfer unit 7. Here, the upper side of the contact surface 97Lb has an arc shape centered on the spring hooking portion 74*a*, and the link shaft 96Lb is biased toward the rotation shaft 96La by the tension spring 98L. Therefore, the biasing force acting on the link 96L from the tension spring 98L hardly acts as a rotation moment in the closing direction (or opening direction) of the link 96L about the rotation shaft 96La. Therefore, when opening and closing the transfer unit 7, the user can open and close the transfer unit 7 without feeling the biasing force of the tension spring 98L and without feeling discomfort.

During the operation of closing the transfer unit 7 by the user, the second straight portion 96Lc3 of the link hole portion 96Lc is pressed by the engagement portion 7L, whereby a clockwise moment about the link shaft 96Lb is generated in the link 96L. On the other hand, when the rotation shaft 96La receives the reaction force in the upward direction from the lower surface 97La1 of the holding hole 97La, a counterclockwise moment about the link shaft 96Lb is generated in the link 96L. The clockwise moment and the counterclockwise moment are balanced. Then, as the transfer unit 7 is closed by the user, the link shaft 96Lb rises while sliding on the contact surface 97Lb.

Figure 33A:
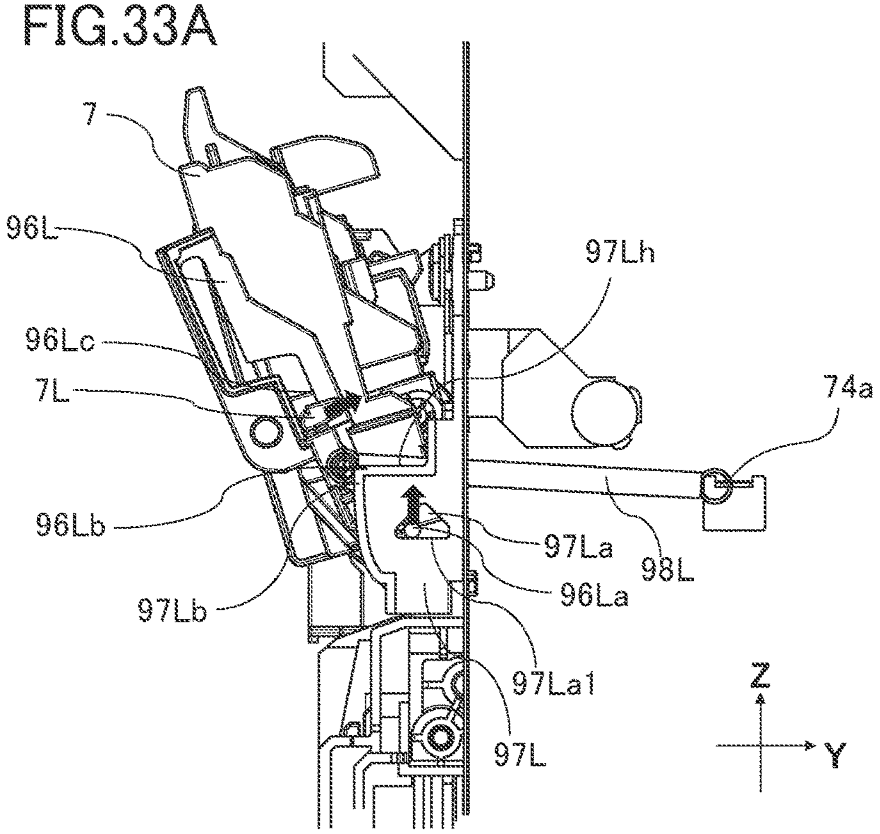
FIG. 33A is a side view illustrating the link on the way of the transfer unit to the closed position.
Figure 33B:
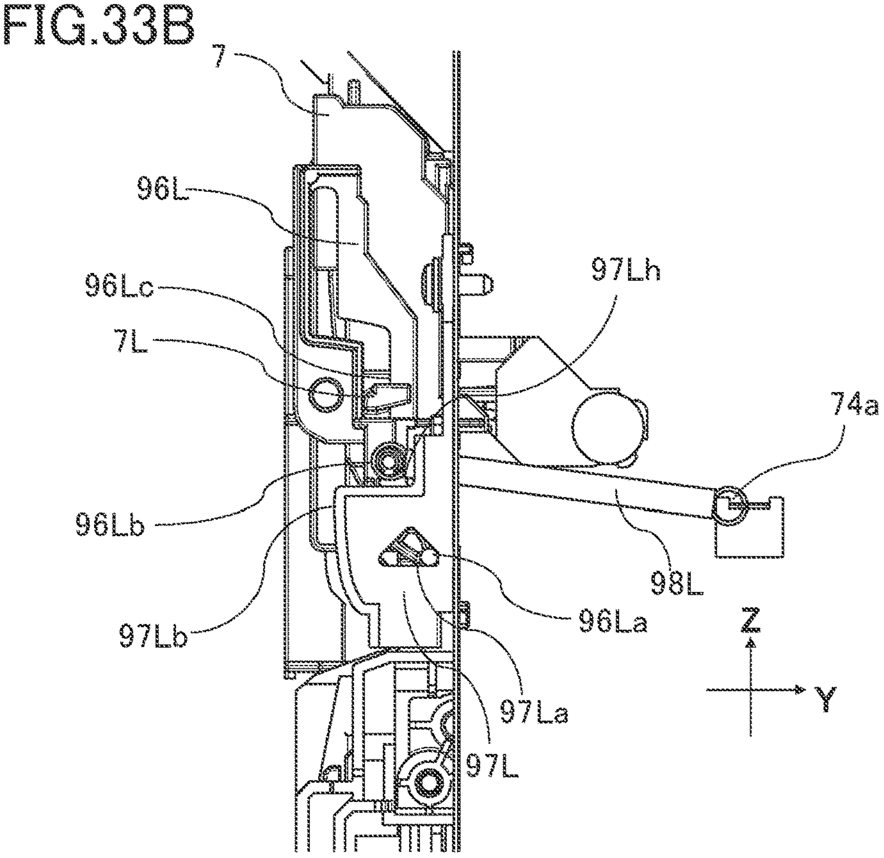
FIG. 33B is a side view illustrating the link when the transfer unit is located at the closed position.

Next, as illustrated in FIGS. 33A and 33B, when the user further closes the transfer unit 7, the link shaft 96Lb passes through the upper end portion of the contact surface 97Lb. As a result, the engagement between the link shaft 96Lb and the contact surface 97Lb is released, and the link 96L is rotated in the closing direction by the tension spring 98L. At this time, the link shaft 96Lb moves toward the inside of the apparatus body 2, that is, the spring hooking portion 74*a* along the upper surface 97Lh. Then, the transfer unit 7 is biased to the closed position by the link 96L via the link hole portion 96Lc and the engagement portion 7L, and is stably held at the closed position.

Figure 34A:
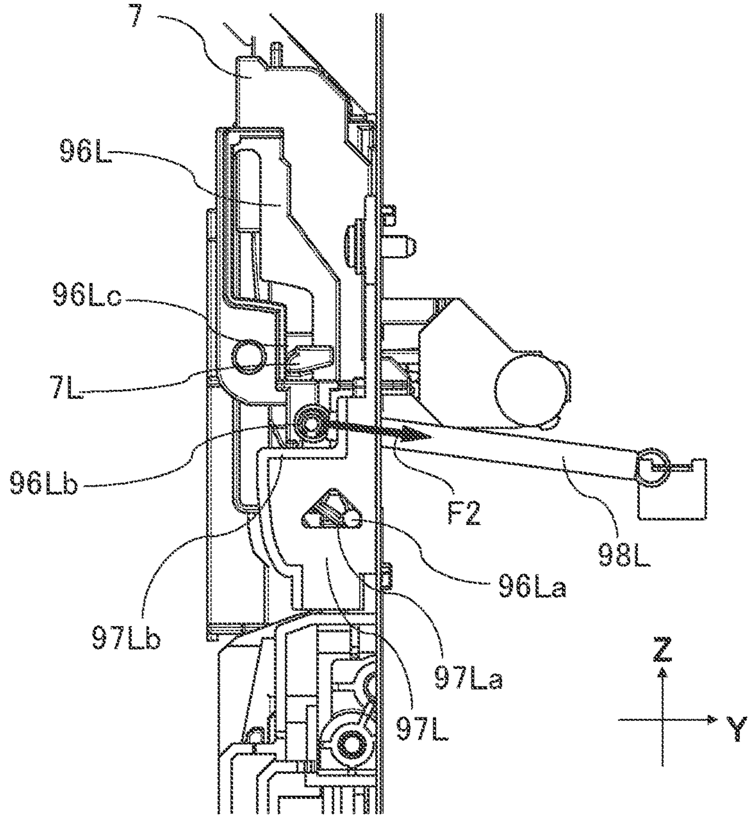
FIG. 34A is a side view illustrating the link when the transfer unit is located at the closed position.
Figure 34B:
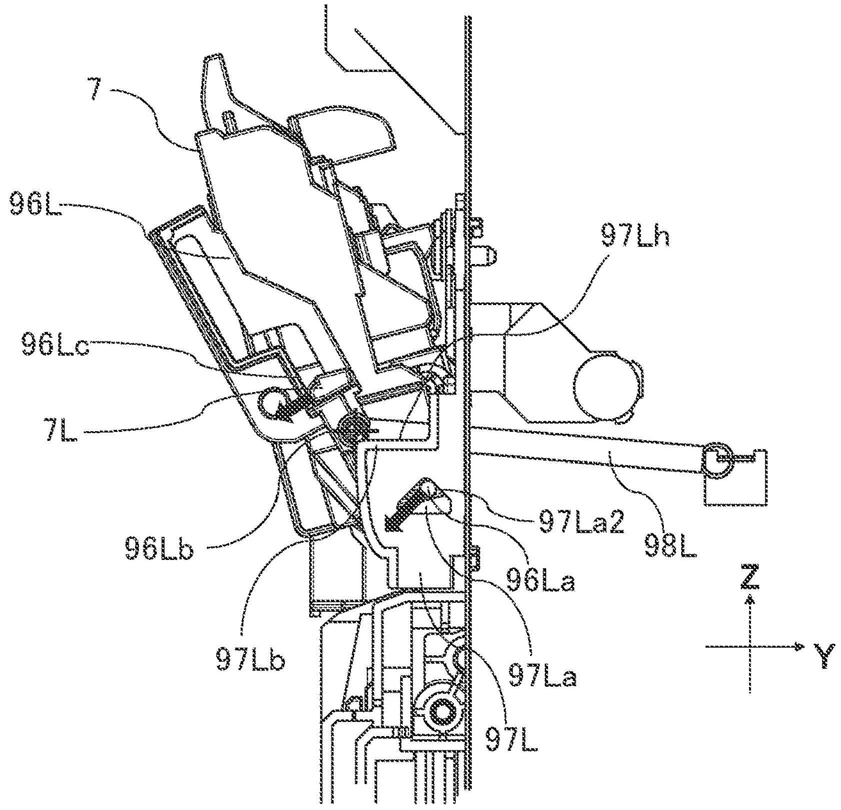
FIG. 34B is a side view illustrating the link in a state where the transfer unit is slightly opened from the closed position.

Next, a state in which the transfer unit 7 is opened from the state illustrated in FIG. 34A to the state illustrated in FIG. 34B will be described. As illustrated in FIGS. 34A and 34B, when the user opens the transfer unit 7 from the closed position, the second straight line portion 96Lc3 of the link hole portion 96Lc is pressed by the engagement portion 7L. As a result, a counterclockwise moment about the link shaft 96Lb is generated in the link 96L.

On the other hand, when the rotation shaft 96La receives the reaction force in the lower left direction from the right upper surface 97La2 of the holding hole 97La, a clockwise moment about the link shaft 96Lb is generated in the link 96L. The counterclockwise moment and the clockwise moment are balanced. Then, as the transfer unit 7 is opened by the user, the link shaft 96Lb moves in the −Y direction while sliding on the upper surface 97Lh against the biasing force of the tension spring 98L. As a result, the transfer unit 7 and the link 96L reach the state illustrated in FIG. 32B.

Here, the procedure of opening the transfer unit 7 to the open position follows the order of FIGS. 32B, 32A, 31B, 31A, 30B, and 30A. However, the order is merely the reverse of the procedure for closing the transfer unit 7 described above, and the description thereof will be omitted. In the state illustrated in FIGS. 32B, 32A, 31B, 31A, 30B, and 30A, the biasing force acting on the link 96L from the tension spring 98L hardly acts as a rotation moment in the opening direction (closing direction) of the link 96L about the rotation shaft 96La. Therefore, when opening and closing the transfer unit 7, the user can open and close the transfer unit 7 without feeling the biasing force of the tension spring 98L and without feeling discomfort.

Lock Member

Figure 27:
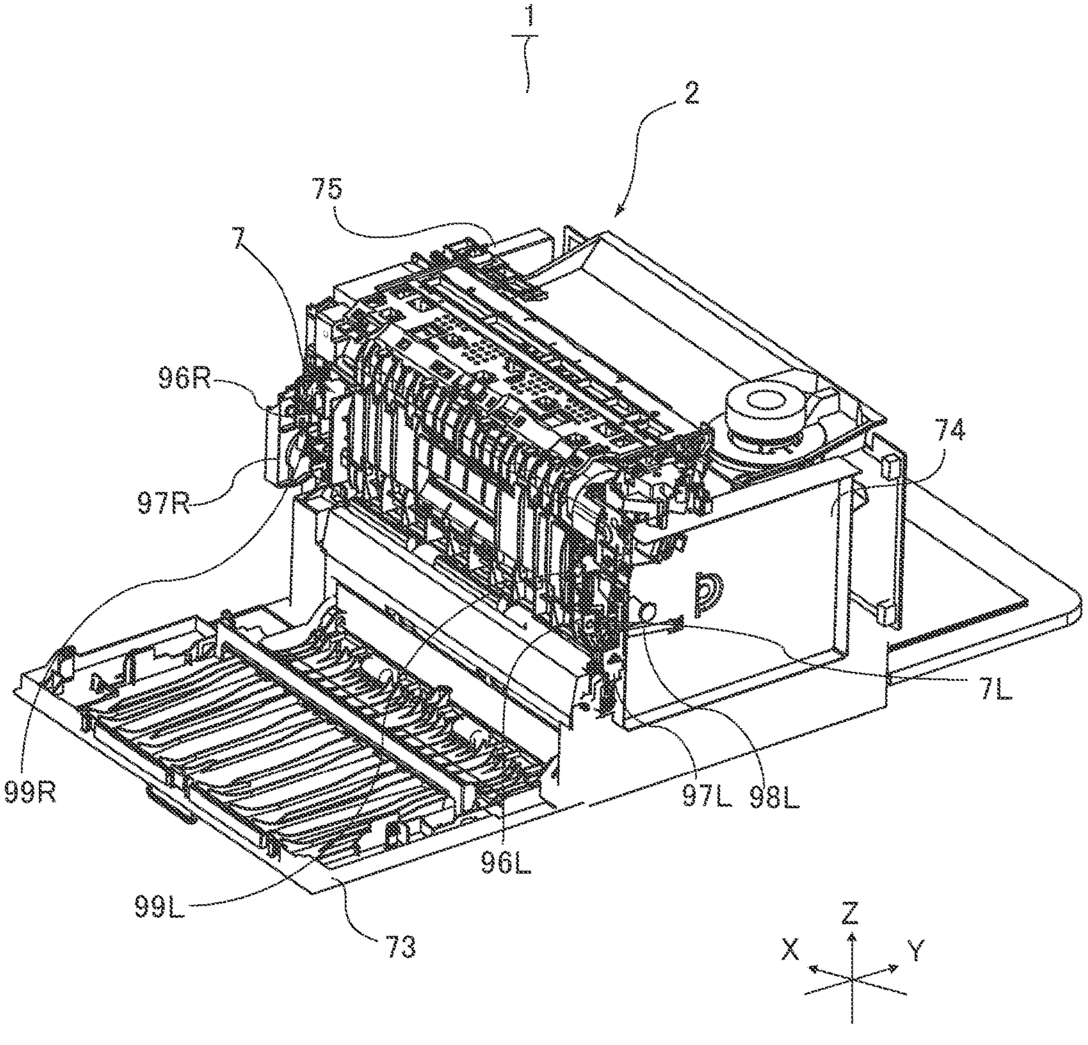
FIG. 27 is a perspective view illustrating the image forming apparatus in a state where the back cover is opened.
Figure 28A:
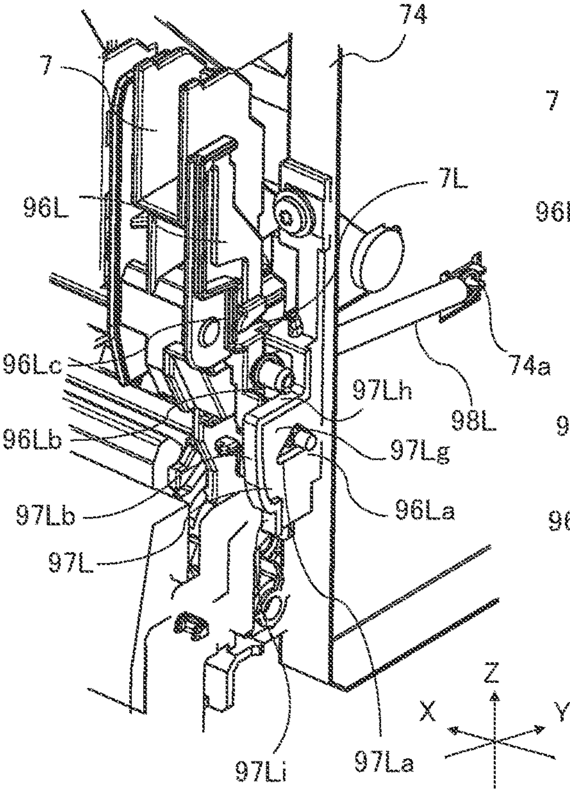
FIG. 28A is a perspective view illustrating a link and a peripheral configuration thereof when the transfer unit is located at a closed position.
Figure 28B:
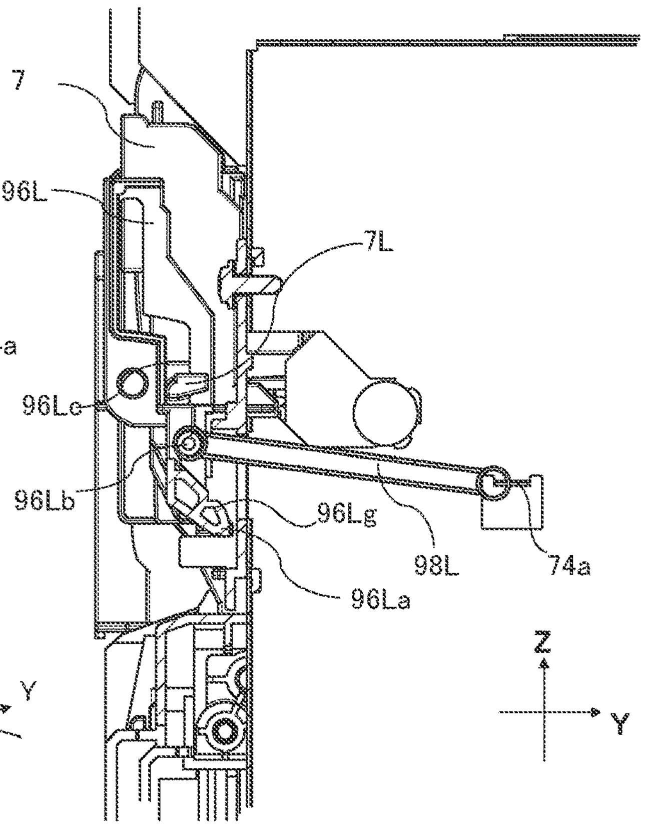
FIG. 28B is a side view illustrating a link and a peripheral configuration thereof.
Figure 28C:
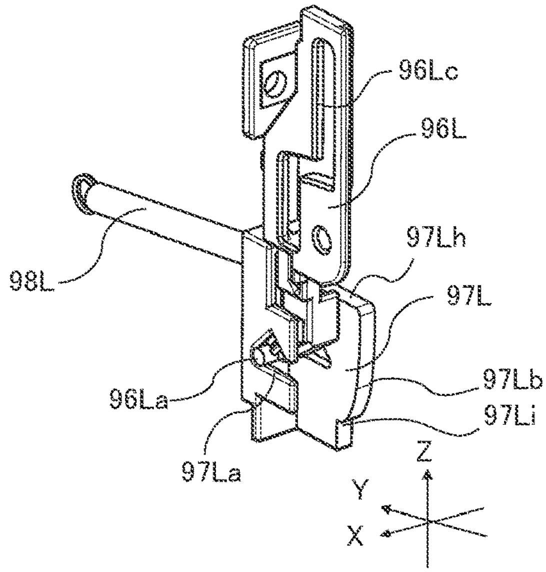
FIG. 28C is a perspective view illustrating the link, a link holder, and a tension spring.
Figure 28D:
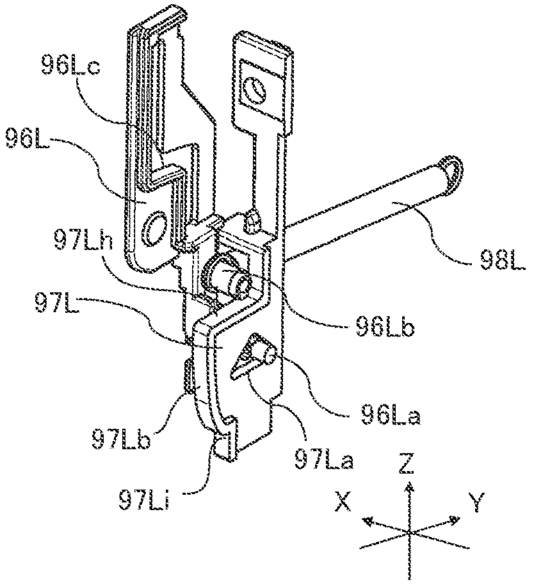
FIG. 28D is another perspective view illustrating the link, the link holder, and the tension spring.
Figure 29A:
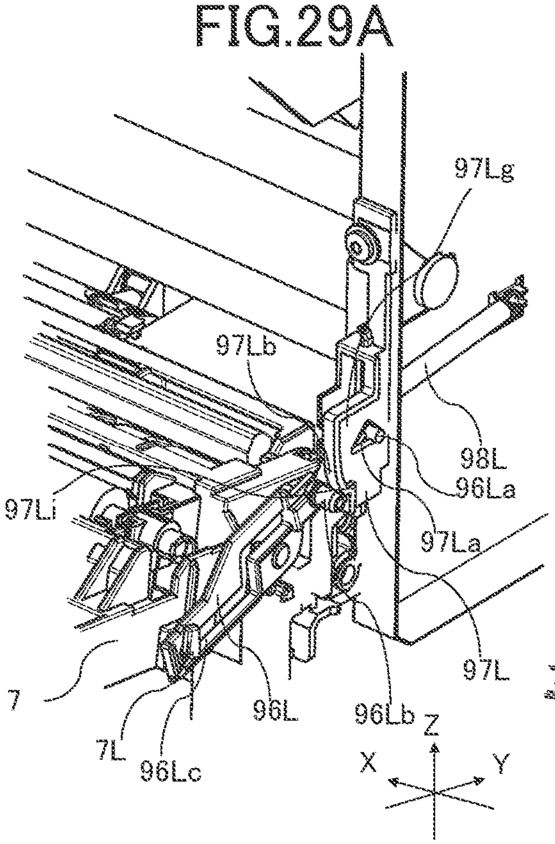
FIG. 29A is a perspective view illustrating the link and the peripheral configuration thereof when the transfer unit is located at an open position.
Figure 29B:
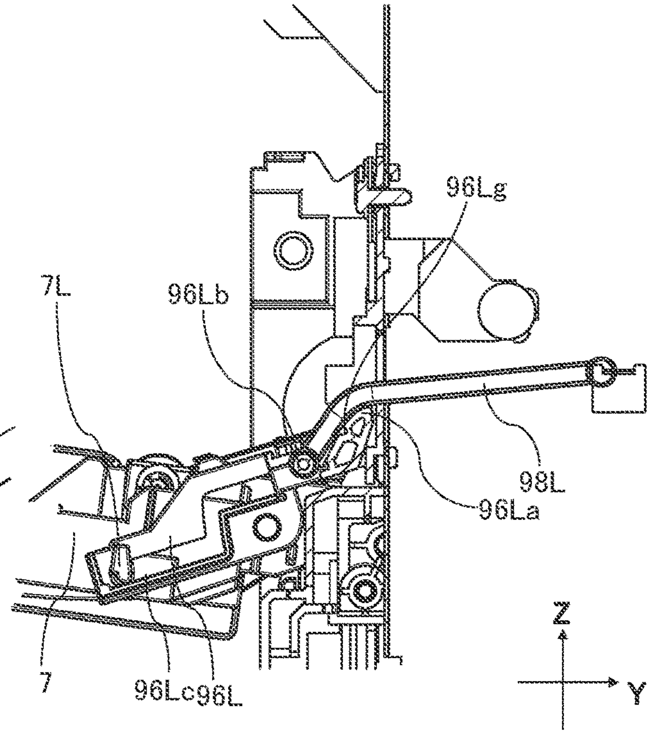
FIG. 29B is a side view illustrating the link and the peripheral configuration thereof.
Figure 29C:
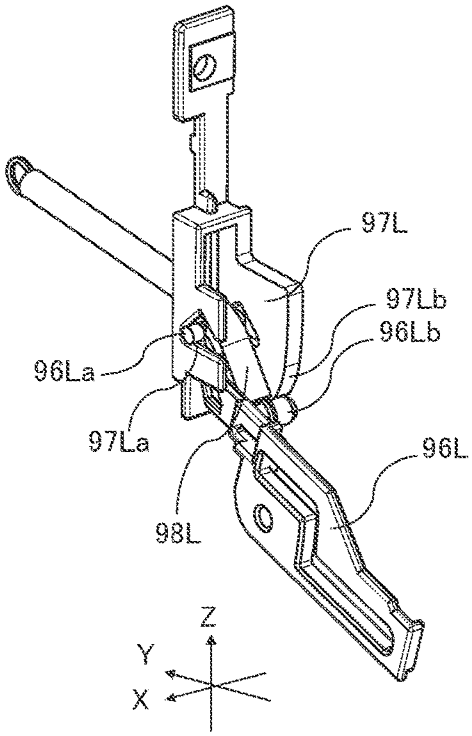
FIG. 29C is a perspective view illustrating the link, the link holder, and the tension spring.
Figure 29D:
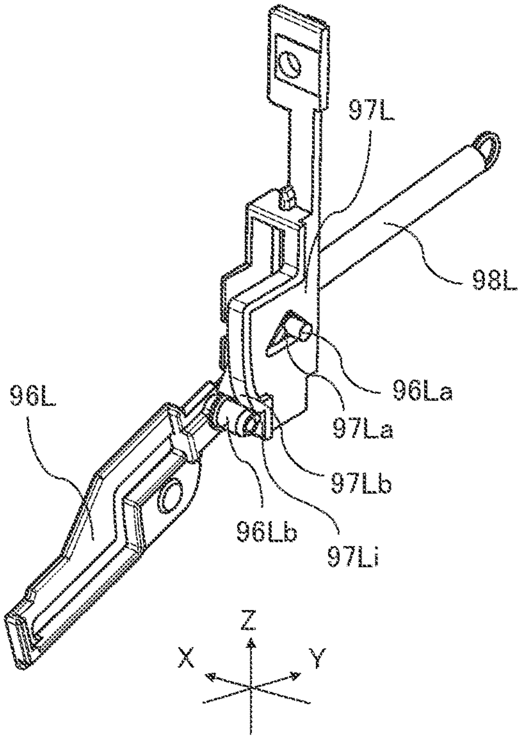
FIG. 29D is another perspective view illustrating the link, the link holder, and the tension spring.

Next, as illustrated in FIG. 27, the lock members 99L and 99R provided at both ends of the transfer unit 7 in the X direction will be described. The lock members 99L and 99R are locked to the apparatus body 2 when the image forming apparatus 1 forms an image, thereby restricting the transfer unit 7 from rotating from the closed position in the opening direction. Since the lock members 99L and 99R have the same configuration, the lock member 99R and the peripheral configuration thereof will be mainly described below, and the description of the lock member 99L and the peripheral configuration thereof will be omitted.

Figure 35A:
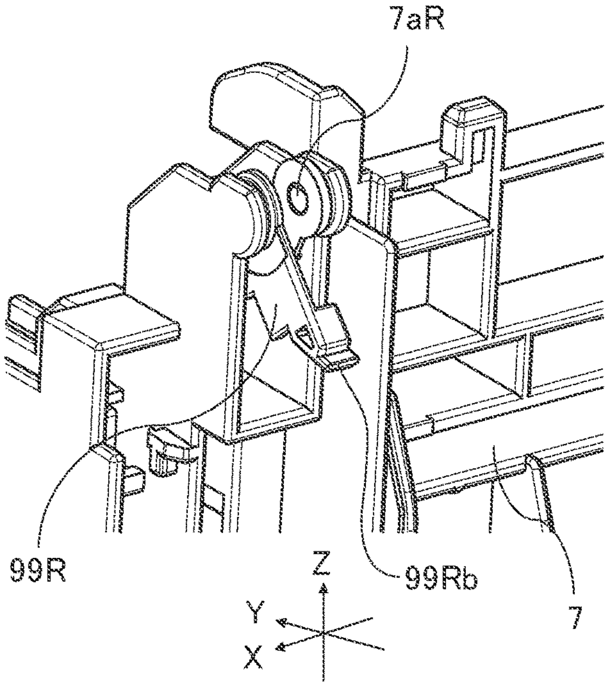
FIG. 35A is a perspective view illustrating a state in which a lock member is viewed from a −Y direction.
Figure 35B:
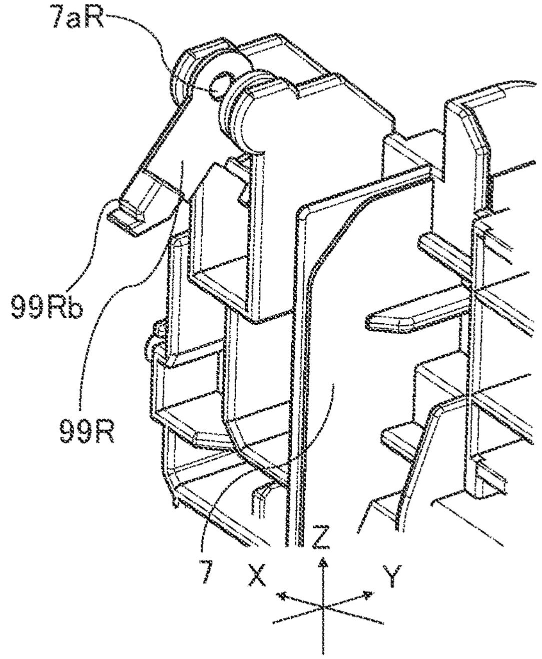
FIG. 35B is another perspective view illustrating a state in which the lock member is viewed from the −Y direction.
Figure 35C:
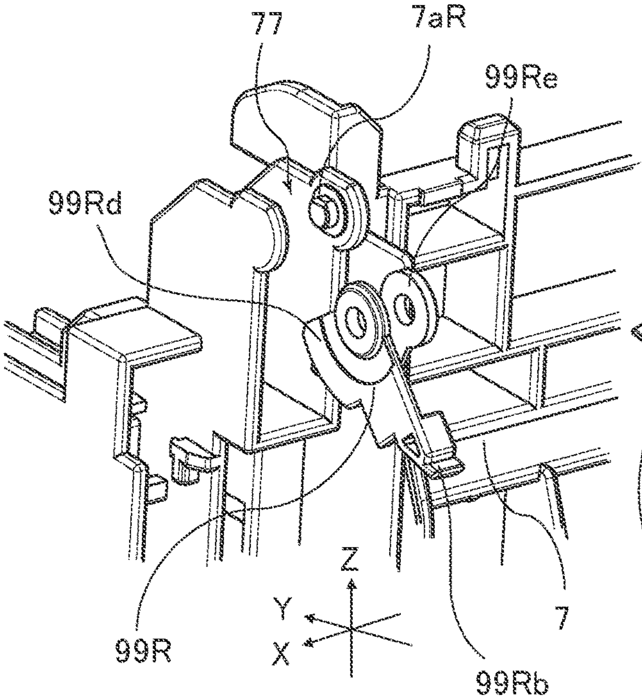
FIG. 35C is a perspective view illustrating a state in which the lock member is removed from the transfer unit.
Figure 35D:
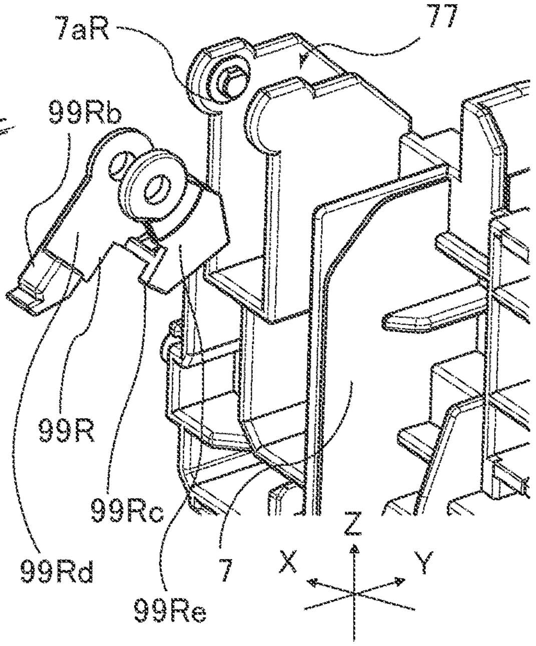
FIG. 35D is another perspective view illustrating a state in which the lock member is removed from the transfer unit.

FIGS. 35A and 35B are perspective views illustrating a state in which the lock member 99R is viewed from the −Y direction. FIGS. 35C and 35D are perspective views illustrating a state in which the lock member 99R is removed from the transfer unit 7. As illustrated in FIGS. 35A to 35D, the lock member 99R is rotatably supported by a lock shaft 7*a*R provided in the transfer unit 7 and extending in the X direction.

The lock member 99R includes a contact portion 99Ra (see FIG. 37B), a distal end portion 99Rb, and an abutment portion 99Rc. As illustrated in FIGS. 35C and 35D, the lock member 99R is divided into a first bearing portion 99Rd located on the positive side in the X direction and a second bearing portion 99Re located on the negative side in the X direction. As will be described below in detail, each of the first bearing portion 99Rd and the second bearing portion 99Re includes a bearing that engages with the lock shaft 7*a*R. The contact portion 99Ra corresponds to an inner region of a connection portion connecting the first bearing portion 99Rd and the second bearing portion 99Re. Here, the term "inside" means that it is located inside when the lock shaft 7*a*R is viewed as the center (see FIG. 37B). The distal end portion 99Rb is provided on the first bearing portion 99Rd side, and the abutment portion 99Rc is provided on the second bearing portion 99Re side. Details of the contact portion 99Ra, the distal end portion 99Rb, and the abutment portion 99Rc will be described below.

Figure 36:
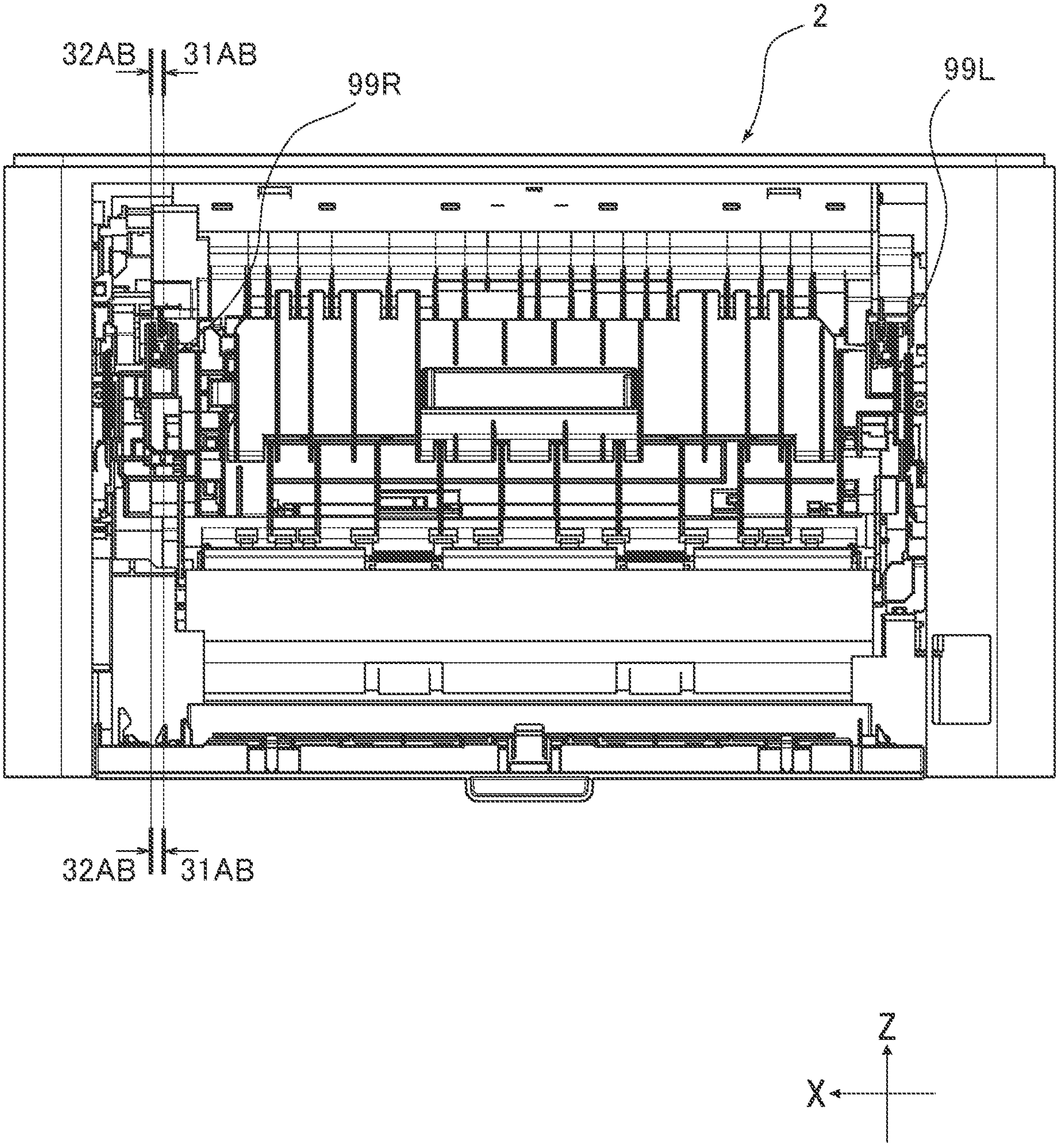
FIG. 36 is a view of the apparatus body as viewed from the −Y direction.
Figure 37A:
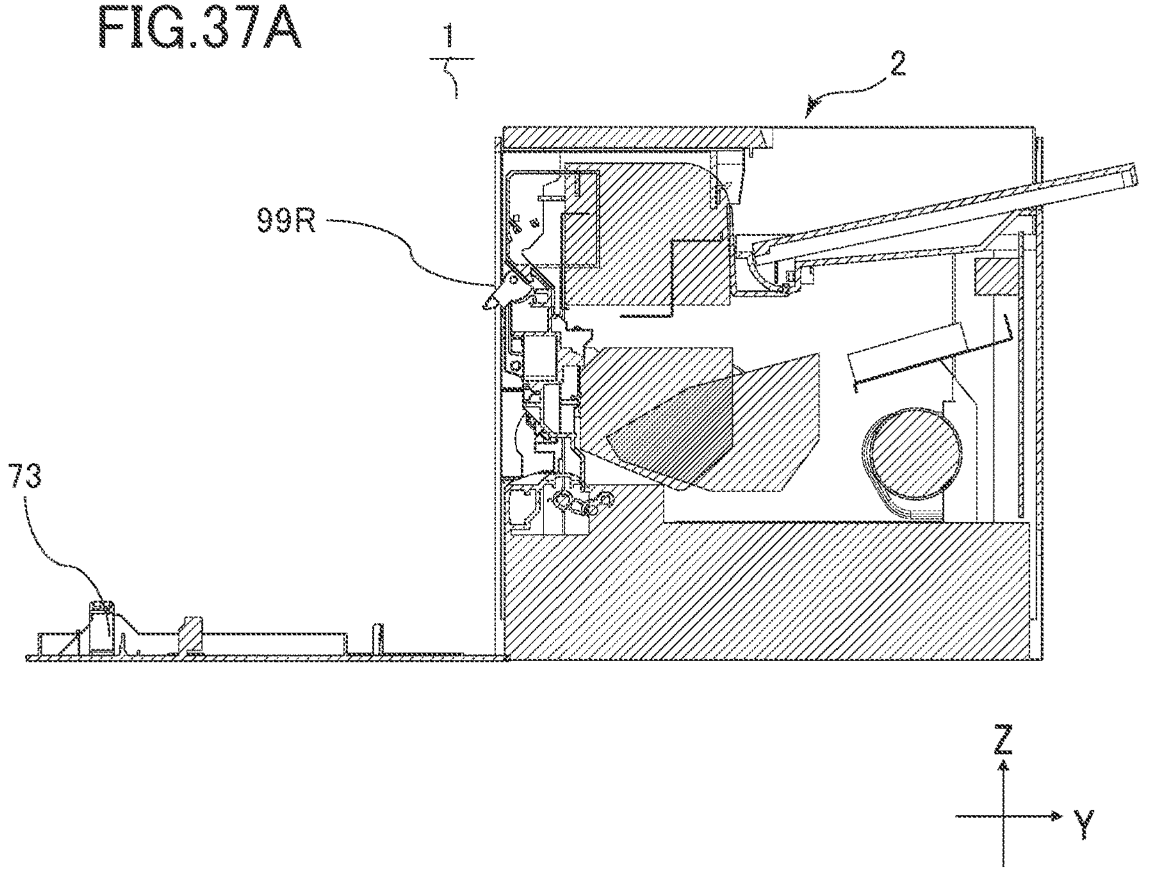
FIG. 37A is a cross-sectional view taken along a line 31AB-31AB in FIG. 36, illustrating the image forming apparatus when the lock member is located at an unlock position.
Figure 37B:
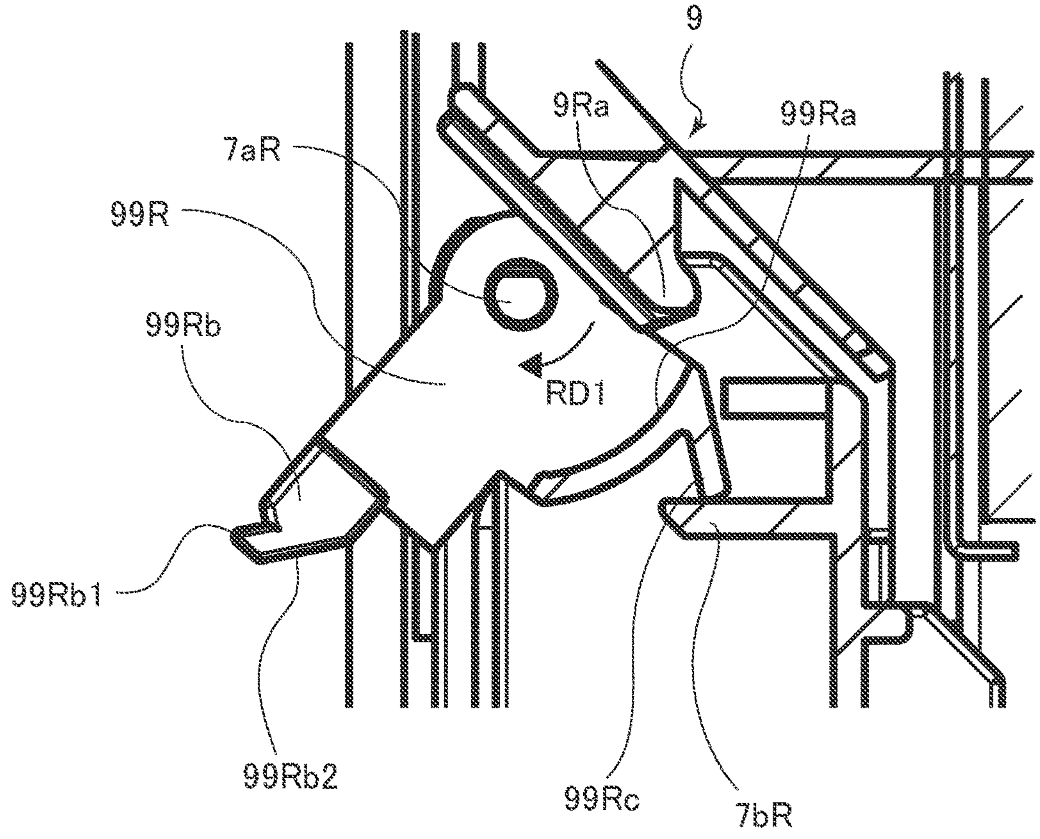
FIG. 37B is a cross-sectional view taken along the line 31AB-31AB in FIG. 36, illustrating the lock member located at the unlock position.
Figure 38A:
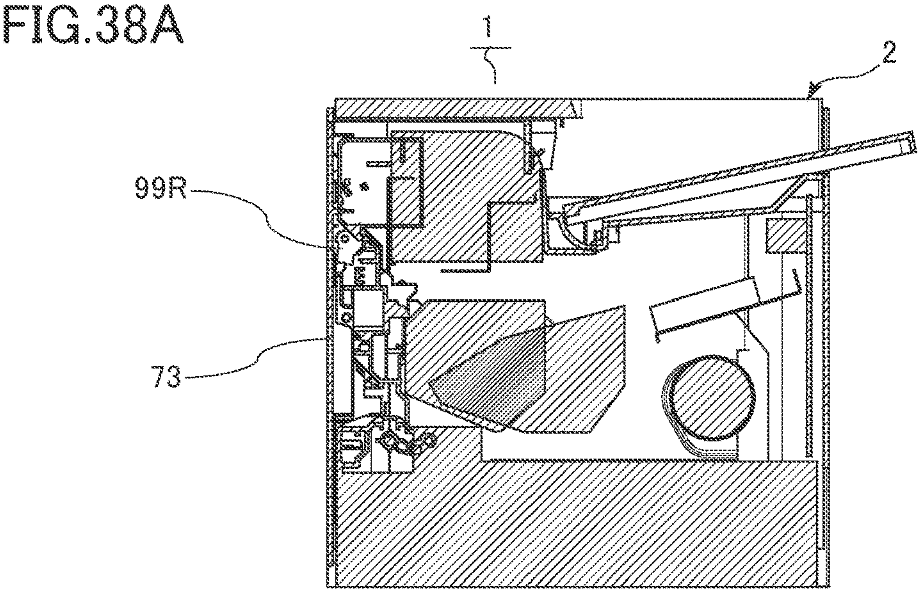
FIG. 38A is a cross-sectional view taken along a line 32AB-32AB in FIG. 36, illustrating the image forming apparatus when the lock member is located at the lock position.
Figure 38B:
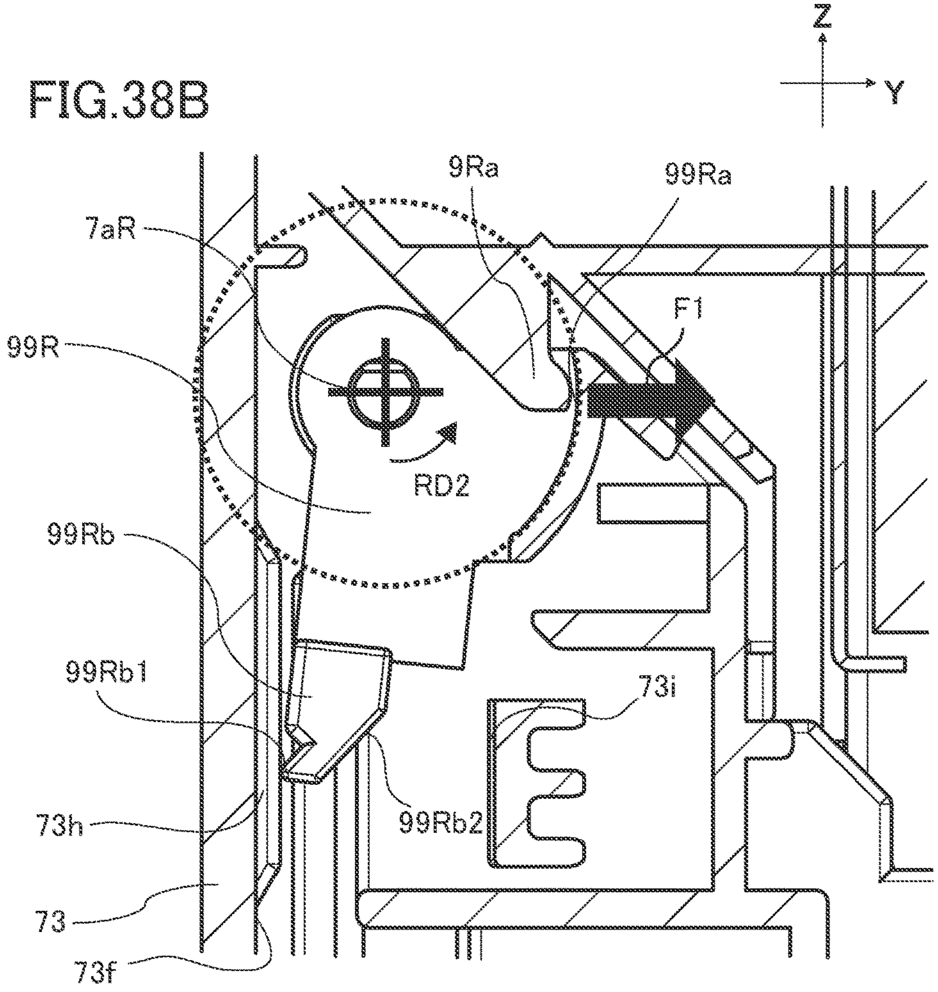
FIG. 38B is a sectional view taken along the line 32AB-32AB in FIG. 36, illustrating the lock member located at the unlock position.

FIG. 36 is a view of the apparatus body 2 as viewed from the −Y direction, and FIG. 37A is a cross-sectional view of 31AB-31AB in FIG. 36, illustrating the image forming apparatus 1 when the lock member 99R is located at the unlock position. FIG. 37B is a cross-sectional view taken along line 31AB-31AB in FIG. 36, illustrating the lock member 99R located in the unlock position. FIG. 38A is a cross-sectional view of 32AB-32AB in FIG. 36, illustrating the image forming apparatus 1 when the lock member 99R is located at the lock position. FIG. 38B is a cross-sectional view taken along line 32AB-32AB in FIG. 36, illustrating the lock member 99R located at the lock position.

Note that the distal end portion 99Rb and the abutment portion 99Rc are arranged to be shifted from each other in the X direction, and a cross section of 31AB-31AB in FIG. 36 is a cross section including the abutment portion 99Rc. A cross section of 32AB-32AB in FIG. 36 is a cross section including the distal end portion 99Rb.

As illustrated in FIGS. 37A and 37B, when the back cover 73 is located at the open position, the lock member 99R is biased in the direction of arrow RD1 by its own weight. Then, the lock member 99R biased in the direction of the arrow RD1 is held at the unlock position by the abutment portion 99Rc abutting against a stopper portion 7*b*R. In the present embodiment, the stopper portion 7*b*R is provided in the transfer unit 7, but the present invention is not limited thereto. For example, the stopper portion 7*b*R may be provided in the fixing unit 9 (see FIG. 2) or another portion of the apparatus body 2.

When the lock member 99R is located at the unlock position, the contact portion 99Ra of the lock member 99R is not engaged with the abutted portion 9Ra provided in the fixing unit 9. Here, the abutted portion 9Ra is provided in a space 77 surrounded by a U-shaped member into which the lock member 99R is inserted described in FIGS. 35C and 35D. Therefore, the transfer unit 7 provided with the lock member 99R is not locked to the apparatus body 2 including the abutted portion 9Ra, and the user can open and close the transfer unit 7.

Next, as illustrated in FIGS. 38A and 38B, when the back cover 73 is located at the closed position, the lock member 99R is located at the lock position. At this time, the contact portion 99Ra of the lock member 99R is engaged with the abutted portion 9Ra provided in the fixing unit 9. The contact portion 99Ra as the first engagement portion is formed in an arc shape centered on the lock shaft 7*a*R, and the abutted portion 9Ra as the second engagement portion is formed such that a tip thereof is tapered toward the contact portion 99Ra. As illustrated in FIG. 38B, the contact portion 99Ra that abuts (engages) with the abutted portion 9Ra receives the reaction force F1 as the third reaction force from the abutted portion 9Ra. The reaction force F1 is a force in a direction along the Y direction starting from the lock shaft 7*a*R, and acts as a force in a direction of closing the transfer unit 7 toward the closed position.

The frictional force between the abutted portion 9Ra and the contact portion 99Ra caused by the reaction force F1 and the pressed portion 99Rb1 to be described below are pressed by the pressing portion 73*h* of the back cover 73, whereby the lock member 99R is held at the lock position. Then, the contact portion 99Ra of the lock member 99R is engaged with the abutted portion 9Ra, whereby the transfer unit 7 provided with the lock member 99R is locked with respect to the apparatus body 2 including the abutted portion 9Ra and held at the closed position. In addition, since the contact portion 99Ra receives the reaction force F1 to rotate in the closing direction, the transfer unit 7 is more stably held at the closing position.

In the present embodiment, when the lock member 99R is located at the lock position, the contact portion 99Ra and the abutted portion 9Ra are provided so as to abut and engage with each other, but the present invention is not limited thereto. For example, there may be a slight gap between the contact portion 99Ra and the abutted portion 9Ra, and the contact portion 99Ra and the abutted portion 9Ra may be engaged with each other only when the transfer unit 7 receives a reaction force F4 illustrated in FIG. 41 described below from the recording material P. As a result, when the transfer unit 7 receives the reaction force F4 from the recording material P, the rotation of the transfer unit 7 in the opening direction is restricted.

The distal end portion 99Rb of the lock member 99R includes a pressed portion 99Rb1 facing the pressing portion 73*h* provided on the inner side surface 373*f* of the back cover 73, and an inclined surface 99Rb2 provided on the opposite side of the pressed portion 99Rb1 in the direction of arrow RD1. The inclined surface 99Rb2 is formed to extend downstream in the direction of the arrow RD2 toward the radially inner side of the lock member 99R.

The lock member 99R located at the unlock position rotates toward the lock position when the pressed portion 99Rb1 is pressed by the pressing portion 73*h* of the back cover 73. That is, the lock member 99R rotates from the unlock position to the lock position in conjunction with the closing operation of the back cover 73. Further, the pressing portion 73*h* as the second moving portion moves the lock member 99R from the unlock position to the lock position.

Figure 39:
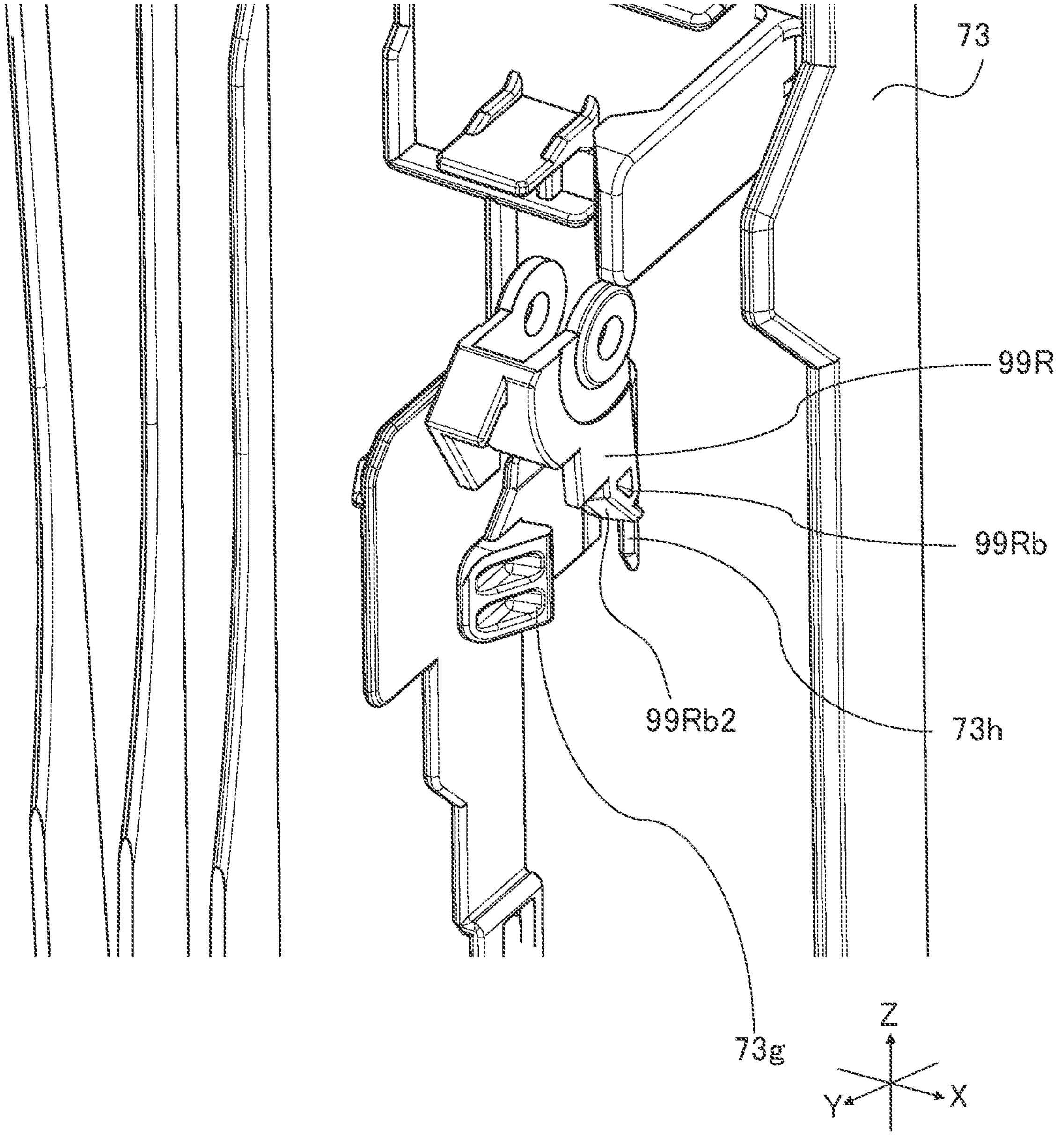
FIG. 39 is a perspective view illustrating an unlocking claw.

As illustrated in FIGS. 38B and 39, the back cover 73 is provided with an unlocking claw 73*i*. The unlocking claw 73i is disposed downstream of the pressing portion 73h in the closing direction of the back cover 73. In FIG. 39, only back cover 73 and lock member 99 are illustrated for the sake of explanation.

Figure 40A:
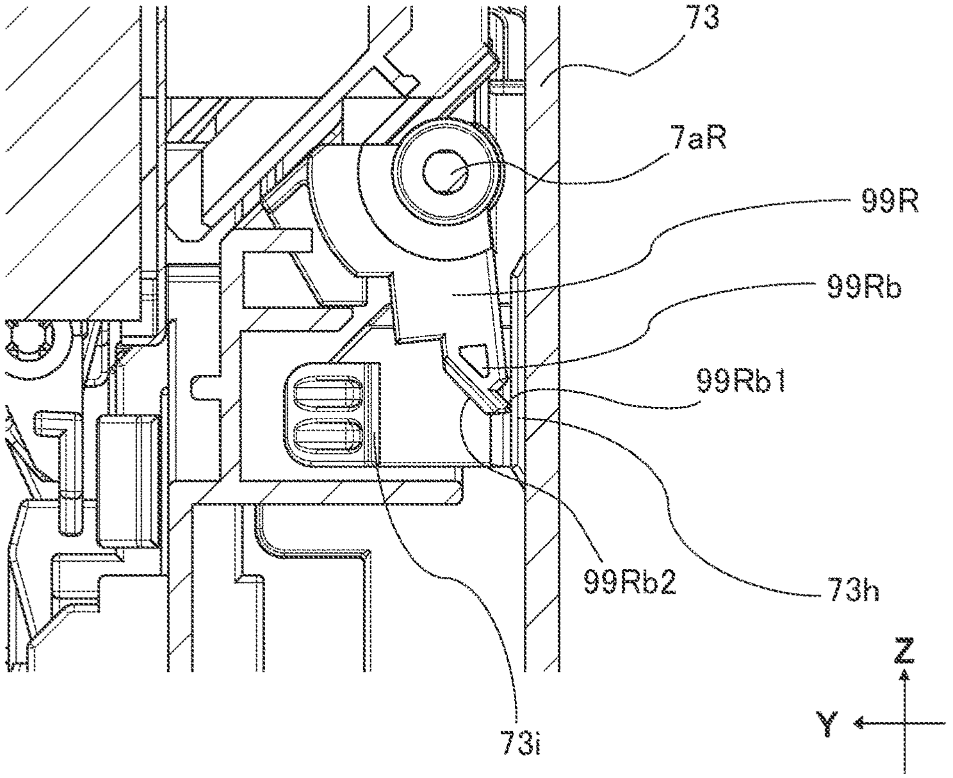
FIG. 40A is a cross-sectional view illustrating the lock member in a state where the back cover is closed.
Figure 40B:
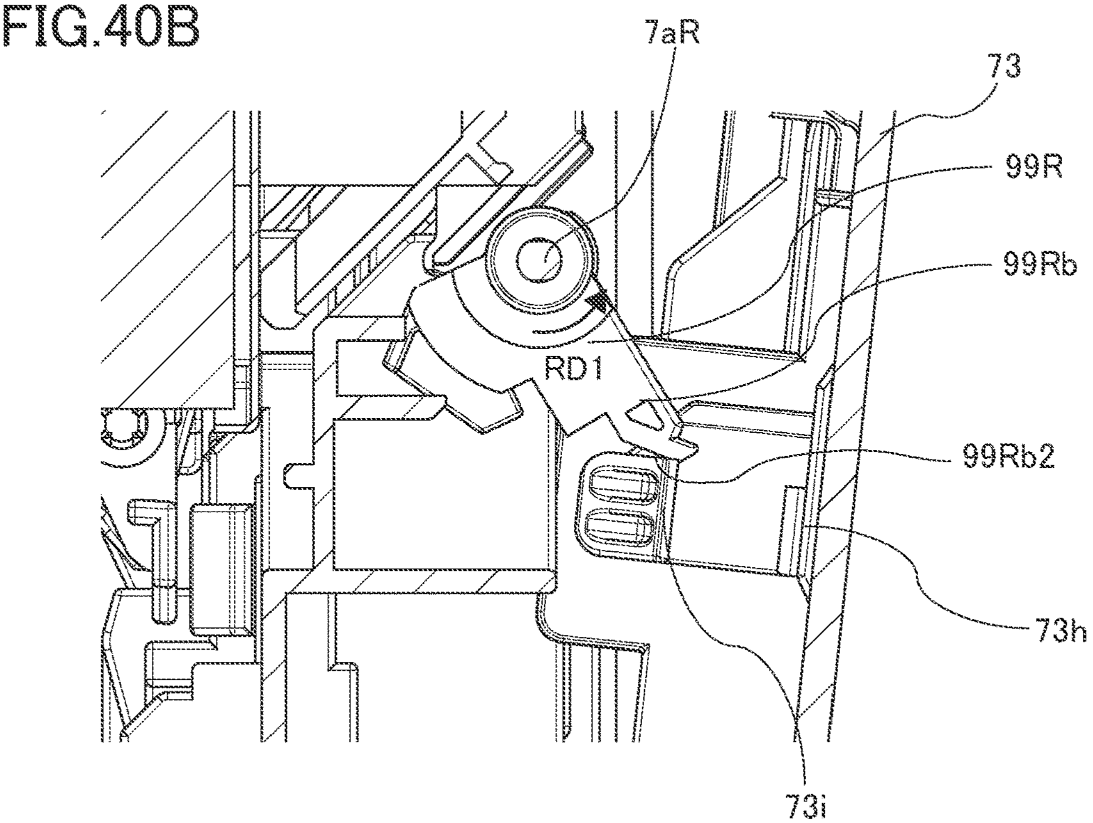
FIG. 40B is a cross-sectional view illustrating the lock member rotated toward the unlock position by the unlocking claw.

As illustrated in FIGS. 40A and 40B, when the back cover 73 is opened and closed between the open position and the closed position, the movement locus of the unlocking claw 73i does not overlap the lock member 99R located at the unlock position but overlaps the lock member 99R located at the lock position. Therefore, for example, when the recording material P is jammed in the conveyance path 19 (see FIG. 41) and the back cover 73 is opened from the closed position to the open position, the unlocking claw 73i provided on the back cover 73 comes into contact with the inclined surface 99Rb2 of the lock member 99R. Then, when the back cover 73 is further opened, the unlocking claw 73i presses the inclined surface 99Rb2, and the lock member 99R rotates in the direction of the arrow RD1. That is, the unlocking claw 73i as the first moving portion moves the lock member 99R from the lock position to the unlock position.

When the lock member 99R rotates in the direction of the arrow RD1, the engagement between the abutted portion 9Ra and the contact portion 99Ra is released, and the lock member 99 moves to the unlock position illustrated in FIG. 37B by its own weight. As described above, in the present embodiment, since the lock member 99R moves from the lock position to the unlock position only by the user opening the back cover 73, the user can immediately open the transfer unit 7, and usability can be improved. In addition, since the inclined surface 99Rb2 is inclined with respect to the direction of the arrow RD1 centered on the lock shaft 7aR, the inclined surface 99Rb2 can smoothly contact the unlocking claw 73i.

Further, since the unlocking claw 73i does not interfere with the lock member 99R located at the unlock position, the unlocking claw does not contact the lock member 99R located at the unlock position when the back cover 73 is closed from the open position to the closed position. Then, the lock member 99R is rotated from the unlock position to the lock position by the pressing portion 73h provided on the back cover 73. The pressing portion 73h is formed to be longer than the unlocking claw 73i in the Z direction. Therefore, while the unlocking claw 73i does not come into contact with the lock member 99R located at the unlock position, the pressing portion 73h can press the lock member 99R located at the unlock position.

In the present embodiment, the movement locus of the unlocking claw 73i is configured not to overlap the lock member 99R located at the unlock position but to overlap the lock member 99R located at the lock position, but is not limited thereto. For example, the movement locus of the unlocking claw 73i may be configured to overlap the unlock position and the lock member 99R located at the lock position. In this case, although the lock member 99R located at the unlock position comes into contact with the unlocking claw 73i, at least one of the unlocking claw 73i and the lock member 99R may be elastically deformed so that the unlocking claw 73i can pass through the lock member 99R.

Next, the necessity of the lock member 99R (99L) will be described. As described above, the links 96L and 96R hold the transfer unit 7 at the closed position by the biasing force F2 (see FIG. 34A) of the tension springs 98L and 98R. The biasing force F2 of the tension springs 98L and 98R is larger than the reaction force F3 (hereinafter, simply referred to as a reaction force F3 of the transfer roller 7a) received by the transfer roller 7a from the photosensitive drum 11. In other words, the reaction force F3 as the first reaction force is a reaction force that the transfer unit 7 receives from the apparatus body 2 including the photosensitive drum 11.

Figure 41:
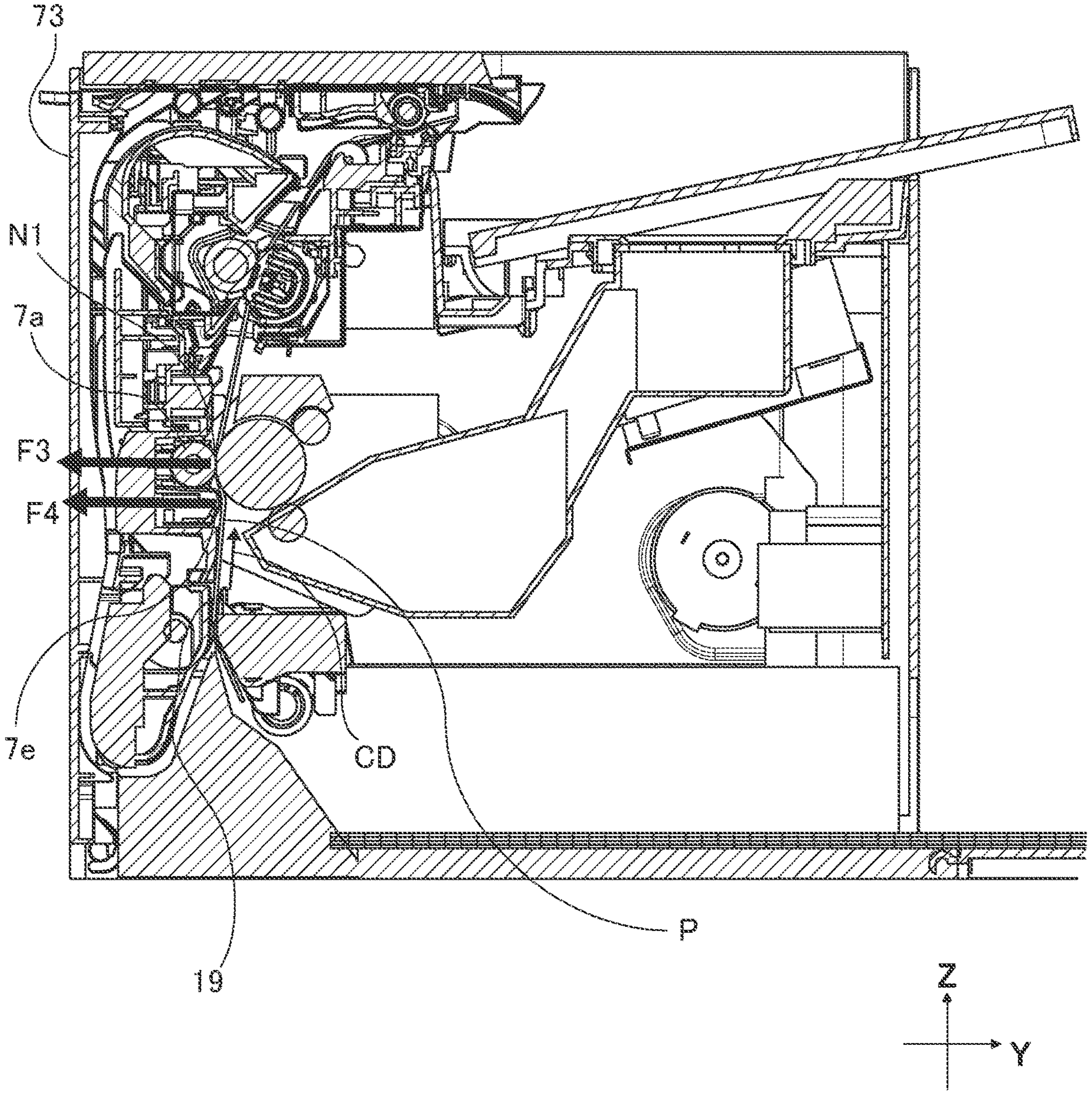
FIG. 41 is a cross-sectional view illustrating a reaction force acting on the transfer unit.

Here, in the present embodiment, as illustrated in FIG. 41, the transfer unit 7 is provided with a protruding portion 7e. The protruding portion 7e as the contact portion is provided adjacent to the transfer nip N1 at a position upstream of the transfer nip N1 in a recording material conveyance direction CD. When the recording material P is conveyed on the conveyance path 19, the protruding portion 7e is pressed by the recording material P. At this time, the force received by the protruding portion 7e from the recording material P is referred to as a reaction force F4 as a second reaction force from the recording material P. Accordingly, the transfer unit 7 is biased in the opening direction. Note that the protruding portion 7e has a function of correcting the posture of the recording material P so that the recording material P is wound around the photosensitive drum 11 at a larger angle, and the image transfer at the transfer nip N1 is stabilized. That is, the protruding portion 7e curves the recording material P toward the photosensitive drum 11.

The biasing force F2 of the tension springs 98L and 98R is larger than the reaction force F3 of the transfer roller 7a, but is set to be smaller than the sum of the reaction force F3 of the transfer roller 7a and the reaction force F4 from the recording material P. Note that, in the present embodiment, for example, in a recording material having higher stiffness than plain paper having a grammage of 60 to 90 (g/$m^2$), a relationship of $F3<F2<(F3+F4)$ is established. For example, when a piece of A4 sized thick paper having a grammage of 91 to 199 (g/$m^2$) is applied to the recording material P, a relationship of $F3<F2<(F3+F4)$ is established. In addition, the biasing force F2 acts as a force in a direction of closing the transfer unit 7 toward the closed position, and the reaction forces F3 and F4 act as forces in a direction of opening the transfer unit 7 toward the open position. Therefore, only by the biasing force F2 of the tension springs 98L and 98R, the transfer unit 7 rotates from the closed position in the opening direction when the recording material P is conveyed on the conveyance path 19. As a result, image formation at the transfer nip N1 and conveyance of the recording material P become unstable.

Therefore, in the present embodiment, the transfer unit 7 is held at the closed position by the lock members 99L and 99R. As a result, even when the recording material P is conveyed on the conveyance path 19, image formation and conveyance of the recording material P can be stably performed. In addition, if the biasing force F2 of the tension springs 98L and 98R is set to be larger than the sum of the reaction force F3 of the transfer roller 7a and the reaction force F4 from the recording material P, the operation force required for the user to open the transfer unit 7 becomes large. That is, by providing the lock members 99L and 99R, the biasing force F2 of the tension springs 98L and 98R for biasing the transfer unit 7 in the closing direction can be set small, and the operation force necessary for opening the transfer unit 7 can be reduced. Accordingly, usability can be improved.

In addition, a case where the tension springs 98L and 98R are not provided or a case where the biasing force F2 of the tension springs 98L and 98R is smaller than the reaction force F3 of the transfer roller 7a will be considered. In this case, when the back cover 73 is opened, the transfer unit 7 is biased from the closed position to the open position by the reaction force F3, and may be vigorously opened to the open position. Since the transfer unit 7 is relatively heavy, when the transfer unit 7 is vigorously opened to the open position, the rotation shaft 7*c* and the links 96L and 96R of the transfer unit 7 may be damaged. Therefore, as in the present embodiment, by setting the biasing force F2 of the tension springs 98L and 98R to be larger than the reaction force F3 of the transfer roller 7*a*, it is possible to prevent the transfer unit 7 from being opened when the back cover 73 is opened. As a result, it is possible to suppress breakage of the transfer unit 7 and the support configuration thereof.

Fourth Embodiment

Next, a fourth embodiment of the present invention will be described. In the fourth embodiment, the present invention is applied to an image forming apparatus 3300 having a configuration different from that of the image forming apparatus 1 of the third embodiment. Note that configurations similar to those of the fourth embodiment will be described with illustration omitted or the same reference numerals given to the drawings.

Figure 42:
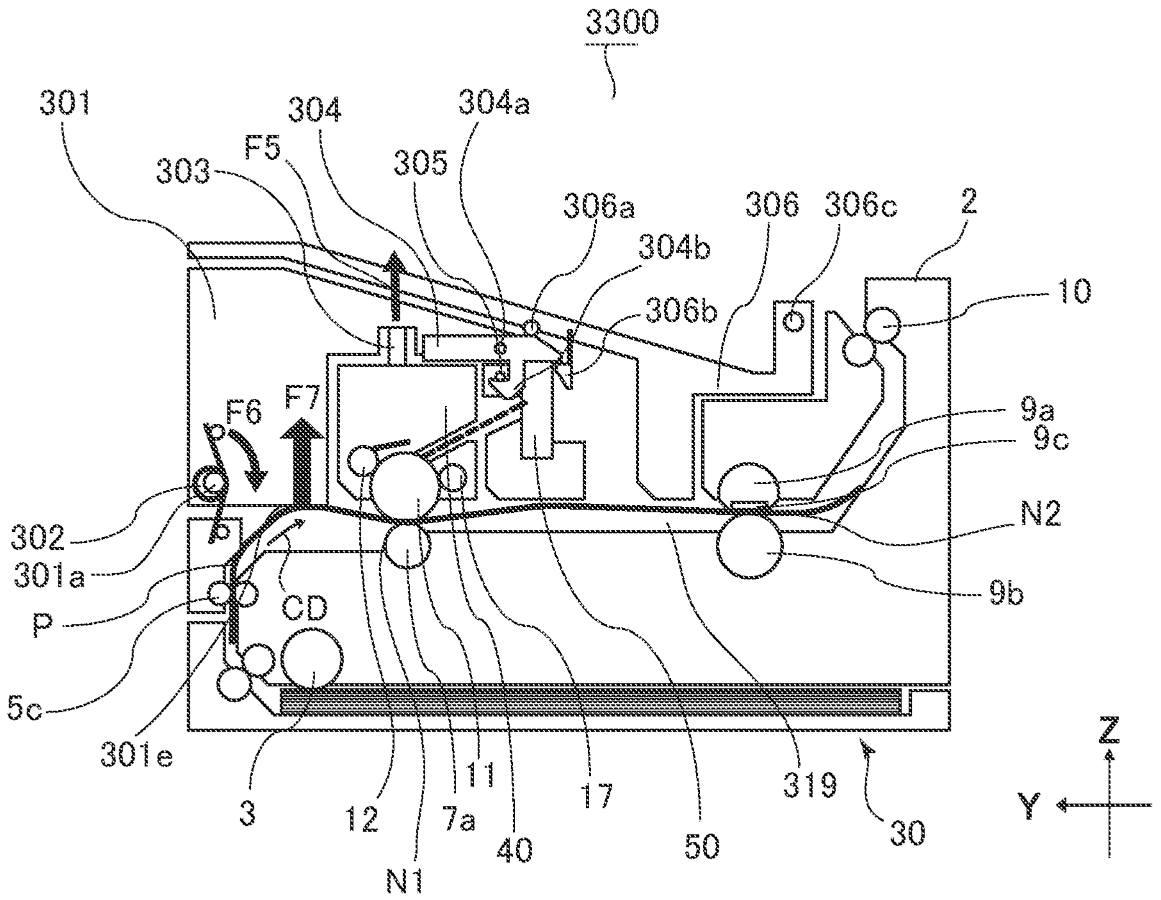
FIG. 42 is an overall schematic view illustrating an image forming apparatus according to a fourth embodiment.

As illustrated in FIG. 42, the image forming apparatus 1 includes a conveyance path 319 in which an S shape is horizontally reversed. The image forming apparatus 1 includes an image forming unit 20, a process unit 40, a fixing unit 9, a sheet discharge roller pair 10, an opening and closing member 301, a lock member 304, and a cover member 306. The transfer roller 7*a* is biased in the Z direction toward the photosensitive drum 11 by a biasing member (not illustrated), and the process unit 40 is biased in the minus Z direction by the biasing member 303. Since the biasing force by the biasing member 303 is sufficiently larger than a biasing force (not illustrated) for biasing the transfer roller 7*a*, the process unit 40 is positioned in the Z direction.

The opening and closing member 301 as an opening and closing unit is provided so as to be openable and closable about the rotation shaft 301*a* between a closed position as a first closed position closed with respect to the apparatus body 2 and a closed position as a first open position opened with respect to the apparatus body 2. The biasing member 303 is provided between the opening and closing member 301 and the process unit 40. Therefore, the opening and closing member 301 is biased in the opening direction by a reaction force F5 from the biasing member 303 as a unit biasing portion. In other words, the reaction force F5 as the first reaction force is a reaction force that the opening and closing member 301 receives from the apparatus body 2 including the process unit 40 and the biasing member 303. On the other hand, the opening and closing member 301 is biased in the closing direction by a biasing force F6 larger than the reaction force from the biasing member 303 by a torsion coil spring 302 as the biasing portion.

Here, the contact portion 301*e* of the opening and closing member 301 is provided upstream of the transfer nip N1 in the recording material conveyance direction CD, and receives the reaction force F7 as the second reaction force from the recording material P when the recording material P is conveyed on the conveyance path 319. This is because the conveyance roller pair 5*c* has a conveying speed of the recording material P higher than that of the photosensitive drum 11, whereby a loop (deflection) is formed in the recording material P between the conveyance roller pair 5*c* and the photosensitive drum 11. By the loop of the recording material P, the recording material P is wound around the photosensitive drum 11 at a larger angle, and the transfer of the image at the transfer nip N1 is stabilized.

In the present embodiment, the biasing force F6 of the torsion coil spring 302 is set to be smaller than the sum of the reaction force F5 of the biasing member 303 and the reaction force F7 of the recording material P. The biasing forces F2 and F6 acts as a force in a direction of closing the opening and closing member 301 toward the closing position, and the reaction forces F5 and F7 act as a force in a direction of opening the opening and closing member 301 toward the opening position. Therefore, only by the biasing force F6 of the torsion coil spring 302, the opening and closing member 301 rotates from the closed position toward the opening direction when the recording material P is conveyed along the conveyance path 319.

Therefore, in the present embodiment, the opening and closing member 301 is held at the closed position by the lock member 304. As a result, even when the recording material Pis conveyed on the conveyance path 319, image formation and conveyance of the recording material P can be stably performed.

The lock member 304 has a hook portion 304*b* that can be locked to the abutted portion 305 fixed to the apparatus body 2, and is rotatably supported by the opening and closing member 301 about a rotation shaft 304*a*. Note that the lock member 304 is biased in the counterclockwise direction in FIGS. 42 to 45 around the rotation shaft 304*a* by, for example, a biasing member (not illustrated) or its own weight. That is, the lock member 304 is biased toward the unlock position.

The cover member 306 as a cover portion includes a pressing portion 306*a* and an unlocking claw 306*b*. The cover member 306 is supported so as to be openable and closable about rotation shaft 306*c* between a closed position as a second closed position closed with respect to the apparatus body 2 and a closed position as a second open position opened with respect to apparatus body 2. The cover member 306 covers the opening and closing member 301 and the conveyance path 319 at the closed position.

When the cover member 306 is closed from the open position to the closed position, as illustrated in FIG. 42, the pressing portion 306*a* as the second moving portion provided in the cover member 306 rotates the lock member 304 from the unlock position to the lock position. When the cover member 306 is located at the closed position, the lock member 304 is held at the lock position by being pressed by the pressing portion 306*a*. In the lock member 34, the hook portion 304*b* is locked to the abutted portion 305 at the lock position, thereby locking the opening and closing member 301 at the close position.

Figure 43:
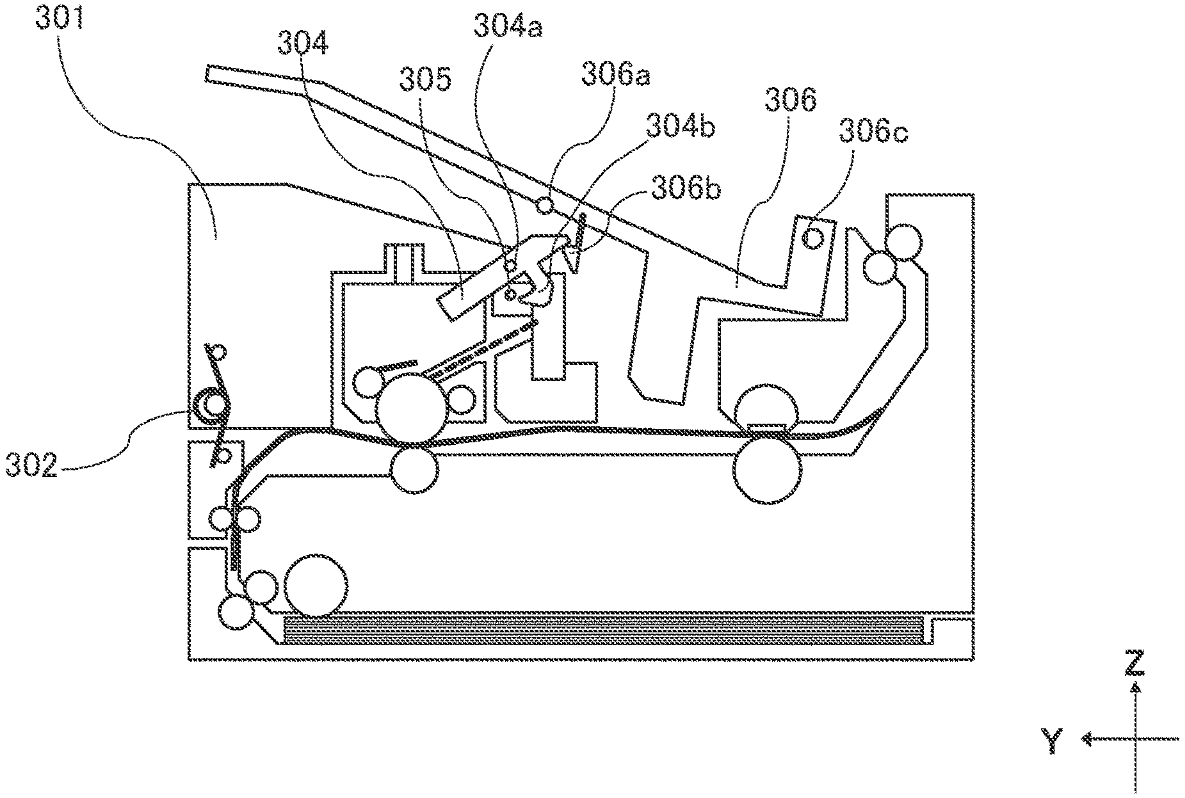
FIG. 43 is a schematic view illustrating a state in which the lock member is rotated from the lock position to the unlock position by the unlocking claw.
Figure 44:
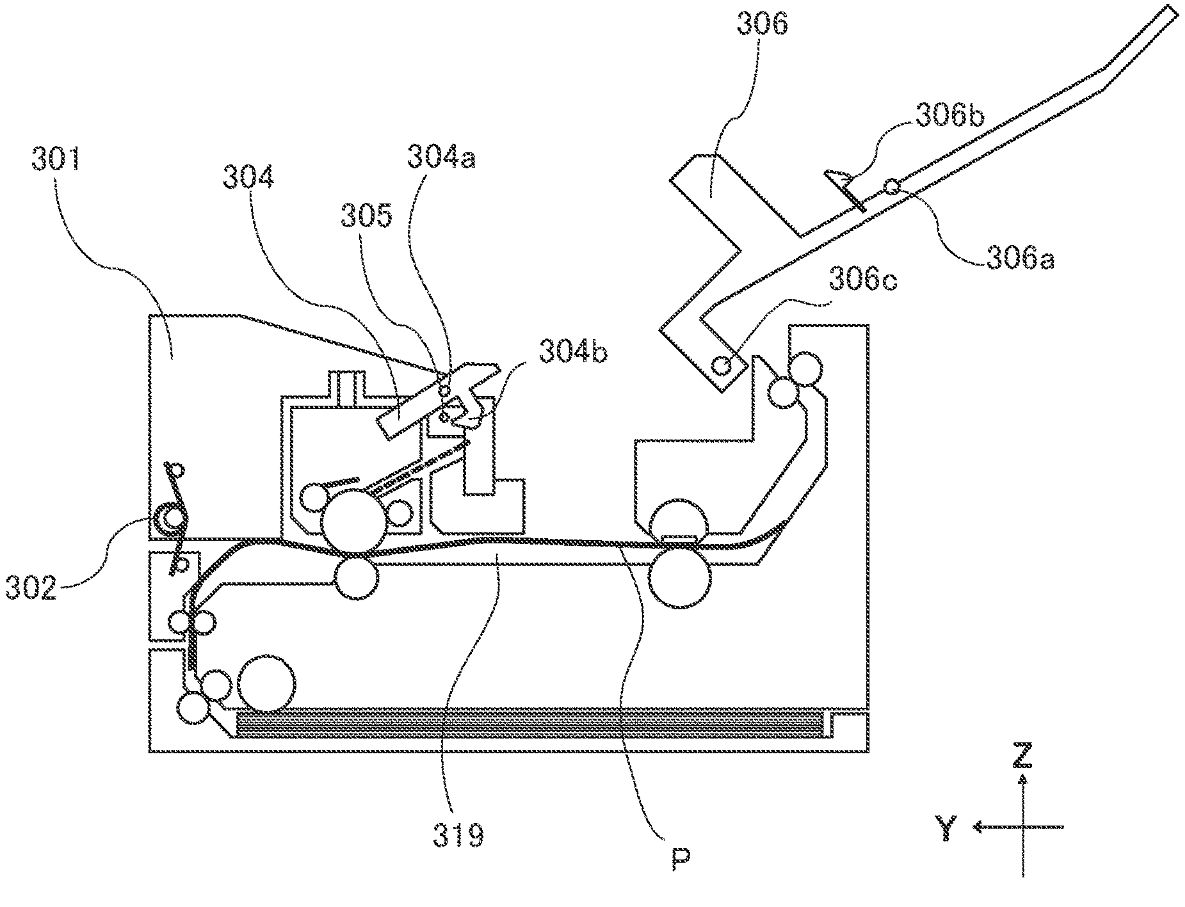
FIG. 44 is a schematic view illustrating the image forming apparatus when the cover member is located at the open position.

As illustrated in FIGS. 43 and 44, when the user opens the cover member 306 from the closed position to the open position about the rotation shaft 306*c*, the unlocking claw 306*b* as the first moving portion rotates the lock member 304 from the lock position to the unlock position. When the lock member 304 is located at the unlock position illustrated in FIG. 43, the hook portion 304*b* is not locked to the abutted portion 305. Therefore, the opening and closing member 301 can be opened from the closed position to the open position around the rotation shaft 301*a*.

Figure 45:
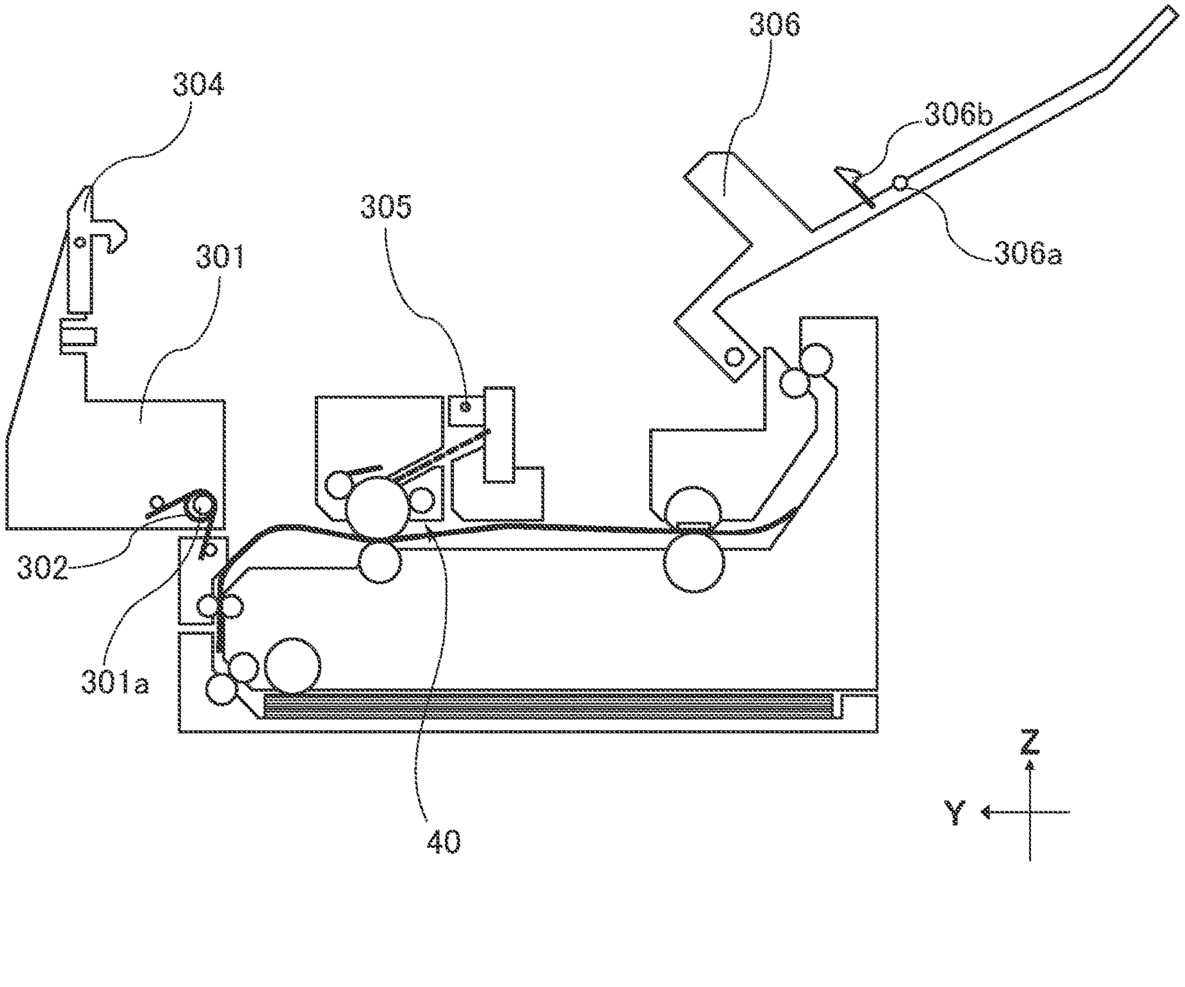
FIG. 45 is a schematic view illustrating the image forming apparatus when the cover member and an opening and closing member are located at the open position.

When the cover member 306 is opened to the open position illustrated in FIG. 44, the user can access the jammed recording material P in the conveyance path 319 to perform the jam recovery. Further, as illustrated in FIG. 45, when the user opens the opening and closing member 301 about the rotation shaft 301*a* from the closed position to the open position, the user can remove and replace the process unit 40. That is, the process unit 40 is detachable from the apparatus body 2.

As described above, in the present embodiment, the opening and closing member 301 is held at the closed position by the lock member 304. As a result, even when the recording material P is conveyed on the conveyance path 319, image formation and conveyance of the recording material P can be stably performed. In addition, if the biasing force F6 of the torsion coil spring 302 is set to be larger than the sum of the reaction force F5 of the biasing member 303 and the reaction force F7 of the recording material P, the operation force required when the user opens the opening and closing member 301 becomes large. That is, by providing the lock member 304, the biasing force of the torsion coil spring 302 that biases the opening and closing member 301 in the closing direction can be set to be small, and the operating force necessary for opening the opening and closing member 301 can be reduced. Accordingly, usability can be improved.

OTHER EMBODIMENTS

In the first embodiment, the contact portion 99Ra has an arc shape centered on the lock shaft 7*a*R, but the present invention is not limited thereto. For example, the contact portion 99Ra may be formed in an arc shape in which a radius between the abutment portion and the lock shaft 7*a*R decreases toward the downstream side in the direction of the arrow RD2. As a result, in the lock member 99R, the contact portion 99Ra and the abutted portion 9Ra are engaged with each other with a stronger force at the lock position, and the transfer unit 7 can be reliably locked at the closed position.

In the first embodiment, the transfer unit 7 is provided with the protruding portion 7*e*, but the present invention is not limited thereto. For example, the protruding portion 7*e* may be provided in a conveyance guide facing the transfer unit 7 and constituting the conveyance path 19.

In the fourth embodiment, the torsion coil spring 302 is used, but the present invention is not limited thereto. For example, instead of the torsion coil spring 302, another spring such as a leaf spring or a torsion bar may be applied.

Further, the lock members 99L and 99R of the first embodiment are provided in the transfer unit 7, but the present invention is not limited thereto. For example, the lock members 99L and 99R may be provided in the apparatus body 2 instead of the transfer unit 7. That is, the lock members 99L and 99R as the lock portions may be provided on any one of the transfer unit 7 and the apparatus body 2. In any case, the lock members 99L and 99R only need to be able to lock the transfer unit 7 located at the closed position to the apparatus body 2 when the back cover 73 is located at the closed position.

Further, the lock member 304 of the fourth embodiment is provided in the opening and closing member 301, but the present invention is not limited thereto. For example, the lock member 304 may be provided in the apparatus body 2 instead of the opening and closing member 301. That is, the lock member 304 as the lock portion may be provided on any one of the opening and closing member 301 and the apparatus body 2. In any case, the lock member 304 only needs to be able to lock the opening and closing member 301 located at the closed position to the apparatus body 2 when the cover member 306 is located at the closed position.

In any of the embodiments described above, the electrophotographic image forming apparatus 1 and 300 has been described, but the present invention is not limited thereto. For example, the present invention can also be applied to an inkjet type image forming apparatus that forms an image on a recording material by ejecting ink liquid from a nozzle.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-198631, filed Dec. 7, 2021, and Japanese Patent Application No. 2021-206558, filed Dec. 20, 2021 which are hereby incorporated by reference herein in their entirety.

What is claimed is:

1. An image forming apparatus comprising:

an apparatus body;

an image forming unit provided inside the apparatus body and configured to form an image on a sheet;

an opening and closing cover that constitutes a part of an exterior of the apparatus body and is openable and closable with respect to the apparatus body;

a fixed cover that constitutes a part of an exterior of the apparatus body together with the opening and closing cover, and is configured to form a boundary portion with an upper edge of the opening and closing cover in a vertical direction in a closed state;

a positioning portion including a first engagement portion provided in the opening and closing cover, a second engagement portion provided in the fixed cover and configured to be engaged with the first engagement portion in a case where the opening and closing cover is in a closed state, a plurality of third engagement portions provided at a plurality of positions of the opening and closing cover in a rotation axis direction of the opening and closing cover, and a plurality of fourth engagement portions provided at a plurality of positions of the fixed cover in the rotation axis direction of the opening and closing cover and engaged with the third engagement portions in a case where the opening and closing cover is in a closed state;

a first conveyance guide provided on the opening and closing cover and configured to guide the sheet; and a second conveyance guide provided on the fixed cover and configured to guide the sheet together with the first conveyance guide in a case where the opening and closing cover is in a closed state, wherein the first engagement portion and the second engagement portion are configured to engage with each other to perform positioning of the opening and closing cover and the fixed cover in the vertical direction and positioning of the first conveyance guide relative to the second conveyance guide, a respective third engagement portion and a respective fourth engagement portion are configured to engage with each other to position the opening and closing cover, the first engagement portion is disposed between the plurality of third engagement portions in the rotation axis direction of the opening and closing cover, and the second engagement portion is disposed between the plurality of fourth engagement portions in the rotation axis direction of the opening and closing cover.

2. The image forming apparatus according to claim 1, wherein the opening and closing cover is a cover that constitutes a back surface of the apparatus body.

3. The image forming apparatus according to claim 1, wherein the fixed cover is a cover that constitutes an upper surface of the apparatus body.

4. The image forming apparatus according to claim 1, further comprising a fixing unit configured to heat and pressurize an image formed on the sheet to fix the image, wherein the fixed cover is located above the fixing unit.

5. The image forming apparatus according to claim 1, wherein one of the first engagement portion and the second engagement portion includes a first restricting portion configured to define a restriction position on an upper side in a relative positional relationship between the opening and closing cover and the fixed cover, and a second restricting portion configured to define a restriction position on a lower side in the relative positional relationship between the opening and closing cover and the fixed cover, and the other of the first engagement portion and the second engagement portion includes an engaging claw engaged between the first restricting portion and the second restricting portion.

6. The image forming apparatus according to claim 1, wherein the second engagement portion is integrally formed with the fixed cover.

7. The image forming apparatus according to claim 1, wherein the fixed cover includes a cover main body and a conveyance rib holding portion provided separately from the cover main body and attached to the cover main body, and the conveyance rib holding portion includes the second conveyance guide and the second engagement portion.

8. An image forming apparatus comprising:

an apparatus body including a rotatable image bearing member;

a transfer member configured to form a transfer nip together with the image bearing member and transfer an image formed on the image bearing member to a recording material;

a protruding portion provided adjacent to the transfer nip at a position upstream of the transfer nip in a conveyance direction of the recording material, and curves the recording material toward the image bearing member;

an opening and closing unit configured to be openable and closable between a first closed position closed with respect to the apparatus body and a first open position opened with respect to the apparatus body;

a biasing portion configured to bias the opening and closing unit toward the first closed position;

a lock portion provided on one of the opening and closing unit and the apparatus body and movable between a lock position where the opening and closing unit located at the first close position is locked with respect to the apparatus body and an unlock position where the opening and closing unit is unlocked with respect to the apparatus body; and a cover portion configured to be openable and closable between a second closed position closed with respect to the apparatus body and a second open position opened with respect to the apparatus body, and cover the opening and closing unit positioned at the first closed position at the second closed position, wherein the lock portion is located at the lock position in a case where the cover portion is located at the second closed position, and a biasing force of the biasing portion is larger than a first reaction force that the opening and closing unit receives from the apparatus body, and is smaller than a sum of a second reaction force that the opening and closing unit receives from the recording material conveyed in the conveyance direction and the first reaction force.

9. The image forming apparatus according to claim 8, wherein the first reaction force and the second reaction force act as a force in a direction of opening the opening and closing unit toward the first open position.

10. The image forming apparatus according to claim 8, wherein the protruding portion is provided in the opening and closing unit, and is configured to contact the recording material conveyed in the conveyance direction so that the protruding portion receives the second reaction force.

11. The image forming apparatus according to claim 8, wherein the lock portion is biased toward the unlock position and is located at the unlock position in a case where the cover portion is located at the second open position.

12. The image forming apparatus according to claim 11, wherein the cover portion includes a first moving portion configured to move the lock portion from the lock position to the unlock position in a case where the cover portion is opened from the second closed position to the second open position.

13. The image forming apparatus according to claim 12, wherein the cover portion includes a second moving portion configured to move the lock portion from the unlock position to the lock position in a case where the cover portion is closed from the second open position to the second close position.

14. The image forming apparatus according to claim 8, wherein the apparatus body includes a process unit including the image bearing member and a toner storage unit configured to store toner, the opening and closing unit includes a transfer unit including the transfer member that forms the transfer nip together with the image bearing member at the first closed position, and the first reaction force is a reaction force that the transfer member receives from the image bearing member.

15. The image forming apparatus according to claim 14, wherein the lock portion includes a first engagement portion and is provided in the transfer unit, and the apparatus body includes a second engagement portion engageable with the first engagement portion in a case where the transfer unit is located at the first closed position and the lock portion is located at the lock position.

16. The image forming apparatus according to claim 15, wherein the lock portion is rotatable about a rotation shaft between the lock position and the unlock position, the first engagement portion is formed in an arc shape centered on the rotation shaft, and receives a third reaction force from the second engagement portion in a case where the second engagement portion is engaged, and the third reaction force acts as a force in a direction of closing the opening and closing unit toward the first closing position.

17. The image forming apparatus according to claim 14, wherein the process unit includes a supply unit that communicates with the toner storage unit and receives toner supplied from an outside in a state where the process unit is attached to the apparatus body.

18. The image forming apparatus according to claim 14, wherein the process unit is detachable from a housing of the apparatus body in a case where the cover portion is located at the second open position and the opening and closing unit is located at the first open position.

19. The image forming apparatus according to claim 8, wherein the apparatus body includes a process unit including the image bearing member and a toner storage unit configured to store toner; and 6 a unit biasing portion provided between the process unit and the opening and closing unit located at the first closed position and configured to bias the image bearing member toward the transfer member provided in the apparatus body, and the first reaction force is a reaction force that the opening and closing unit receives from the unit biasing portion.

20. The image forming apparatus according to claim 19, wherein the lock portion is provided in the opening and closing unit.

* * * * *